United States Patent
Zhu et al.

(10) Patent No.: US 12,166,709 B2
(45) Date of Patent: Dec. 10, 2024

(54) METHOD AND APPARATUS FOR TIMING ADJUSTMENT IN A WIRELESS COMMUNICATION SYSTEM

(71) Applicant: Samsung Electronics Co., Ltd., Suwon-si (KR)

(72) Inventors: Dalin Zhu, Richardson, TX (US); Md. Saifur Rahman, Plano, TX (US); Emad N. Farag, Flanders, NJ (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 279 days.

(21) Appl. No.: 17/447,181

(22) Filed: Sep. 8, 2021

(65) Prior Publication Data

US 2022/0085943 A1 Mar. 17, 2022

Related U.S. Application Data

(60) Provisional application No. 63/241,247, filed on Sep. 7, 2021, provisional application No. 63/228,650, filed
(Continued)

(51) Int. Cl.
*H04L 5/00* (2006.01)

(52) U.S. Cl.
CPC .......... *H04L 5/0048* (2013.01); *H04L 5/0078* (2013.01)

(58) Field of Classification Search
CPC ............. H04W 8/245; H04W 56/0045; H04W 72/0446; H04W 56/0005; H04W 56/0015;
(Continued)

(56) References Cited

U.S. PATENT DOCUMENTS 11,638,240 B2 * 4/2023 Park ...................... H04L 1/1671
370/336
11,800,475 B2 * 10/2023 Rahman .............. H04W 56/004
(Continued)

FOREIGN PATENT DOCUMENTS

JP            7242880 B2 *  3/2023  ........... G01S 13/765
KR    10-2020-0063008 A     6/2020
(Continued)

OTHER PUBLICATIONS

International Search Report and Written Opinion of the International Searching Authority in connection with International Application No. PCT/KR2021/012504 issued Dec. 16, 2021, 8 pages.
(Continued)

*Primary Examiner* — Ayaz R Sheikh
*Assistant Examiner* — Louis Samara

(57) ABSTRACT

Methods and apparatuses for timing adjustment in a system comprising multiple transmission and reception points (TRPs). A method for operating a user equipment (UE) includes receiving first information for one or more first measurement reference signals (RSs) from a first cell to measure for determining a downlink (DL) timing difference, receiving second information for one or more second measurement RSs from a second cell to measure for determining the DL timing difference, and receiving a configuration for reporting the DL timing difference between the first and second cells. The method further includes measuring, based on the first and second information, the first and second measurement RSs, respectively; determining, based on the first and second measured measurement RSs, a timing difference report for the first and second cells; and transmitting, based on the configuration, the timing difference report to one or more of the first and second cells.

20 Claims, 31 Drawing Sheets

Related U.S. Application Data on Aug. 3, 2021, provisional application No. 63/078,003, filed on Sep. 14, 2020.

(58) Field of Classification Search
CPC ............ H04W 24/10; H04W 56/004; H04W 56/001; H04B 7/0452; H04L 5/0055; H04J 11/0069
See application file for complete search history.

(56) References Cited

U.S. PATENT DOCUMENTS

| | | | | |
|---|---|---|---|---|
| 2014/0029586 | A1* | 1/2014 | Loehr | ................... H04L 5/0055 370/336 |
| 2019/0037512 | A1* | 1/2019 | Dinan | ............... H04W 56/0005 |
| 2020/0021337 | A1* | 1/2020 | Wang | ................... H04B 7/0417 |
| 2020/0036424 | A1* | 1/2020 | Kang | ................... H04W 24/10 |
| 2020/0187137 | A1 | 6/2020 | Vajapeyam et al. | |
| 2020/0196230 | A1* | 6/2020 | John Wilson | ......... H04W 8/245 |
| 2020/0358547 | A1* | 11/2020 | Liu | ....................... H04J 11/0069 |
| 2021/0058996 | A1* | 2/2021 | Yang | ................... H04W 56/001 |
| 2021/0321355 | A1* | 10/2021 | Gao | .................. H04W 56/0045 |
| 2022/0029746 | A1 | 1/2022 | Noh et al. | |
| 2022/0110076 | A1* | 4/2022 | Shimoda | ........... H04W 56/0015 |
| 2023/0188293 | A1* | 6/2023 | Liu | ................... H04W 56/0015 370/329 |
| 2023/0269682 | A1* | 8/2023 | Du | ........................ H04W 24/10 370/252 |

FOREIGN PATENT DOCUMENTS

| | | | | |
|---|---|---|---|---|
| WO | WO-2012134245 | A2 * | 10/2012 | ............ H04B 7/2643 |
| WO | WO-2019157661 | A1 * | 8/2019 | .......... H04J 11/0069 |
| WO | WO-2020024295 | A1 * | 2/2020 | ........ H04W 56/0045 |
| WO | WO-2020111686 | A1 * | 6/2020 | ............. H04B 7/024 |
| WO | 2020145248 | A1 | 7/2020 | |

OTHER PUBLICATIONS

Intel Corporation, "Multi-TRP enhancements for inter-cell operation", R1-2005860, 3GPP TSG RAN WG1 #102-e, e-Meeting, Aug. 17-28, 2020, 8 pages.

"3rd Generation Partnership Project; Technical Specification Group Radio Access Network; NR; Physical channels and modulation (Release 16)", 3GPP TS 38.211 V16.6.0, Jun. 2021, 134 pages.

"3rd Generation Partnership Project; Technical Specification Group Radio Access Network; NR; Multiplexing and channel coding (Release 16)", 3GPP TS 38.212 V16.6.0, Jun. 2021, 153 pages.

"3rd Generation Partnership Project; Technical Specification Group Radio Access Network; NR; Physical layer procedures for control (Release 16)", 3GPP TS 38.213 V16.6.0, Jun. 2021, 187 pages.

"3rd Generation Partnership Project; Technical Specification Group Radio Access Network; NR; Physical layer procedures for data (Release 16)", 3GPP TS 38.214 V16.6.0, Jun. 2021, 172 pages.

"3rd Generation Partnership Project; Technical Specification Group Radio Access Network; NR; Medium Access Control (MAC) protocol specification (Release 16)", 3GPP TS 38.321 V16.5.0, Jun. 2021, 157 pages.

"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.

"3rd Generation Partnership Project; Technical Specification Group Radio Access Network; Evolved Universal Terrestrial Radio Access (E-UTRA); Physical layer procedures (Release 16)", 3GPP TS 36.213 V16.6.0, Jun. 2021, 577 pages.

Extended European Search Report issued Nov. 13, 2023 regarding Application No. 21867194.9, 15 pages.

* cited by examiner

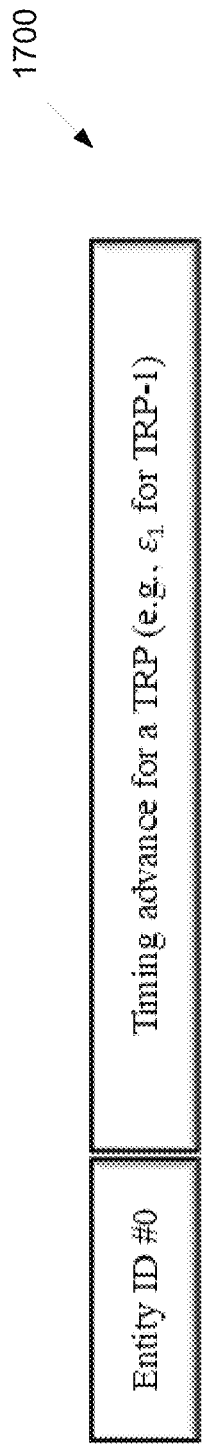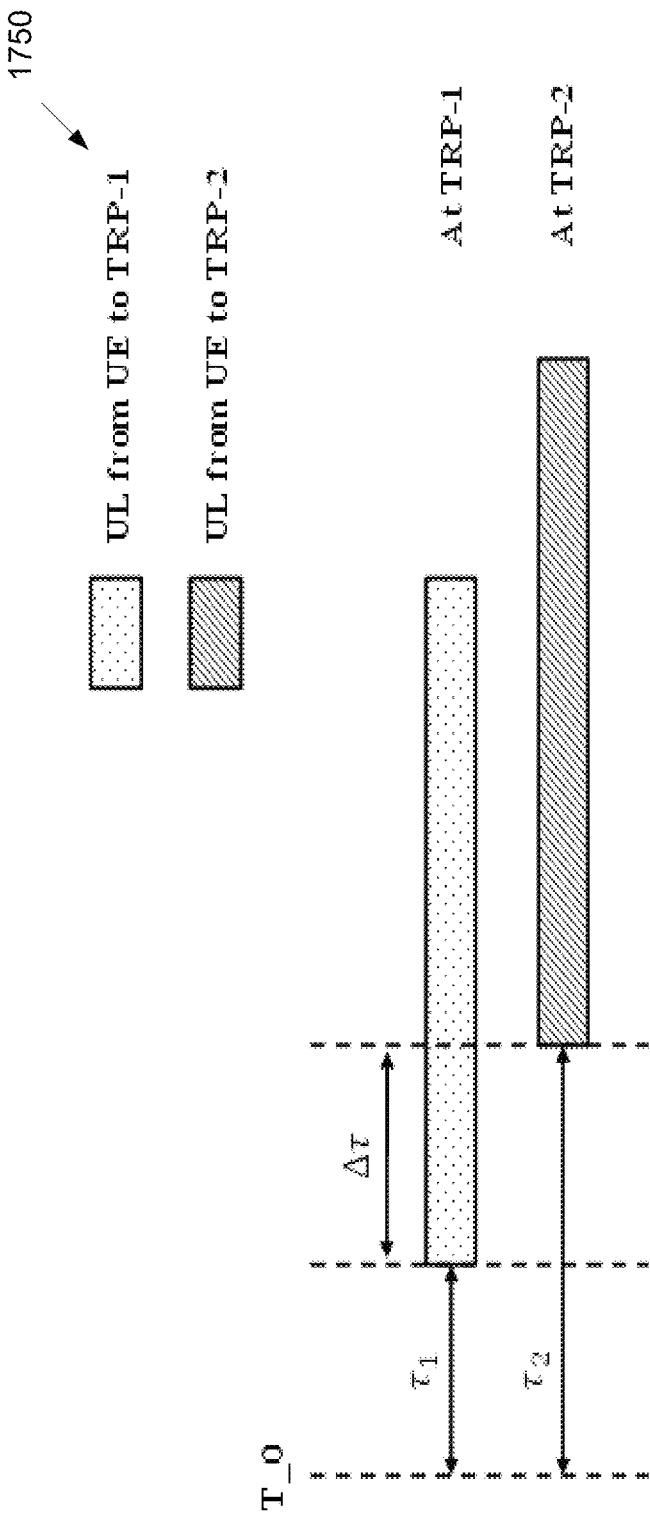
FIG. 17A
FIG. 17B

METHOD AND APPARATUS FOR TIMING ADJUSTMENT IN A WIRELESS COMMUNICATION SYSTEM

CROSS-REFERENCE TO RELATED APPLICATIONS AND CLAIM OF PRIORITY

The present application claims priority to U.S. Provisional Patent Application No. 63/078,003, filed on Sep. 14, 2020, U.S. Provisional Patent Application No. 63/228,650, filed on Aug. 3, 2021 and U.S. Provisional Patent Application No. 63/241,247, filed on Sep. 7, 2021. The content of the above-identified patent documents is incorporated herein by reference.

TECHNICAL FIELD

The present disclosure relates generally to wireless communication systems and, more specifically, the present disclosure relates to timing adjustment in a wireless communication system comprising multiple transmission and reception points (TRPs).

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to timing adjustment in a wireless communication system comprising multiple TRPs.

In one embodiment, a user equipment (UE) is provided. The UE includes a transceiver configured to receive first information for one or more first measurement reference signals (RSs) from a first cell to measure for determining a downlink (DL) timing difference; receive second information for one or more second measurement RSs from a second cell to measure for determining the DL timing difference; and receive a configuration for reporting the DL timing difference between the first and second cells. The UE also includes a processor operably connected to the transceiver. The processor is configured to measure, based on the first and second information, the first and second measurement RSs, respectively, and determine, based on the measured measurement RSs, a timing difference report for the first and second cells. The transceiver is further configured to transmit, based on the configuration, the timing difference report to one or more of the first and second cells. The first and second measurement RSs comprise channel state information reference signals (CSI-RSs), synchronization signal blocks (SSBs), or both CSI-RSs and SSBs.

In another embodiment, a base station (BS) is provided. The BS includes a processor configured to generate one of: first information for one or more first measurement RSs from a first cell to measure for determining a DL timing difference, or second information for one or more second measurement RSs from a second cell to measure for determining the DL timing difference; and generate a configuration for reporting the DL timing difference between the first and second cells. The BS also includes a transceiver operably connected to the processor. The transceiver is configured to transmit the generated one of the first or second information; transmit the configuration; and receive, based on the configuration, a timing difference report generated based on the first and second information. The first and second measurement RSs comprise CSI-RSs, SSBs, or both CSI-RSs and SSBs.

In yet another embodiment, a method for operating a UE is provided. The method includes receiving first information for one or more first measurement RSs from a first cell to measure for determining a DL timing difference, receiving second information for one or more second measurement RSs from a second cell to measure for determining the DL timing difference, and receiving a configuration for reporting the DL timing difference between the first and second cells. The method further includes measuring, based on the first and second information, the first and second measurement RSs, respectively; determining, based on the first and second measured measurement RSs, a timing difference report for the first and second cells; and transmitting, based on the configuration, the timing difference report to one or more of the first and second cells. The first and second measurement RSs comprise CSI-RSs, SSBs, or both CSI-RSs and SSBs.

Other technical features may be readily apparent to one skilled in the art from the following FIGURES, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 17A illustrates an example of two TRP-specific UL timing advance (TA) MAC CE commands in a multi-TRP system according to embodiments of the present disclosure;

FIG. 17B illustrates an example of common reference time according to embodiments of the present disclosure;

DETAILED DESCRIPTION

FIG. 1 through FIG. 25, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v. 16.6.0, "NR; Physical Channels and Modulation"; 3GPP TS 38.212 v16.6.0, "NR; Multiplexing and Channel Coding"; 3GPP TS 38.213 v16.6.0, "NR; Physical Layer Procedures for Control"; 3GPP TS 38.214: v. 16.6.0, "NR; Physical Layer Procedures for Data"; 3GPP TS 38.321 v16.5.0, "NR; Medium Access Control (MAC) Protocol Specification"; 3GPP TS 38.331 v. 16.5.0. "NR; Radio Resource Control (RRC) Protocol Specification"; and 3GPP TS 36.213 v16.6.0, "Evolved Universal Terrestrial Radio Access (E-UTRA); Physical Layer Procedures."

Figure 1:
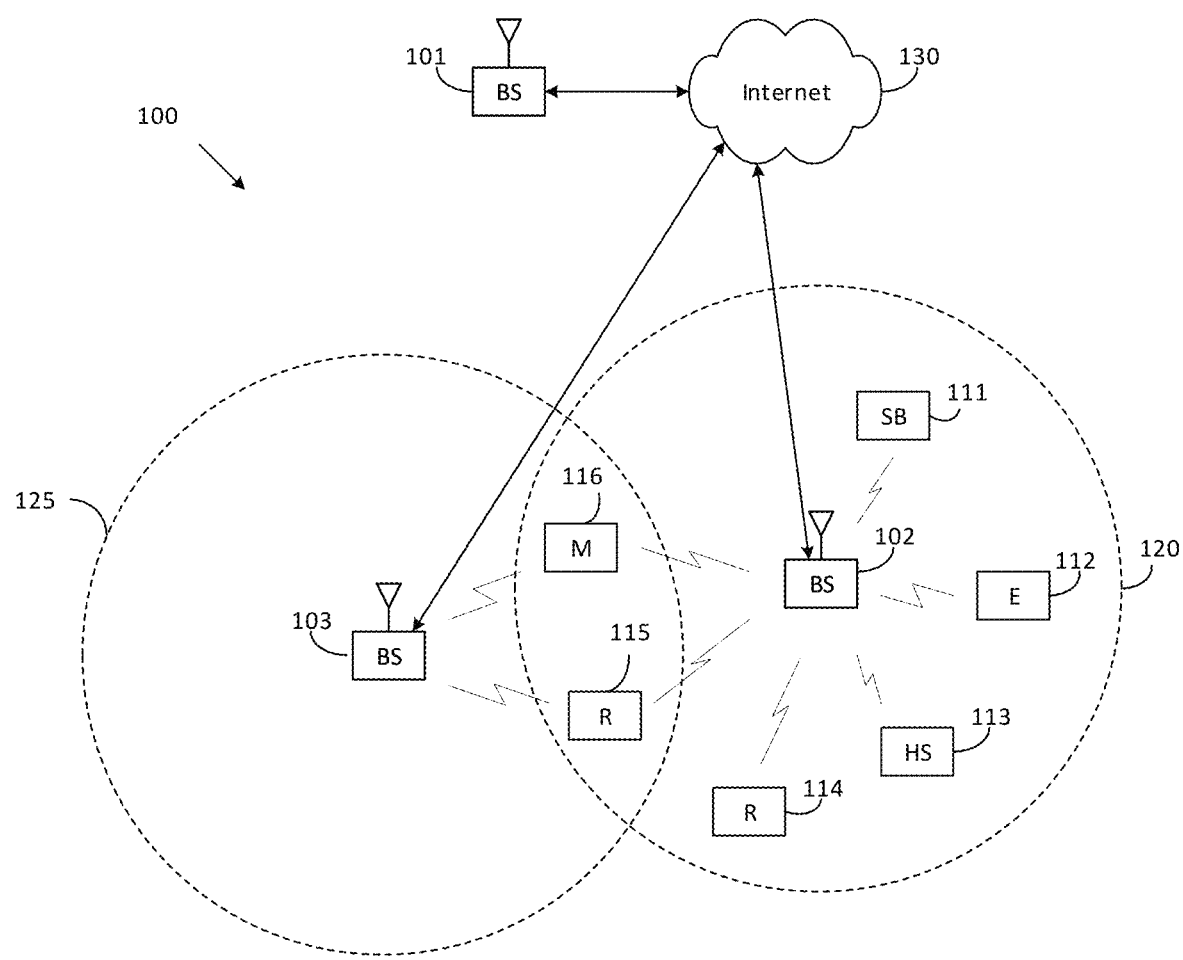
FIG. 1 illustrates an example wireless network according to embodiments of the present disclosure.
Figure 2:
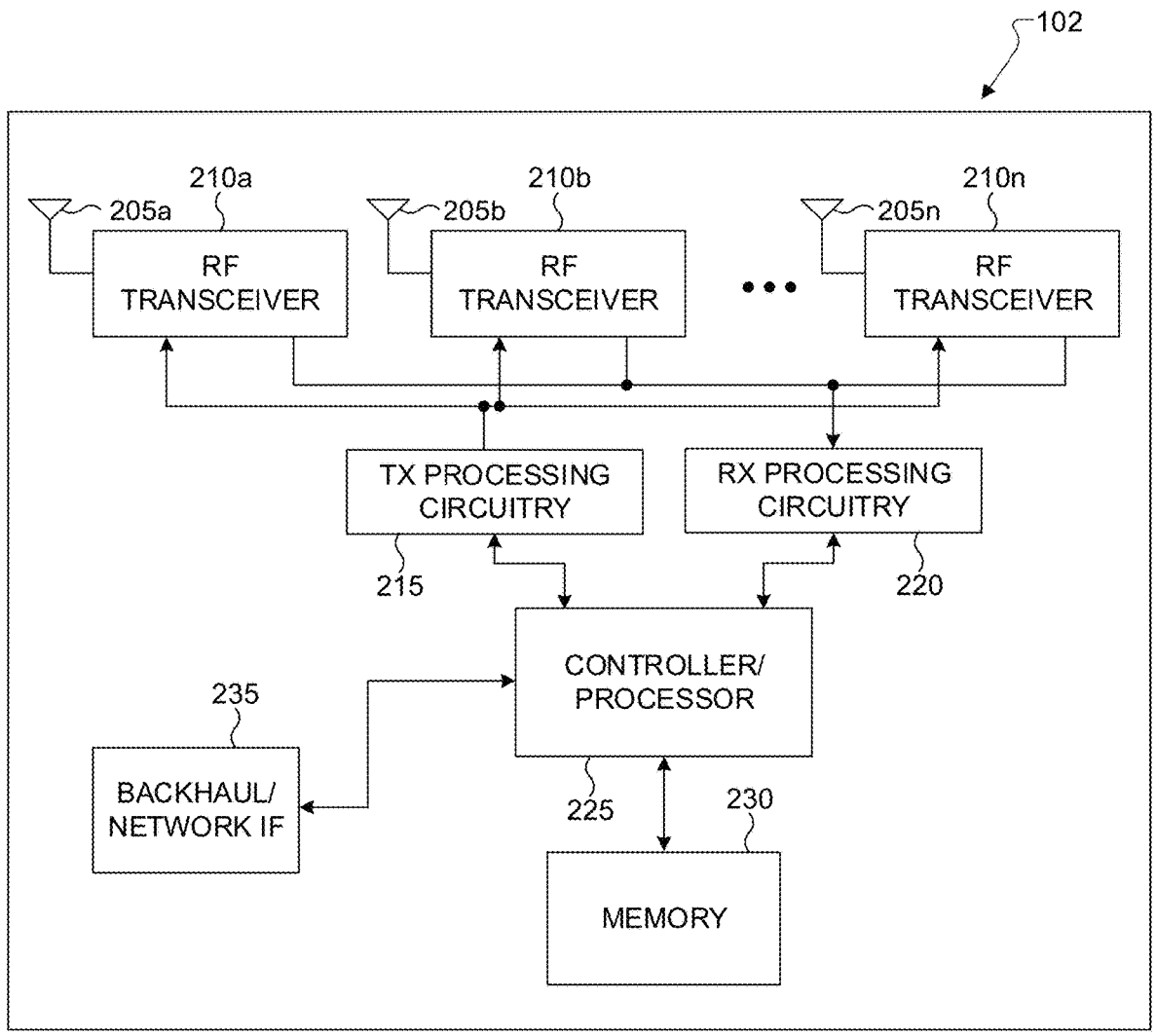
FIG. 2 illustrates an example gNB according to embodiments of the present disclosure.
Figure 3:
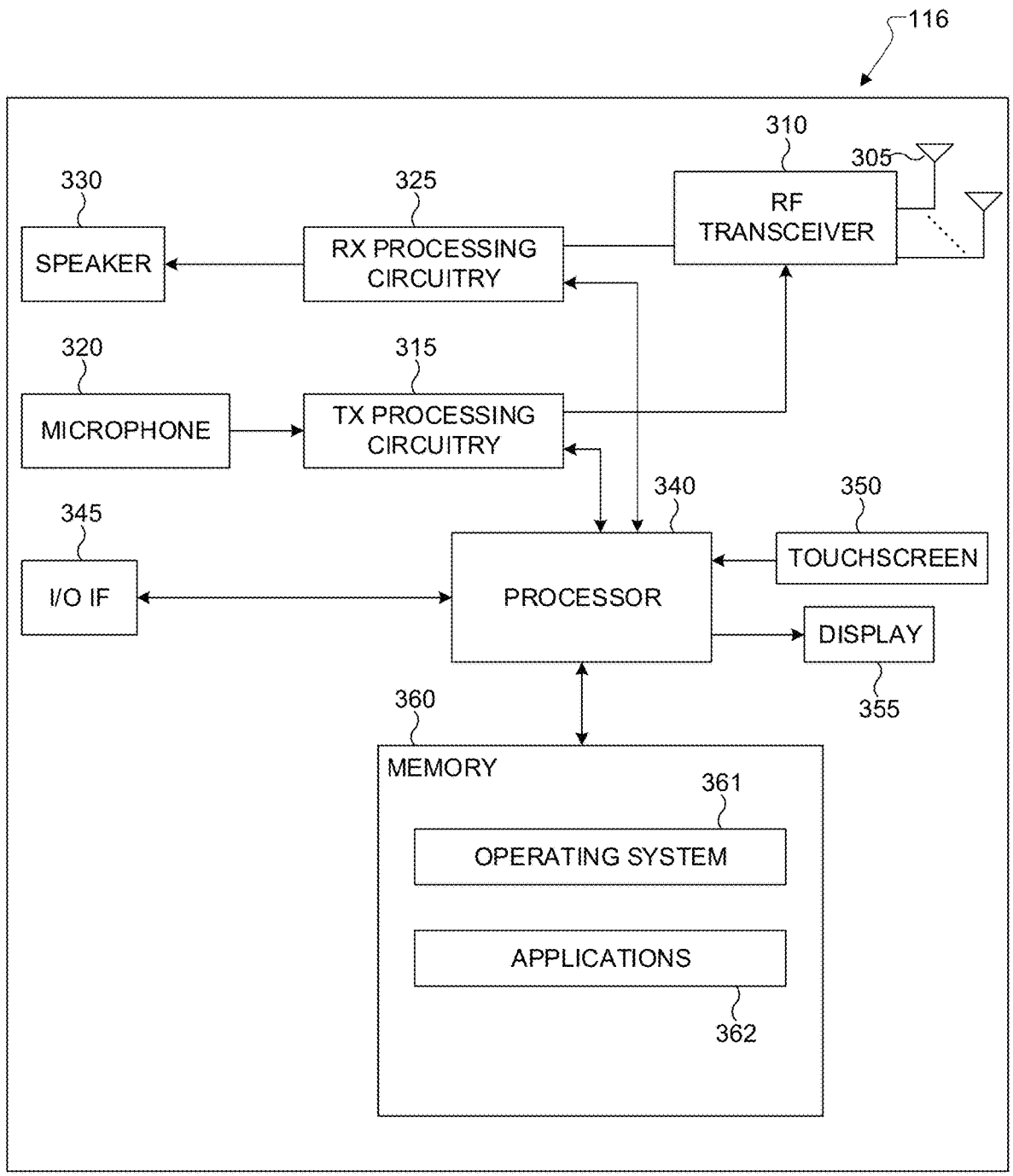
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), TRP, an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for timing adjustment in a multi-RP system. In certain embodiments, and one or more of the gNBs 101-103 includes circuitry, programing, or a combination thereof, for timing adjustment in a multi-RP system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support the timing adjustment in a multi-RP system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for timing adjustment in a multi-RP system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
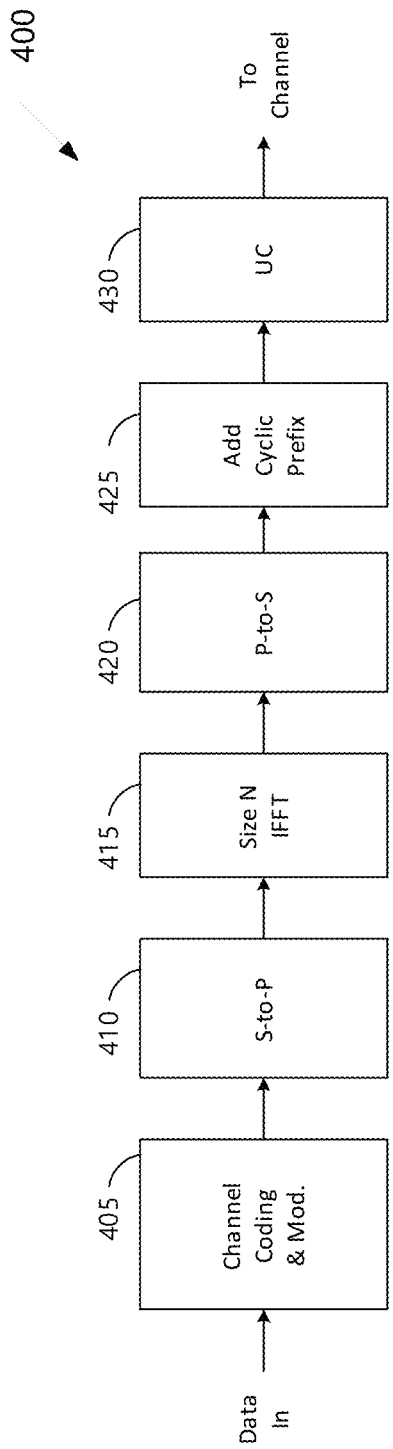
FIGS. 4 and 5 illustrate example wireless transmit and receive paths according to this disclosure.
Figure 5:
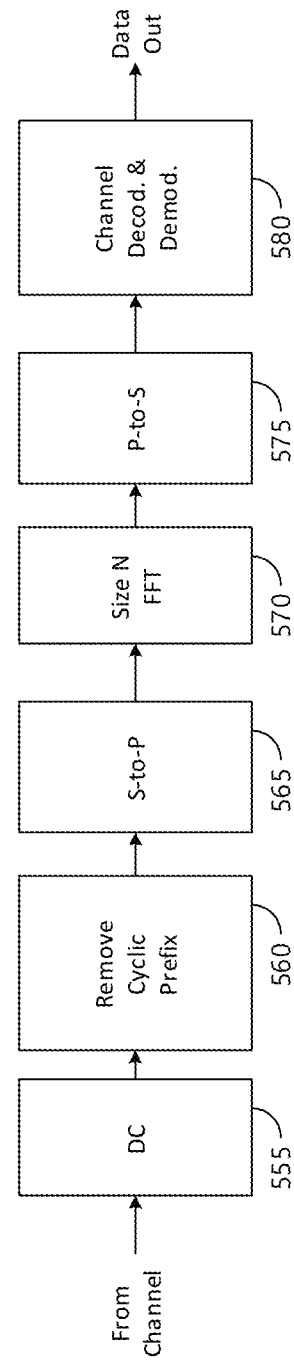

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support sidelink measurements in vehicle-to-everything (V2X) communication as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In a wireless communications system, a base station or a TRP can use multiple antennas to form one or more beams to communicate with a UE. In the present disclosure, a TRP can represent a collection of measurement antenna ports, measurement RS resources and/or control resource sets (CORESETs). For example, a TRP could be associated with one or more of: a plurality of CSI-RS resources; a plurality of CRIs (CSI-RS resource indices/indicators); a measurement RS resource set, for example, a CSI-RS resource set along with its indicator; a plurality of CORESETs associated with a CORESETPoolIndex; or a plurality of CORESETs associated with a TRP-specific index/indicator/identity.

The use of multiple antennas is based on the use of one or more antenna ports. A first set of antenna ports can be quasi co-located with a second set of antenna ports such that parameters of a transmission (e.g., Doppler shift, Doppler spread, average delay, delay spread, spatial parameters, etc.) from the first set of antenna ports can be inferred from parameters of a transmission (e.g., Doppler shift, Doppler spread, average delay, delay spread, spatial parameters, etc.) from the second set of antenna ports. The UE can receive from the base station the quasi co-location (QCL) information between an indicated reference signal (RS)—a QCL source RS—and another (target) RS, or between a QCL source RS and a (target) downlink channel. The indicated QCL source RS can correspond to a synchronization signal block (SSB) or a channel state information reference signal (CSI-RS), e.g., a tracking reference signal (TRS). In addition, the QCL information also includes one or more QCL types.

In the 3GPP 5G NR, four QCL types are defined: (1) QCL-TypeA: {Doppler shift, Doppler spread, average delay, delay spread}; (2) QCL-TypeB: {Doppler shift, Doppler spread}; (3) QCL-TypeC: {Doppler shift, average delay}; and (4) QCL-TypeD: {Spatial receive parameters}.

Upon receiving the QCL information from the base station, the UE can assume that one or more antenna ports for a downlink channel (e.g., a downlink data/control transmission) is QCL related (or in short QCL'ed) with the indicated QCL source RS with respect to the indicated QCL type. For instance, if a TRS is QCL'ed with a SSB indicated in the QCL information (i.e., the SSB is the QCL source RS), and the indicated QCL type is QCL-TypeC, the UE can process the TRS with the same Doppler shift and average delay parameters used for receiving the indicated SSB. For another example, if PDSCH DMRS is QCL'ed with a TRS indicated in the QCL information (i.e., the TRS is the QCL source RS), and the indicated QCL type is QCL-TypeD, the UE can use the same spatial domain receive filter used for receiving the indicated TRS to receive the PDSCH. In various scenarios, by using the previous measurements of the QCL source RS(s), the processing of the current RS(s) and/or channel(s) can be facilitated.

The UE could be configured by the network one or more transmission configuration indicator (TCI) states, which indicate the QCL information/assumptions for one or more (target) RSs/channels. For instance, for data transmissions on the shared channel (such as the physical downlink shared channel in NR, i.e., PDSCH), a UE can be first higher layer configured by the network (e.g., via high layer RRC signaling) a set/pool of TCI states. The UE could then receive from the network a MAC CE command activating one or more TCI states from the set/pool of RRC configured TCI states. The UE could be indicated by the network via dynamic DCI signaling that one or more of the MAC CE activated TCI states are active for the reception of the PDSCH(s). For example, an N bit field configured in DCI format 1_1 can indicate a MAC CE codepoint index.

In TABLE 1, snippets of higher layer parameters TCI-State (TCI state) and QCL-Info (QCL information) are presented. As can be seen from FIG. 4, in the higher layer parameter TCI-State, a TCI state ID that indicates/identifies a TCI state and one or two QCL-Info fields are included in the higher layer parameter TCI-State. Note that the second QCL-Info is optional and may not be configured. Furthermore, as illustrated in TABLE 1, a QCL-Info includes a reference signal field along with a qcl-Type field, indicating a QCL source/reference RS and the corresponding QCL type (QCL-TypeA, B, C and/or D), respectively. The QCL-Info further comprises of a ServCellIndex used to identify a serving cell such as a primary cell (PCell) or a secondary cell (SCell) in a carrier aggregation (CA) setting. The QCL-Info also includes a bandwidth part (BWP) ID that indicates the BWP for which the QCL source RS applies. Note that both serving cell ID and BWP ID are optional, which may not be configured in QCL-Info under certain settings.

The 3GPP Rel. 15/16 TCI framework, may not be suited well for inter-cell operation wherein different cells/TRPs could broadcast/be associated with different PCIs and/or one or more cells/TRPs could broadcast/be associated with different PCIs from that of the serving cell/TRP and/or one or more cells/TRPs are not associated with valid ServCellIndex. In such an inter-cell system, as the QCL source RS indicated in the QCL-Info is only associated with the serving cell (indicated by the ServCellIndex, representing either a PCell or an SCell), the RS(s) such as SSB(s) and/or CSI-RS(s) transmitted from other non-serving (or neighboring) cells/TRPs broadcasting/associated with different PCIs from that of the serving cell cannot be used/configured as the QCL source/reference RS(s).

TABLE 1

Higher layer parameters TCI-state and QCL-info

TCI-State ::= SEQUENCE {
  tci-StateId TCI-StateId,
  qcl-Type1 QCL-Info,
  qcl-Type2 QCL-Info OPTIONAL, -- Need R
  ...
}
QCL-Info ::= SEQUENCE {
  cell ServCellIndex OPTIONAL, -- Need R
  bwp-Id BWP-Id OPTIONAL, -- Cond CSI-RS-Indicated
  referenceSignal CHOICE {
    csi-rs NZP-CSI-RS-ResourceId,
    ssb SSB-Index
  },
  qcl-Type ENUMERATED {typeA, typeB, typeC, typeD},
  ...
}

Figure 6A:
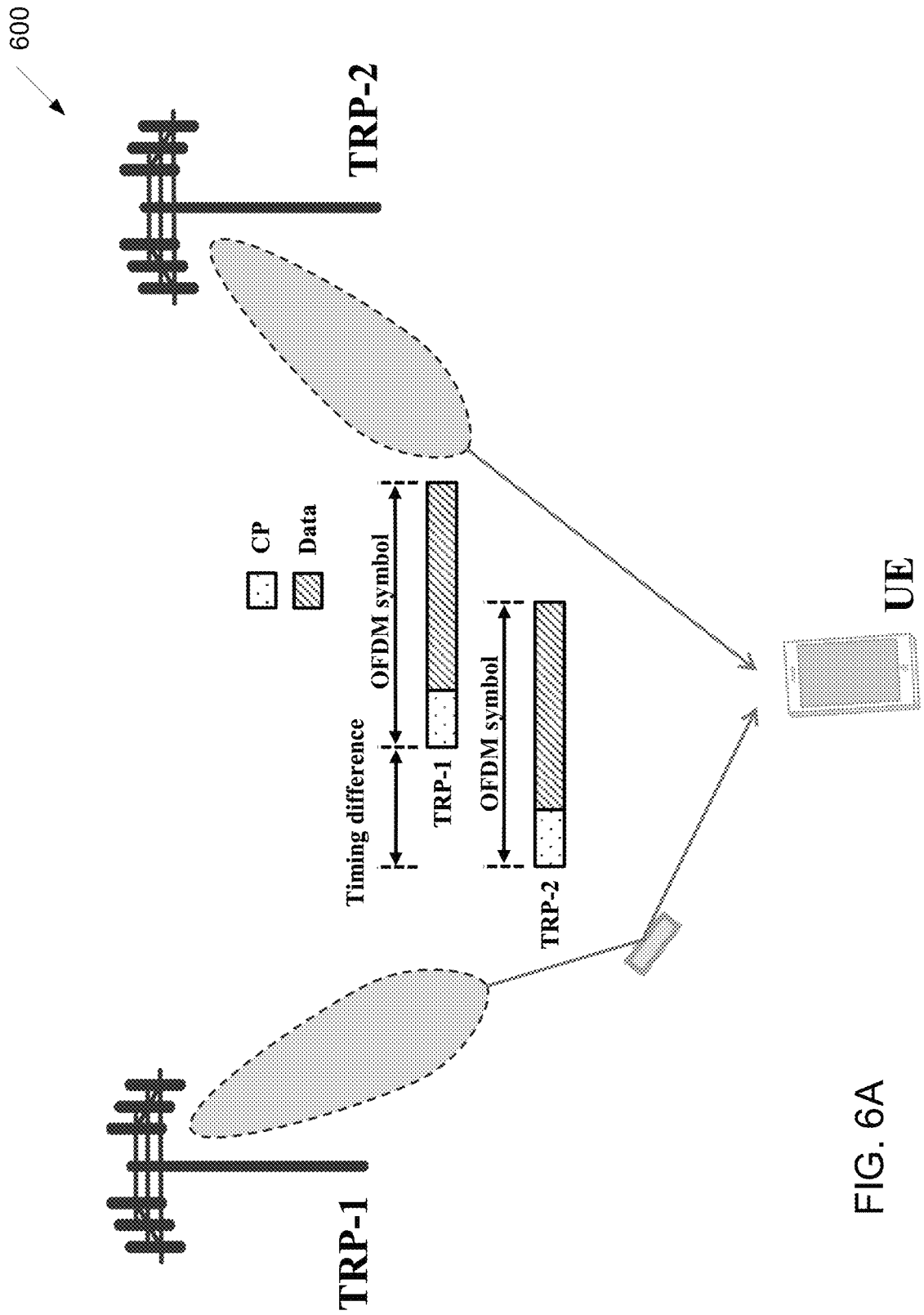
FIG. 6A illustrates an example multi-TRP operation according to embodiments of the present disclosure.

FIG. 6A illustrates an example multi-TRP operation 600 according to embodiments of the present disclosure. An embodiment of the multi-TRP operation 600 shown in FIG. 6A is for illustration only.

As illustrated in FIG. 6A, an example of multi-TRP transmission is provided assuming that a UE is communicating with two TRPs through one or more transmission-reception (TX-RX) communication links. In a multi-TRP system, the UE could simultaneously receive from the TRPs various types of channels/RSs. For instance, for a multi-TRP system comprising of two TRPs, the following embodiments are provided.

In one example, the UE could receive a SSB from one TRP, and at the same time receive a SSB from the other TRP.

In another example, the UE could receive a CSI-RS such as a TRS from one TRP, and at the same time receive a CSI-RS such as a TRS from the other TRP.

In yet another example, the UE could receive a SSB from one TRP, and at the same time receive a CSI-RS such as a TRS from the other TRP.

In yet another example, the UE could receive a SSB from one TRP, and at the same time receive a PDCCH (DMRS) from the other TRP.

In yet another example, the UE could receive a SSB from one TRP, and at the same time receive a PDSCH (DMRS) from the other TRP.

In yet another example, the UE could receive a CSI-RS such as a TRS from one TRP, and at the same time receive a PDCCH (DMRS) from the other TRP.

In yet another example, the UE could receive a CSI-RS such as a TRS from one TRP, and at the same time receive a PDSCH (DMRS) from the other TRP.

Furthermore, in a multi-TRP system, different TRPs could be placed at different physical locations and connected through ideal/non-ideal backhauls. As discussed above, in the 3GPP Rel.15/16 TCI framework, only the RS(s) transmitted from the serving cell/TRP (e.g., configured with a valid ServCellIndex in the QCL-Info) can be QCL'ed. The RS(s) transmitted from a non-serving (or neighboring) cell or a non-serving (or neighboring) cell TRP cannot be configured as the QCL source RS(s) because the non-serving (or neighboring) cell(s) or the non-serving (or neighboring) cell TRP(s) could broadcast/be associated with different PCI(s) from that of the serving cell and/or may not be associated with valid ServCellIndex. One solution could be to enforce all downlink RSs/channels transmitted from all cells/TRPs only QCL'ed with the RS s transmitted from the serving cell or the serving cell TRP. This solution, however, may not work because the downlink channels between different TRPs could be very different (different TRPs could be typically geographically non-co-located and loosely time synchronized).

Figure 6B:
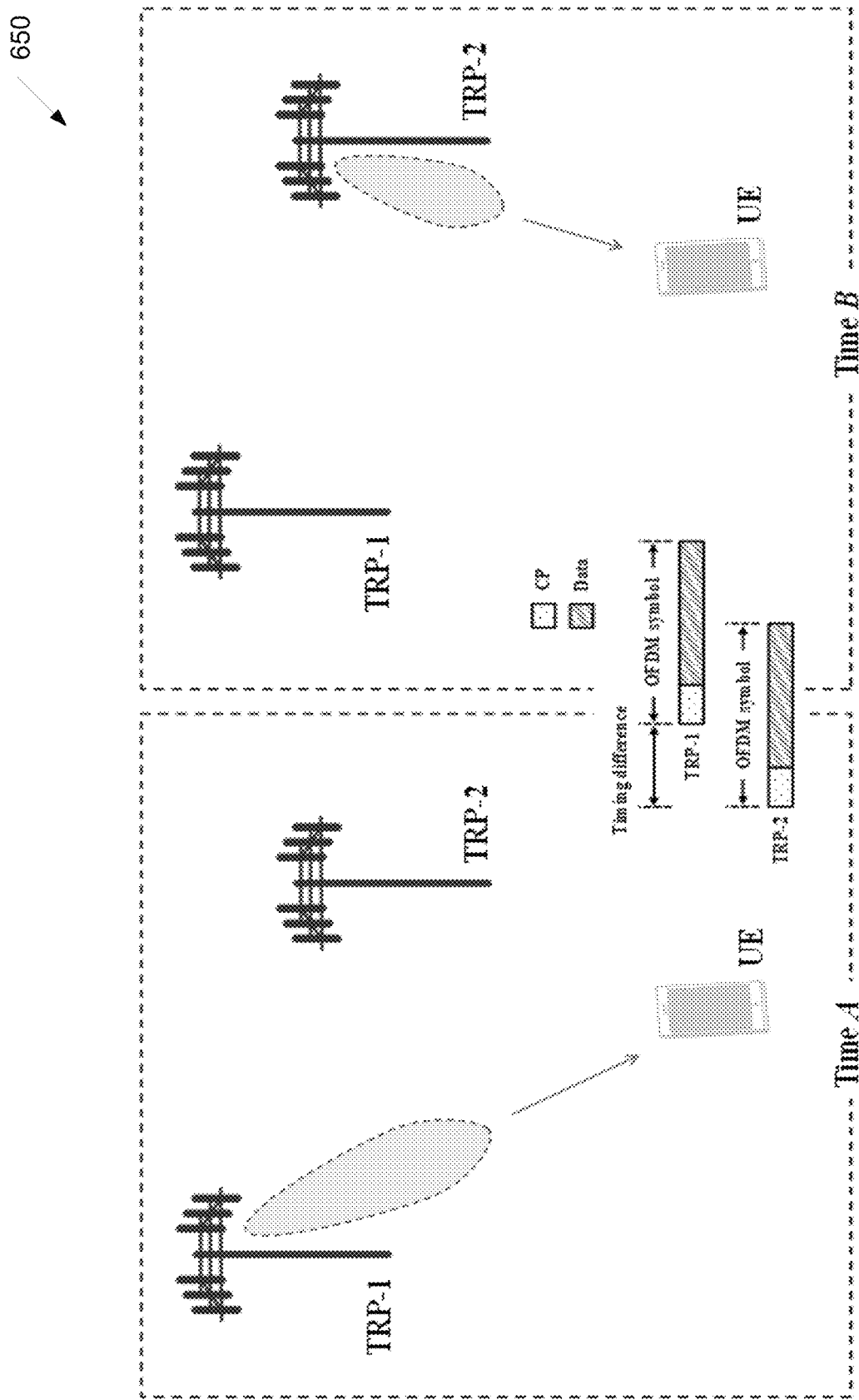
FIG. 6B illustrates another example multi-TRP operation according to embodiments of the present disclosure.

FIG. 6B illustrates an example multi-TRP operation 650 according to embodiments of the present disclosure. An embodiment of the multi-TRP operation 650 shown in FIG. 6B is for illustration only.

As illustrated in FIG. 6B, an example of dynamic point selection (DPS) is presented. It is shown in FIG. 6B that in a DPS system, a UE could receive from one TRP at a time (e.g., in a slot/mini-slot/symbol), and the UE could receive from different TRPs in different (time) slots/mini-slots/symbols. In a DPS system, the UE could receive from different TRPs various types of channels/RSs. For instance, for a DPS system comprising of two TRPs, the following embodiments are provided.

In one example, the UE could receive a SSB from one TRP in one slot/mini-slot/symbol and receive a SSB from the other TRP in a different slot/mini-slot/symbol.

In another example, the UE could receive a CSI-RS such as a TRS from one TRP in one slot/mini-slot/symbol and receive a CSI-RS such as a TRS from the other TRP in a different slot/mini-slot/symbol.

In yet another example, the UE could receive a SSB from one TRP in one slot/mini-slot/symbol and receive a CSI-RS such as a TRS from the other TRP in a different slot/mini-slot/symbol.

In yet another example, the UE could receive a SSB from one TRP in one slot/mini-slot/symbol and receive a PDCCH (DMRS) from the other TRP in a different slot/mini-slot/symbol.

In yet another example, the UE could receive a SSB from one TRP in one slot/mini-slot/symbol and receive a PDSCH (DMRS) from the other TRP in a different slot/mini-slot/symbol.

In yet another example, the UE could receive a CSI-RS such as a TRS from one TRP in one slot/mini-slot/symbol and receive a PDCCH (DMRS) from the other TRP in a different slot/mini-slot/symbol.

In yet another example, the UE could receive a CSI-RS such as a TRS from one TRP in one slot/mini-slot/symbol and receive a PDSCH (DMRS) from the other TRP in a different slot/mini-slot/symbol.

Figure 7:
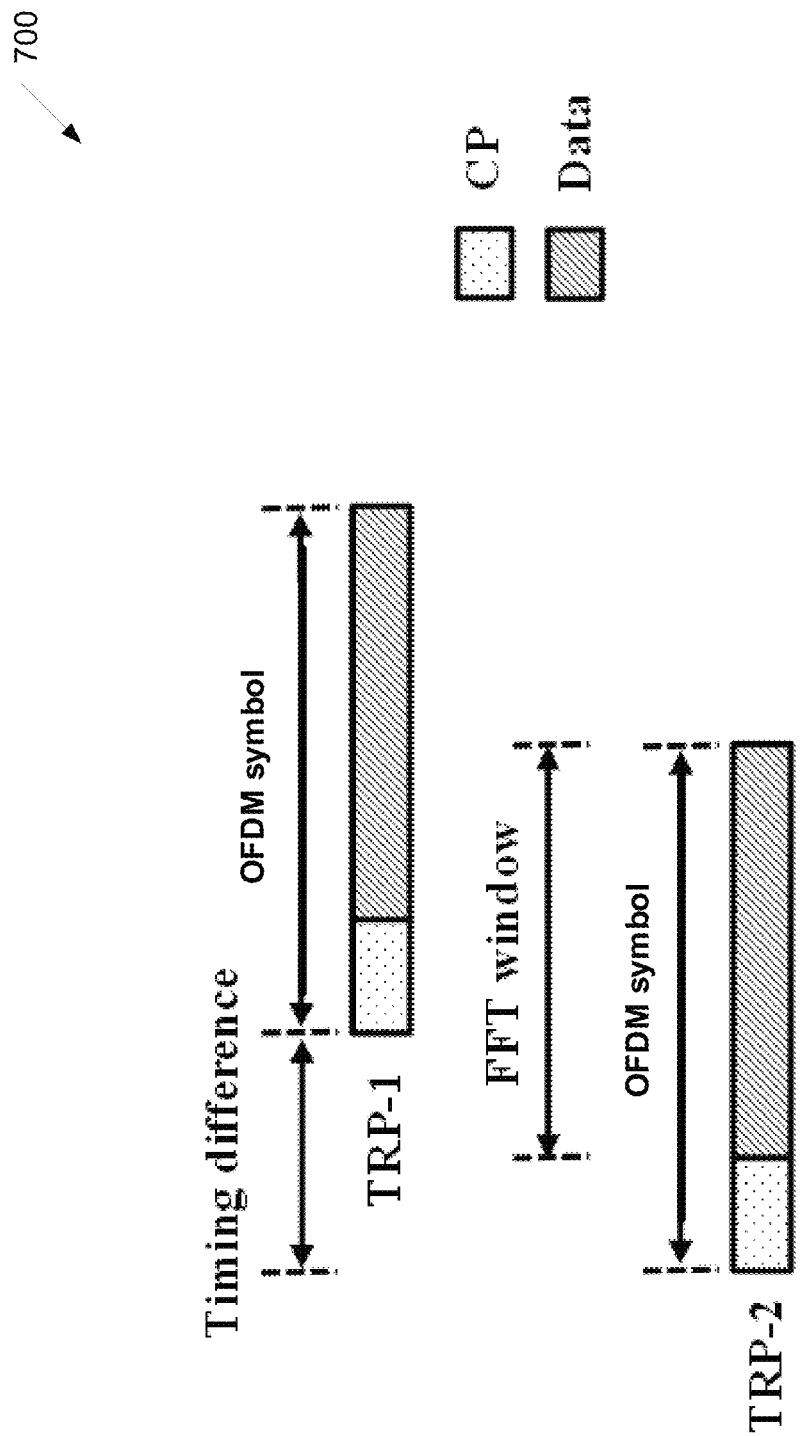
FIG. 7 illustrates an example receive timing or FFT window position configurations according to embodiments of the present disclosure.

FIG. 7 illustrates an example receive timing or FFT window position configurations 700 according to embodiments of the present disclosure. An embodiment of the receive timing or the FFT window position configurations 700 shown in FIG. 7 is for illustration only.

As illustrated in FIG. 6A, the receive timing difference (observed at the UE) between the RSs/channels simultaneously transmitted from the two coordinating TRPs, i.e., TRP-1 and TRP-2 in the multi-TRP system, could be large, e.g., much larger than the cyclic prefix (CP), especially at FR2 with very short symbol duration and sharp beams. In this case, if the UE, e.g., uses the RSs from TRP-2 as the QCL source RSs to process the RS(s)/channels(s) transmitted from TRP-1, e.g., using a common FFT window/receive timing derived based on the QCL source RS(s) from TRP-2 to process the RS(s)/channels(s) transmitted from TRP-1 (see the example shown in FIG. 7 with overlapping data blocks transmitted from TRP-1 and TRP-2), significant inter-symbol interference could be resulted.

As shown in FIG. 6B, the receive timing difference (observed at the UE) between the RSs/channels transmitted from the two TRPs, i.e., TRP-1 and TRP-2 in the DPS system, could be much larger than the CP length, especially at FR2 with very short symbol duration and sharp beams. In this case, if the UE, e.g., uses the RSs from TRP-2 as the QCL source RSs to process the RS(s)/channel(s) transmitted from TRP-1, e.g., using the same FFT window/receive timing derived based on the QCL source RS(s) from TRP-2 to process the RS(s)/channel(s) transmitted from TRP-1 (see the example shown in FIG. 7 with overlapping data blocks transmitted from TRP-1 and TRP-2), significant inter-symbol interference could be resulted. For both the examples shown in FIG. 6A (multi-TRP) and FIG. 6B (DPS), implementing separate timing assumptions, e.g., separate FFT windows/receive timings, to receive the RSs/channels from different TRPs, however, is costly.

Hence, if the receive timing difference at the UE is large, there is a need to adjust/align the transmit timing(s) of the TRPs in either a multi-TRP system or a DPS system such that the signals transmitted from different TRPs could arrive at the UE at the same time and/or the UE could use a common/the same FFT window/receive timing assumption to process the RSs/channels transmitted from different TRPs with minimal inter-symbol interference. In practical systems operating at various frequencies, (1) the channel condition could vary fast due to UE's mobility and rotation, resulting in significantly different propagation delays between different TRPs and the UE, and (2) the timing offset/drift could frequently occur at each individual TRP due to hardware impairments and temperature variations. These two aspects need to be considered when designing efficient downlink transmit timing adjustment strategies.

In the present disclosure, a multi-TRP system/operation/transmission could correspond to at least one of the following: (1) a multi-TRP system/operation/transmission could simply refer to as a system comprising multiple cells/TRPs; (2) in a multi-TRP system, the UE could simultaneously receive from different TRPs various types of channels/RSs; such a multi-TRP system/operation/transmission can also be referred to as a non-coherent joint-transmission (NC-JT) system/operation/transmission; (3) in a multi-TRP system, the UE could receive from different TRPs various types of channels/RSs in different (time) slots/mini-slots/symbols/etc.; such a multi-TRP system/operation/transmission can also be referred to as the aforementioned DPS system/operation/transmission; and (4) in a multi-TRP system, different cells/TRPs could broadcast/be associated with different PCIs and/or one or more cells/TRPs could broadcast/be associated with different PCIs from that of the serving cell/TRP and/or one or more cells/TRPs are not associated with valid ServCellIndex; such a multi-TRP system/operation/transmission can also be referred to as the aforementioned inter-cell system/operation/transmission.

In the present disclosure, several network side transmit timing adjustment strategies along with their corresponding UE reporting formats are developed for the multi-TRP operation under various assumptions on the receive timing difference. The receive timing difference is resulted from: (1) the signals transmitted from different TRPs could experience different propagation delays, and therefore, arrive at the UE at different time instants (e.g., different slots/mini-slots/symbols), and (2) the exact timing at each individual TRP could be drifted/offset due to temperature change and hardware impairments—true timing difference (TTD). Two baseline UE side settings are considered in this disclosure, which are: (1) a single FFT window/receive timing per radio frequency (RF) chain is implemented at the UE to receive and process the multi-TRP transmissions; and (2) multiple FFT windows/receive timings per RF chain are implemented at the UE to receive and process the multi-TRP transmissions.

An overall procedure of the receive timing difference measurement, estimation and reporting is presented as follows. The UE could be first configured/indicated by the network, to measure one or more RSs such as SSBs and CSI-RSs and/or one or more channels such as PDCCHs (DMRSs) and PDSCHs (DMRSs) from different cells/TRPs in the multi-TRP system such as the serving cell/TRP and the non-serving (or neighboring) cell(s)/TRP(s) for the receive timing difference estimation. That is, the UE could measure X's from one or more TRPs to obtain the receive timing(s) $t\_x$'s, and Y's from the other TRPs in the multi-TRP system to obtain the receive timing(s) $t\_y$'s; the UE could then compute the receive timing difference based on $t\_x$'s and $t\_y$'s. Here, X could be SSB, CSI-RS such as TRS, PDCCH (DMRS) or PDSCH (DMRS), and Y could be SSB, CSI-RS such as TRS, PDCCH (DMRS) or PDSCH (DMRS). More specifically, to obtain the receive timing difference, the following embodiments are provided.

In one example, the UE could measure SSB(s) from one or more TRPs to obtain the receive timing(s) $t\_x$'s, and SSB(s) from the other TRPs in the multi-TRP system to obtain the receive timing(s) $t\_y$'s; the UE could then compute the receive timing difference based on $t\_x$'s and $t\_y$'s.

In another example, the UE could measure SSB(s) from one or more TRPs to obtain the receive timing(s) $t\_x$'s, and CSI-RS(s) such as TRS(s) from the other TRPs in the multi-TRP system to obtain the receive timing(s) $t\_y$'s; the UE could then compute the receive timing difference based on $t\_x$'s and $t\_y$'s.

In yet another example, the UE could measure SSB(s) from one or more TRPs to obtain the receive timing(s) $t\_x$'s, and PDCCH(s) (DMRS(s)) from the other TRPs in the multi-TRP system to obtain the receive timing(s) $t\_y$'s; the UE could then compute the receive timing difference based on $t\_x$'s and $t\_y$'s.

In yet another example, the UE could measure SSB(s) from one or more TRPs to obtain the receive timing(s) $t\_x$'s, and PDSCH(s) (DMRS(s)) from the other TRPs in the multi-TRP system to obtain the receive timing(s) $t\_y$'s; the UE could then compute the receive timing difference based on $t\_x$'s and $t\_y$'s.

In yet another example, the UE could measure CSI-RS(s) such as TRS(s) from one or more TRPs to obtain the receive timing(s) $t\_x$'s, and CSI-RS(s) such as TRS(s) from the other TRPs in the multi-TRP system to obtain the receive timing(s) $t\_y$'s; the UE could then compute the receive timing difference based on $t\_x$'s and $t\_y$'s.

In yet another example, the UE could measure CSI-RS(s) such as TRS(s) from one or more TRPs to obtain the receive timing(s) $t\_x$'s, and PDCCH(s) (DMRS(s)) from the other TRPs in the multi-TRP system to obtain the receive timing(s) $t\_y$'s; the UE could then compute the receive timing difference based on $t\_x$'s and $t\_y$'s.

In yet another example, the UE could measure CSI-RS(s) such as TRS(s) from one or more TRPs to obtain the receive timing(s) t_x's, and PDSCH(s) (DMRS(s)) from the other TRPs in the multi-TRP system to obtain the receive timing(s) t_y's; the UE could then compute the receive timing difference based on t_x's and t_y's.

In yet another example, the UE could measure PDCCH(s) (DMRS(s)) from one or more TRPs to obtain the receive timing(s) t_x's, and PDCCH(s) (DMRS(s)) from the other TRPs in the multi-TRP system to obtain the receive timing(s) t_y's; the UE could then compute the receive timing difference based on t_x's and t_y's.

In yet another example, the UE could measure PDSCH(s) (DMRS(s)) from one or more TRPs to obtain the receive timing(s) t_x's, and PDSCH(s) (DMRS(s)) from the other TRPs in the multi-TRP system to obtain the receive timing(s) t_y's; the UE could then compute the receive timing difference based on t_x's and t_y's.

In yet another example, the UE could measure PDCCH(s) (DMRS(s)) from one or more TRPs to obtain the receive timing(s) t_x's, and PDSCH(s) (DMRS(s)) from the other TRPs in the multi-TRP system to obtain the receive timing(s) t_y's; the UE could then compute the receive timing difference based on t_x's and t_y's.

Based on the measurements, the UE could generate a receive timing difference report and send it to the network through various uplink channels such as PUCCH, PUSCH, PRACH and/or L2 signaling such as MAC CE and etc. The receive timing difference report could also include information of its target cell/TRP (e.g., the PCI of the target cell/TRP). The uplink channels such as PUCCH could be associated with different TRPs via higher layer signaling index such as CORESETPoolIndex. In this case, the UE could transmit the receive timing difference report over the corresponding uplink channels associated with the target cell/TRP, and the explicit indication of the target cell/TRP may no longer be needed. Furthermore, the receive timing difference report could also comprise of another indication to instruct the target TRP(s) of the receive timing difference report to advance or back off their transmit timing according to the reported receive timing difference. Alternatively, either timing advance or timing back-off could be pre-configured and known to both the network and UE sides a priori, and in this case, the aforementioned explicit indication may no longer be needed. Upon receiving the receive timing difference report, the corresponding/target TRP(s) could adjust their timing(s) when transmitting the corresponding RS(s)/channel(s). The UE could be indicated by the network, whether the network, or the corresponding/target TRP(s), has applied the timing adjustment. The UE could also be configured/indicated by the network, one or more FFT window positions/receive timing assumptions. The UE could apply the one or more FFT windows/receive timings per RF chain/antenna panel (e.g., applying a single FFT window/receive timing derived from the serving cell/TRP) to receive and process the transmissions from different cells/TRPs.

To generate a receive timing difference report, the UE could compare the receive timing difference with the CP length. For instance, if the receive timing difference is beyond the CP, or the receive timing difference is larger than the CP by a certain threshold, the UE could send to the network the receive timing difference report along with any necessary indications. Optionally, the UE can report to the network whether the receive timing difference exceeds a certain threshold or not wherein the threshold could be higher layer configured by the network (e.g., via higher layer RRC signaling) and/or dynamically indicated via MAC CE, UE-common DCI and/or UE-dedicated DCI.

Furthermore, the UE could be configured and/or triggered by the network to send the receive timing difference report. For instance, if backhaul latency between different TRPs in a multi-TRP system is beyond a certain threshold, the UE could be triggered by the network to transmit the receive timing difference report. For another example, the UE could first signal to the network their capability of applying a single FFT window/receive timing or multiple FFT windows/receive timings per RF chain to handle the multi-TRP transmission. Based on the UE's capability signaling/reporting and/or the backhaul latency, the UE would be configured and/or triggered by the network to transmit the receive timing difference report. The receive timing difference report could be triggered along with the aperiodic CSI request, and could correspond to one or more aperiodic CSI request trigger states.

The UE could receive from the network additional indication(s)/configuration(s) to generate and report the receive timing difference. For instance, each TRP could first measure reception time of one or more uplink channels/RSs such as PUCCH/PUSCH/PRACH/SRS/PLRS transmitted from the UE. The uplink channels/RSs could be TRP-specific such that they are associated with each TRP via a higher layer signaling index such as CORESETPoolIndex. Each TRP could then determine a TRP-specific uplink timing difference (TD), which is computed as the time difference between the reception time of the uplink channels/RSs transmitted from the UE and a reference time. The reference time could be common or different between different TRPs.

For instance, the TRP-specific reference time could be configured as the starting time of a subframe/slot of the corresponding TRP, and in this case, the TRP-specific uplink TD could be identical to TRP-specific uplink timing advance (TA). The UE, could receive from the network (e.g., via random access response (RAR) and/or MAC CE) the TRP-specific uplink TD, and/or the TRP-specific uplink TA, and/or the exact reception time of the uplink channels/RSs observed at each TRP. The UE can generate the receive timing difference report based on the indicated TRP-specific uplink TD, and/or the TRP-specific uplink TA, and/or the exact reception time of the uplink channels/RSs observed at each TRP. The UE can then send to the network the receive timing difference report.

As aforementioned, the UE could be indicated by the network to measure one or more RSs such as SSBs and CSI-RSs and/or one or more channels such as PDCCHs (DMRSs) and PDSCHs (DMRSs) from one or more TRPs in the multi-TRP system to estimate their receive timing difference(s); this indication could be via higher layer (RRC) or/and MAC CE or/and DCI based signaling or/and any combination of at least two of RRC, MAC CE and DCI based signaling; this indication could be via a separate (dedicated) parameter or joint with another parameter based on following examples.

In one example, the UE could be higher layer RRC configured by the network or dynamically indicated by the network via MAC CE or DCI the one or more TRPs to conduct the receive timing/receive timing difference(s) measurement/estimation.

In another example, the UE could be first higher layer RRC configured by the network a list/set/pool of TRP-specific IDs such as PCIs, CORESETPoolIndex values and etc. The UE could then receive from the network a MAC CE activation command and/or a bitmap activating one or more TRPs (in form of their PCIs, CORESETPoolIndex values and etc.) from the higher layer RRC configured list/set/pool of TRP-specific IDs to conduct the receive timing/receive timing difference(s) measurement/estimation.

In yet another example, the UE could be higher layer RRC configured by the network or dynamically indicated by the network via MAC CE or DCI the one or more RSs (including SSBs and CSI-RSs) and/or the one or more channels (including PDCCHs and PDSCHs) from the one or more TRPs to conduct the receive timing/receive timing difference(s) measurement/estimation.

In yet another example, the UE could be first higher layer configured by the network a list/set/pool of RSs (e.g., in form of their RS IDs) from the one or more TRPs. The UE could then receive from the network a MAC CE activation command and/or a bitmap activating one or more RSs (e.g., in form of their RS IDs) from the higher layer RRC configured list/set/pool of RSs to conduct the receive timing/receive timing difference(s) measurement/estimation. Alternatively, the UE could be first higher layer configured by the network a list/set/pool of channels including PDCCHs and PDSCHs (e.g., in form of their DMRS IDs) from the one or more TRPs. The UE could then receive from the network a MAC CE activation command and/or a bitmap activating one or more channels including PDCCHs and PDSCHs (e.g., in form of their DMRS IDs) from the higher layer RRC configured list/set/pool of channels including PDCCHs and PDSCHs to conduct the receive timing/receive timing difference(s) measurement/estimation.

In yet another example, the UE could be higher layer RRC configured by the network or dynamically indicated by the network via MAC CE or DCI one or more CSI resource settings (e.g., via the higher layer parameters CSI-ResourceConfig's) for the one or more TRPs, wherein the RS(s) such as SSB(s) and CSI-RS(s) indicated therein are used by the UE to conduct the receive timing/receive timing difference(s) measurement/estimation. Alternatively, the UE could be higher layer RRC configured by the network or dynamically indicated by the network via MAC CE or DCI one or more CSI-RS resource sets (e.g., via the higher layer parameters CSI-SSB-ResourceSet's/NZP-CSI-RS-ResourceSet's/CSI-IM-ResourceSet's) for the one or more TRPs, wherein the RS(s) such as SSB(s) and CSI-RS(s) indicated therein are used by the UE to conduct the receive timing/receive timing difference(s) measurement/estimation.

In yet another example, the UE could be first higher layer configured by the network a list/set/pool of CSI resource settings (e.g., via the higher layer parameters CSI-ResourceConfig's) for the one or more TRPs. The UE could then receive from the network a MAC CE activation command and/or a bitmap activating one or more CSI resource settings (e.g., via the higher layer parameters CSI-ResourceConfig's) from the higher layer RRC configured list/set/pool of CSI resource settings. The UE could use the RS(s) such as SSB(s) and CSI-RS(s) indicated in the activated one or more CSI resource settings to conduct the receive timing/receive timing difference(s) measurement/estimation.

Alternatively, the UE could be first higher layer configured by the network a list/set/pool of CSI-RS resource sets (e.g., via the higher layer parameters CSI-SSB-ResourceSet's/NZP-CSI-RS-ResourceSet's/CSI-IM-ResourceSet's) for the one or more TRPs. The UE could then receive from the network a MAC CE activation command and/or a bitmap activating one or more CSI-RS resource sets (e.g., via the higher layer parameters CSI-SSB-ResourceSet's/NZP-CSI-RS-ResourceSet's/CSI-IM-ResourceSet's) from the higher layer RRC configured list/set/pool of CSI-RS resource sets. The UE could use the RS(s) such as SSB(s) and CSI-RS(s) indicated in the activated one or more CSI-RS resource sets to conduct the receive timing/receive timing difference(s) measurement/estimation.

In yet another example, a one-bit flag indicator could be included/indicated in a CSI resource setting, e.g., in the corresponding higher layer parameter CSI-ResourceConfig, to indicate to the UE whether the RS(s) such as SSB(s) and CSI-RS(s) indicated therein is for estimating the receive timing/receive timing difference(s). Alternatively, a one-bit flag indicator could be included/indicated in a CSI-RS resource set, e.g., in the corresponding higher layer parameter CSI-SSB-ResourceSet/NZP-CSI-RS-ResourceSet/CSI-IM-ResourceSet, to indicate to the UE whether the RS(s) such as SSB(s) and CSI-RS(s) indicated therein is for estimating the receive timing/receive timing difference(s).

In yet another example, the UE could be indicated by the network a starting time (e.g., a starting slot/mini-slot/symbol) from which the UE could/would start measuring the one or more RSs/channels from different TRPs to conduct the receive timing/receive timing difference(s) measurement/estimation. Furthermore, the UE could be indicated by the network an ending time (e.g., an ending slot/mini-slot/symbol) beyond which the UE could/would not conduct the receive timing/receive timing difference(s) measurement/estimation. Alternatively, the UE could be indicated by the network one or more time windows during which the UE could/would measure the one or more RSs/channels from different TRPs to conduct the receive timing/receive timing difference(s) measurement/estimation.

The UE could also be indicated by the network one or more timers; when the timer(s) starts/is enabled, the UE could/would start measuring the one or more RSs/channels from different TRPs to conduct the receive timing/receive timing difference(s) measurement/estimation; when the timer(s) ends/is reset, the UE could/would stop measuring/estimating the receive timing/receive timing difference(s). The aforementioned indication(s) could be via higher layer (RRC) or/and MAC CE or/and DCI based signaling or/and any combination of at least two of RRC, MAC CE and DCI based signaling; the aforementioned indication(s) could be via a separate (dedicated) parameter or joint with another parameter.

Figure 8A:
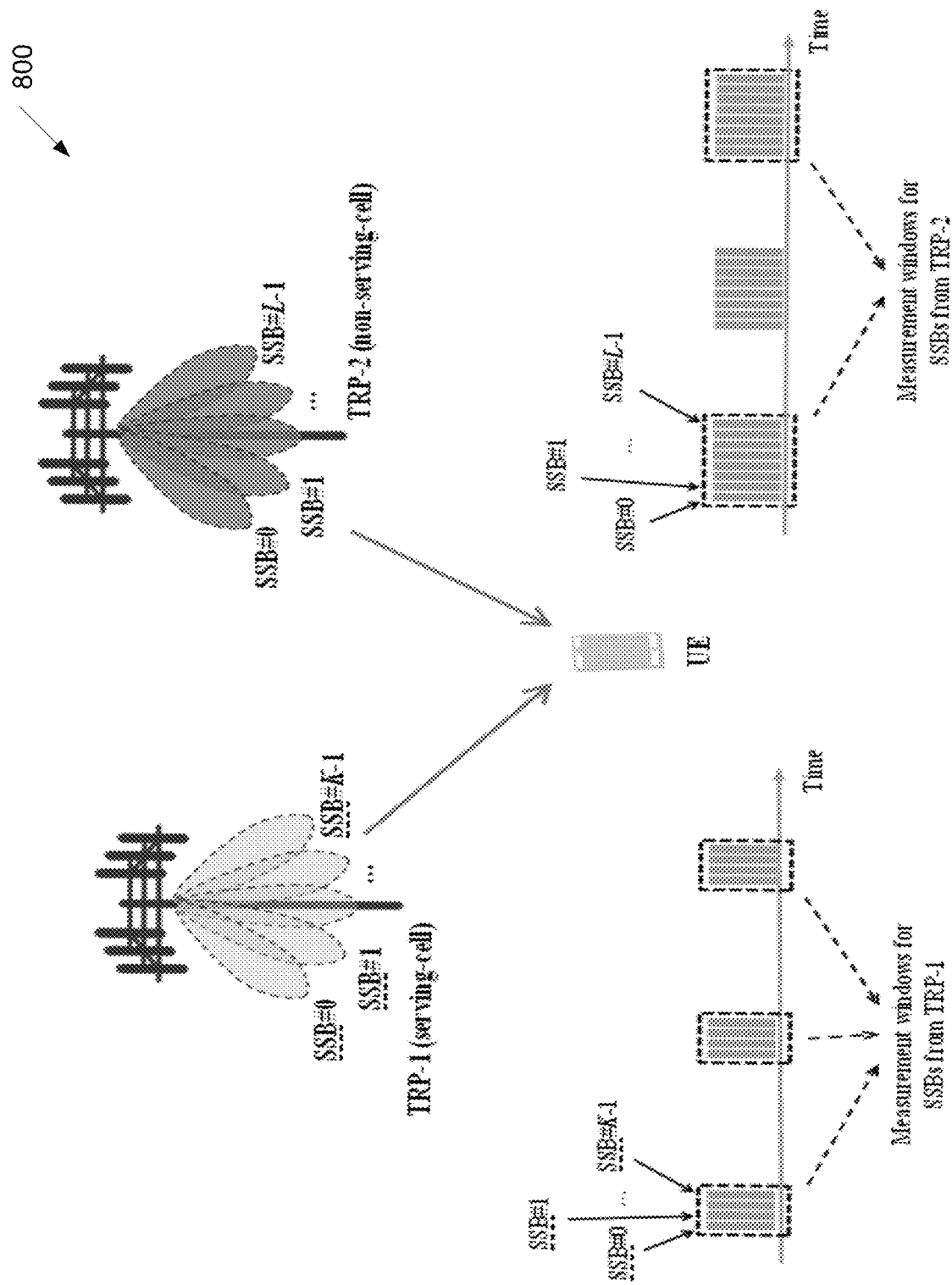
FIG. 8A illustrates an example measurement timing configurations for SSBs according to embodiments of the present disclosure.

FIG. 8A illustrates an example measurement timing configurations for SSBs 800 according to embodiments of the present disclosure. An embodiment of the measurement timing configurations for the SSBs 800 shown in FIG. 8A is for illustration only.

Figures 8B, 8C:
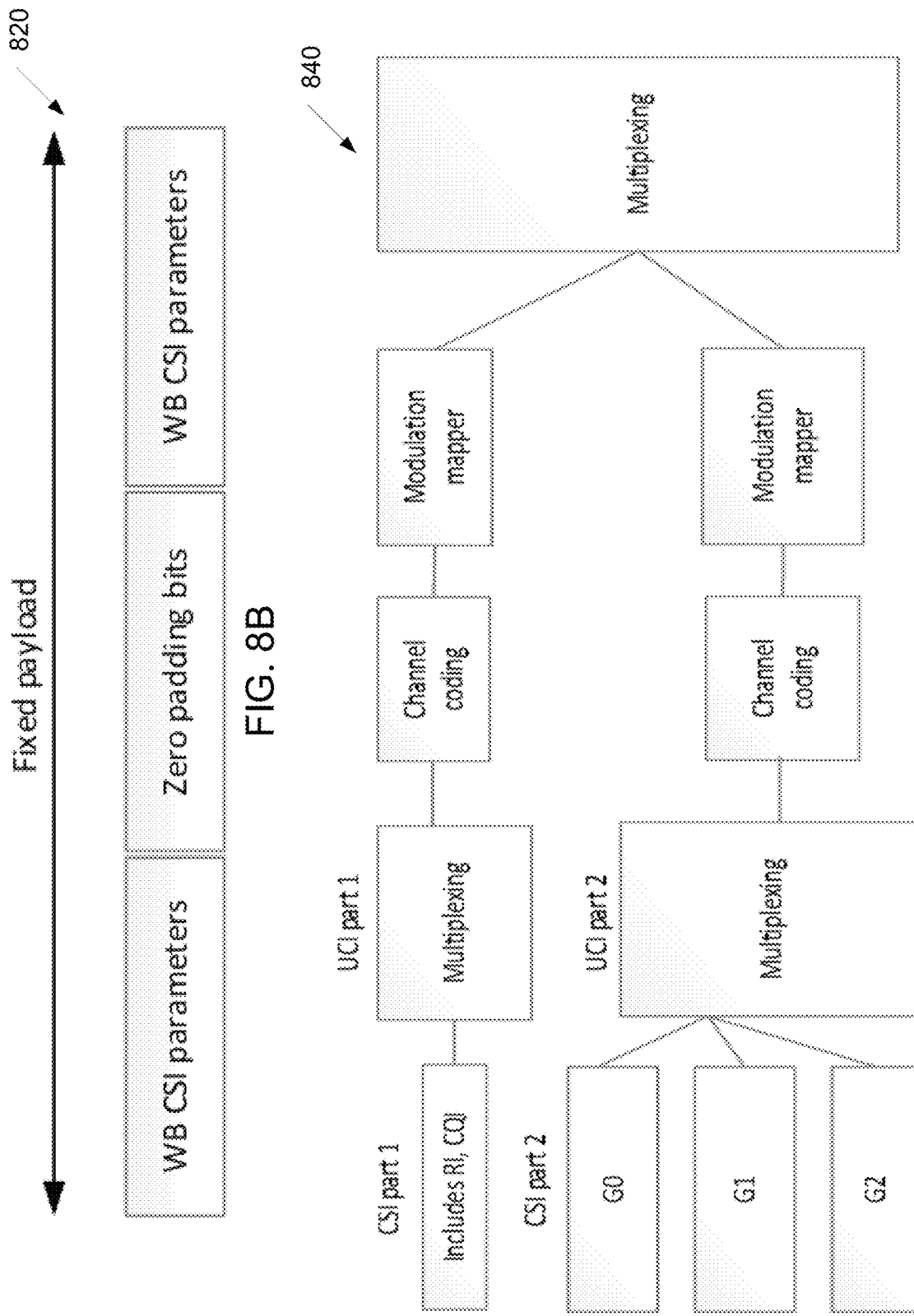
FIG. 8B illustrates an example wideband (WB) CSI configuration according to embodiments of the present disclosure.
FIG. 8C illustrates an example two-part UCI or two-part narrowband (NB) CSI according to embodiments of the present disclosure.

FIG. 8B illustrates an example wideband (WB) CSI configuration 820 according to embodiments of the present disclosure. An embodiment of the WB CSI configuration 820 shown in FIG. 8B is for illustration only.

FIG. 8C illustrates an example two-part UCI or two-part narrowband (NB) CSI 840 according to embodiments of the present disclosure. An embodiment of the two-part UCI or the two-part NB CSI 840 shown in FIG. 8C is for illustration only.

In FIG. 8A, an illustrative example of UE measuring the SSBs from both the serving cell TRP-1 and the non-serving (or neighboring) cell TRP-2 in a multi-TRP system comprising of two TRPs is presented. In this example, TRP-1 and TRP-2 have different SSB configurations. For instance, the total number of SSBs in a SSB burst (denoted by K) of TRP-1 (SSB #0, SSB #1, . . . , SSB #K−1) is different from that (denoted by L) of TRP-2 (SSB #0, SSB #1, . . . , SSB #L−1), i.e., K≠L. The periodicities of the SSB bursts of TRP-1 and TRP-2 are also different. The UE is configured by the network one or more measurement windows to measure the SSBs from each TRP. The measurement window configured for measuring the SSBs from a non-serving (or neighboring) cell/TRP is referred to as a SSB measurement timing configuration (SMTC) window. There are various means to configure the one or more measurement windows.

In one example, the UE could be indicated/configured by the network a single measurement window for measuring the SSBs from all cells/TRPs (including both the serving cell/TRP and the non-serving or neighboring cell(s)/TRP(s)) in the multi-TRP system; For the example shown in FIG. 8A, the UE could be indicated/configured by the network a single measurement window for measuring the SSBs from both the serving cell TRP-1 and the non-serving (or neighboring) cell TRP-2.

In another example, the UE could be indicated/configured by the network separate/different measurement windows for measuring the SSBs from different cells/TRPs in the multi-TRP system. For example, the UE could be indicated/configured by the network a measurement window for the serving cell/TRP, and a different measurement window for the non-serving or neighboring cell(s)/TRP(s) in the multi-TRP system. For another example, the UE could be indicated/configured by the network a measurement window for the serving cell/TRP; the UE could also be indicated/configured by the network N_nsc separate/different measurement windows (i.e., SMTC windows) each for a non-serving (or neighboring) cell/TRP in the multi-TRP system, where N_nsc denotes the number of non-serving (or neighboring) cells/TRPs—e.g., selected/configured for the receive timing/receive timing difference(s) measurement—in the multi-TRP system. Different measurement windows shall not be overlapping in the time domain.

As illustrated in the example shown in FIG. 8A, the measurement window configured for TRP-2 would cover all L SSBs (SSB #0, SSB #1, . . . , SSB #L−1) in the time domain, and the periodicity of the measurement window is twice of that of the SSB burst. The measurement window configured for TRP-1 would cover all K SSBs (SSB #0, SSB #1, . . . , SSB #K−1) in the time domain, and the periodicity of the measurement window is the same as that of the SSB burst. Other measurement window configurations are also possible, and the UE could be restricted from being scheduled for other channels during the measurement windows. From the measured SSBs, the UE could acquire necessary time (e.g., the receive timing or the reception time) and/or frequency information and/or other parameters such as Doppler shift of the corresponding TRP. The UE could then compute the receive timing difference(s) between different TRPs such as the serving cell TRP-1 and the non-serving (or neighboring) cell TRP-2 in FIG. 8A. The UE could be configured/indicated by the network an entity identity (ID) along with the configuration/indication of a measurement window. For example, the entity ID could be indicated in the same configuration/parameter configuring the measurement window. The entity ID could correspond to a TRP-specific ID value such as PCI value, CORESETPoolIndex value, TRP ID value, TRP-specific higher layer signaling index value and etc.

Furthermore, the UE could receive from the network one or more aperiodic CSI (A-CSI) requests to indicate to the UE which/what RS resource(s) such as SSB resource(s) and CSI-RS resource(s) from the one or more TRPs to measure for receive timing/receive timing difference(s) measurement/estimation. For instance, the UE could be first higher layer configured by the network a list of A-CSI trigger states. Each candidate A-CSI trigger state in the list of A-CSI trigger states contains one or more CSI reporting settings. The UE could receive from the network one or more A-CSI triggers for the one or more TRPs via either DCI signaling or a combination of MAC CE and DCI signaling. One A-CSI trigger could indicate one candidate A-CSI trigger state in the list of A-CSI trigger states.

For example, the A-CSI trigger could be in form of an A-CSI request in DCI format 1_0, which specifies the index of the A-CSI trigger state of interest in the list of A-CSI trigger states. Upon receiving the one or more A-CSI triggers for the one or more TRPs, and therefore, the corresponding A-CSI trigger states for the one or more TRPs, the UE could determine/identify one or more CSI reporting settings associated with the A-CSI trigger state(s). The UE could then determine/identify one or more RS resources such as SSB resources and CSI-RS resources (and/or their corresponding CSI reporting setting(s)/CSI-RS resource set(s)) associated with the one or more CSI reporting settings. The determined/identified one or more RS resources such as SSB resources and CSI-RS resources are for the receive timing/receive timing difference(s) measurement/estimation. The UE could measure the one or more RS resources to obtain the receive timing(s) for the one or more TRPs, and then estimate the receive timing difference(s) between different TRPs in the multi-TRP system. There could be various means to indicate whether an A-CSI trigger or trigger state is for receive timing/receive timing difference(s) measurement/estimation.

In one example, the UE could receive from the network a MAC CE activation command/bitmap to indicate/activate one or more A-CSI trigger states from the list of higher layer configured A-CSI trigger states; the indicated/activated one or more A-CSI trigger states are for the receive timing/receive timing difference(s) measurement/estimation.

In another example, a one-bit flag could be indicated/included in the same DCI indicating the A-CSI request. For example, if the one-bit flag is enabled, e.g., set to '1', 'enabled', 'on' and etc., the A-CSI trigger or trigger state corresponding to the A-CSI request is for the receive timing/receive timing difference(s) measurement/estimation.

In yet another example, the UE is not expected to identify whether an A-CSI trigger or trigger state is for receive timing/receive timing difference(s) measurement/estimation or not. In this case, the UE could identify whether the CSI reporting setting(s) or CSI resource setting(s) or CSI-RS resource set(s) associated with the A-CSI trigger or trigger state is for receive timing/receive timing difference(s) measurement/estimation or not according to various embodiments in the present disclosure.

Figure 9A:
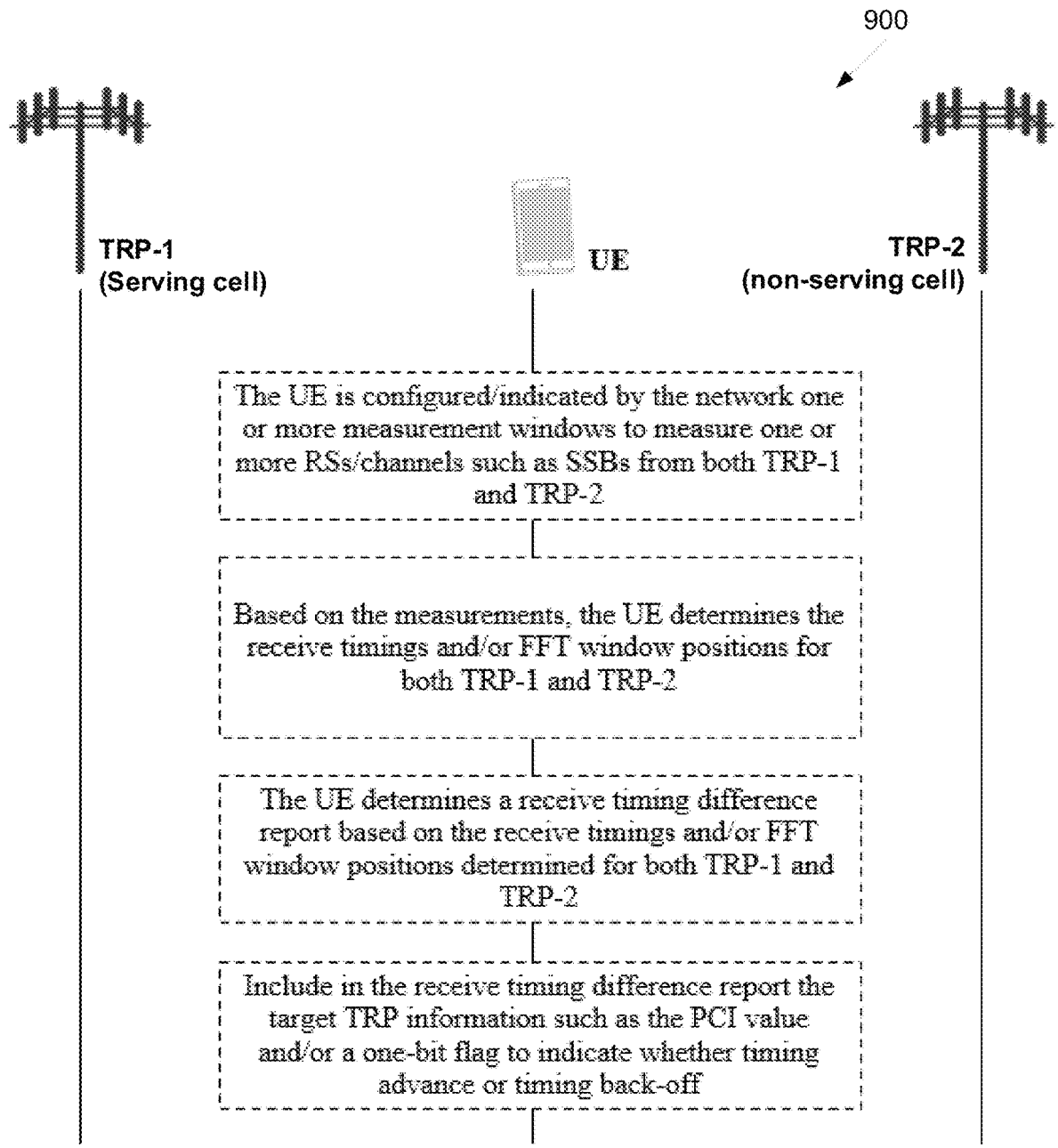
FIG. 9A illustrates an example UE determining receive timing difference report according to embodiments of the present disclosure.

FIG. 9A illustrates an example UE determining receive timing difference report procedure 900 according to embodiments of the present disclosure. The UE determining the receive timing difference report procedure 900 as may be implemented by a UE such as 111-116 as illustrated in FIG. 1. An embodiment of the UE determining the receive timing difference report procedure 900 shown in FIG. 9A is for illustration only. One or more of the components illustrated in FIG. 9A can be implemented in specialized circuitry configured to perform the noted functions or one or more of the components can be implemented by one or more processors executing instructions to perform the noted functions.

Figure 9B:
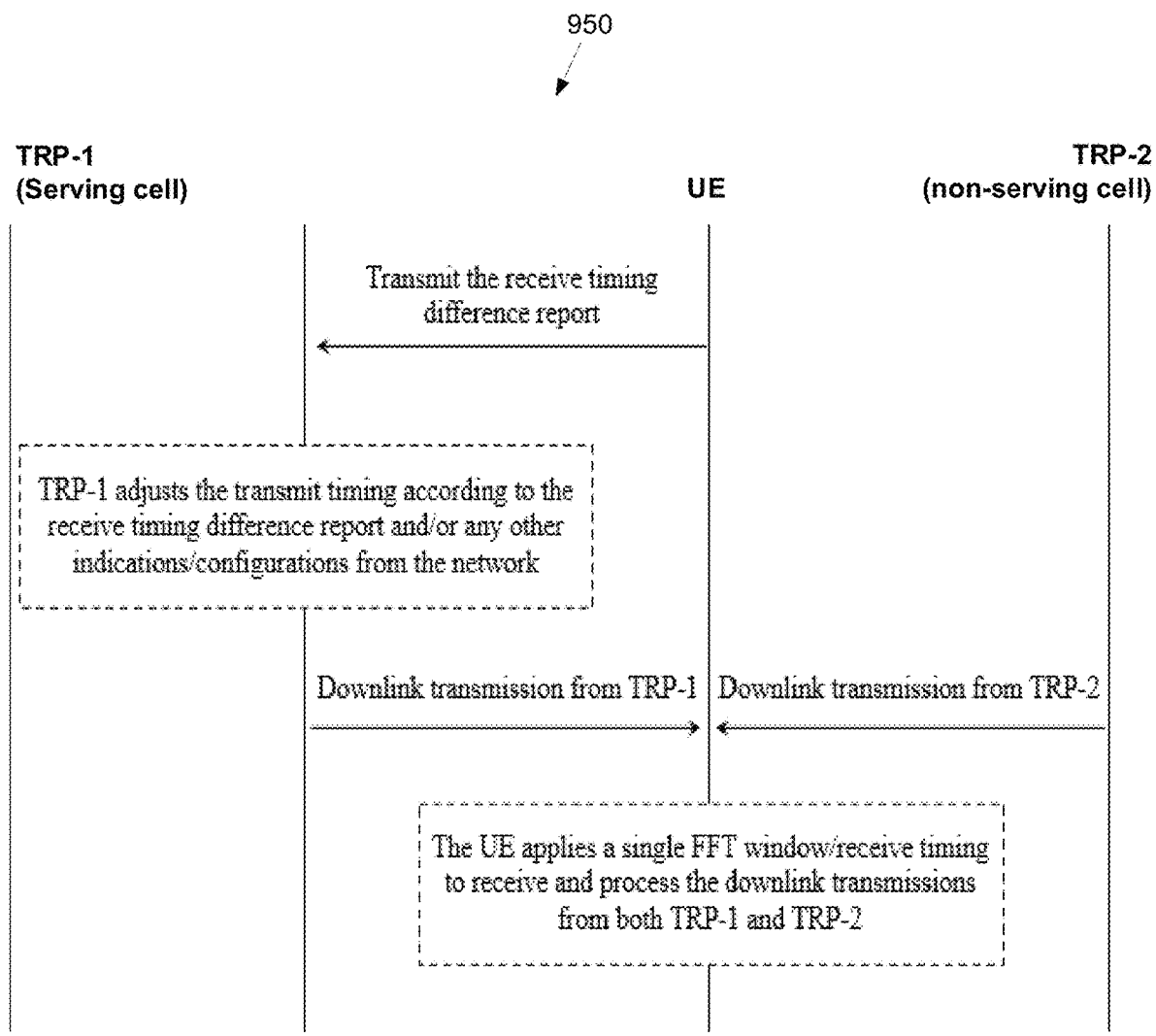
FIG. 9B illustrates an example UE reporting the receive timing difference according to embodiments of the present disclosure.

FIG. 9B illustrates an example UE reporting the receive timing difference procedure 950 according to embodiments of the present disclosure. The UE reporting the receive timing difference procedure 950 as may be implemented by a UE such as 111-116 as illustrated in FIG. 1. An embodiment of the UE reporting the receive timing difference procedure 950 shown in FIG. 9B is for illustration only. One or more of the components illustrated in FIG. 9B can be implemented in specialized circuitry configured to perform the noted functions or one or more of the components can be implemented by one or more processors executing instructions to perform the noted functions.

In FIGS. 9A and 9B, a UE reporting based network side timing adjustment design is presented for an inter-cell system comprising of two TRPs, i.e., the serving cell TRP-1 and a non-serving (or neighboring) cell TRP-2. As can be seen from FIGS. 9A and 9B, the UE is first configured by the network one or more measurement windows to measure the RSs such as the SSBs transmitted from the serving cell TRP-1 and/or the non-serving (or neighboring) cell TRP-2. Based on the measurement results, the UE could determine the receive timings for both the serving cell TRP-1 and the non-serving (or neighboring) cell TRP-2. The UE then calculates the receive timing difference between TRP-1 and TRP-2.

For instance, denote the receive timings determined for TRP-1 and TRP-2 by $T\_1$ and $T\_2$. The receive timing difference can be calculated as $\Delta T = |T\_1 - T\_2|$. Note that other options to compute the receive timing difference are also possible. The UE could transmit a quantized version of the receive timing difference $\Delta T$ to the network, and the quantization is performed by the UE based on a codebook/table. For example, the codebook/table could contain a set of positive discrete values uniformly distributed within $[t\_min, t\_max]$ with a step size $\Delta t$. For another example, the codebook/table could contain a set of multiples of the CP length (e.g., $\{T\_CP, 1.5T\_CP, 2T\_CP, 3T\_CP\}$ where $T\_CP$ represents the CP length) and/or a set of fractions of the CP length (e.g., $\{0.3T\_CP, 0.7T\_CP\}$, where $T\_CP$ is the CP length).

Other codebook/table design options and other options of quantizing the exact receive timing difference are also possible. The codebook(s)/table(s) for quantizing the receive timing difference can be pre-configured and known to both the network and UE sides a priori. Alternatively, the UE could be indicated by the network one or more codebooks/tables used for quantizing the receive timing difference; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

In one example, the UE could be higher layer RRC configured by the network and/or dynamically indicated by the network via MAC CE or DCI signaling the exact codebook(s)/table(s) used for quantizing the receive timing difference.

In another example, the UE could be first higher layer configured by the network a list/set/pool of candidate codebooks/tables for quantizing the receive timing difference; the UE could then receive from the network a MAC CE activation command or a bitmap activating one or more codebooks/tables from the list/set/pool of candidate codebooks/tables, or a DCI indicating one or more codebooks/tables from the list/set/pool of candidate codebooks/tables. The UE would use the MAC CE/bitmap activated codebook(s)/table(s) or the DCI indicated codebook(s)/table(s) to quantize the receive timing difference(s).

The UE could then construct the receive timing difference report containing the quantized version of the receive timing difference and send it to the network.

A receive timing difference report could contain various types of metrics, including at least one of: (1) Metric-1: exact receive timing difference, e.g., $\Delta T = |T\_1 - T\_2|$ in the example shown in FIGS. 9A and 9B; (2) Metric-2: quantized version of exact receive timing difference; (3) Metric-3: exact differential receive timing difference, wherein the differential receive timing difference is calculated as the difference between the exact receive timing difference and a threshold. The threshold could be pre-configured, e.g., corresponding to the CP length, and known to both the network and UE sides a priori. Alternatively, the UE could be indicated by the network the threshold for comparison; this indication could be via higher layer (RRC) or/and MAC CE or/and DCI based signaling or/and any combination of at least two of RRC, MAC CE and DCI based signaling; this indication could be via a separate (dedicated) parameter or joint with another parameter: in one example, the UE could be higher layer RRC configured by the network or dynamically indicated by the network via MAC CE or DCI the exact value of the threshold; and in another example, the UE could be first higher layer RRC configured by the network a list/set/pool of candidate thresholds; the UE could then receive from the network a MAC CE activation command/bitmap to activate one or more thresholds from the list/set/pool of candidate thresholds, or the UE could then receive from the network a DCI to indicate one or more thresholds from the list/set/pool of candidate thresholds; (4) Metric-4: quantized version of exact differential receive timing difference; (5) Metric-5: exact receive timing difference in form/terms of multiple of the CP length; (6) Metric-6: exact differential receive timing difference in form/terms of multiple of the CP length; (7) Metric-7: exact receive timing difference in form/terms of fraction of the CP length; and (8) Metric-8: exact differential receive timing difference in form/terms of fraction of CP length.

The UE could autonomously determine one or more metrics from Metric-1, Metric-2, Metric-3, Metric-4, Metric-5, Metric-6, Metric-7 and Metric-8 to construct the receive timing difference report. In this case, the UE could indicate to the network the selected metric(s), e.g., in part of the receive timing difference report. Alternatively, the UE could be indicated by the network one or more metrics from Metric-1, Metric-2, Metric-3, Metric-4, Metric-5, Metric-6, Metric-7 and Metric-8 to construct the receive timing difference report; this indication could be via higher layer (RRC) or/and MAC CE or/and DCI based signaling or/and any combination of at least two of RRC, MAC CE and DCI based signaling; this indication could be via a separate (dedicated) parameter or joint with another parameter; e.g., the selected metric(s) could be indicated/included in the CSI resource setting(s)/configuration(s) via the higher layer parameter CSI-ReportConfig.

The receive timing difference report could also contain the information of its target cell/TRP, e.g., the PCI value of the target cell/TRP. In the example shown in FIGS. 9A and 9B, the target TRP of the receive timing difference report is the serving cell TRP-1. There could be various means to indicate/configure the target TRP(s) of the receive timing difference report.

In one example, the UE could autonomously determine the target TRP(s) of the receive timing difference report. For example, if the default timing adjustment configuration/strategy is to advance the transmit timing, the UE could construct/send the receive timing difference report for/to the TRP (e.g., the TRP-1 in FIG. 10) whose transmitted signal(s) is received at the UE at a later time than that of the other TRP(s) (e.g., the TRP-2 in FIG. 10). For another example, the UE could construct/send the receive timing difference report for/to the TRP(s) who has the most recent available uplink channels/resources to carry the report. Yet for another example, the UE could construct/send the receive timing difference report for/to the TRP(s) who has the smallest propagation delay with the UE.

In another example, the UE could be indicated by the network the target TRP(s) of the receive timing difference report; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

For example, the UE could be higher layer RRC configured by the network or dynamically indicated by the network via MAC CE or DCI the target TRP(s) (e.g., in form of PCI value(s), CORESETPoolIndex value(s) and etc.) of the receive timing difference report.

For another example, the UE could be first higher layer configured (e.g., via higher layer RRC signaling) a list/set/pool of TRP-specific IDs such as PCIs, CORESETPoolIndex values, and etc. The UE could then receive from the network a MAC CE activation command and/or a bitmap activating one or more TRPs (in form of their PCIs, CORESETPoolIndex values and etc.) from the higher layer RRC configured list/set/pool of TRP-specific IDs as the target TRP(s) of the receive timing difference report. Alternatively, the UE could receive from the network a DCI indicating one or more TRPs (in form of their PCIs, CORESETPoolIndex values and etc.) from the higher layer RRC configured list/set/pool of TRP-specific IDs as the target TRP(s) of the receive timing difference report.

Furthermore, the receive timing difference report could also contain a one-bit flag to indicate whether the target TRP of the receive timing difference report ought to apply timing advance or timing back-off with respect to the reported receive timing difference. This indication may not be needed if the default setup is, e.g., only applying timing advance with respect to the receive timing difference. For the example shown in FIGS. 9A and 9B assuming that TRP-1 is the target TRP of the receive timing difference report, if the one-bit flag is disabled, e.g., set to '0' or 'disabled' or 'off', which, e.g., indicates that the timing back-off is enabled, the TRP-1 would back off the transmit timing by $\Delta T$ or $\Delta T'$ (the quantized version of $\Delta T$); if the one-bit flag is enabled, e.g., set to '1' or 'enabled' or 'on', which, e.g., indicates that the timing advance is enabled, the TRP-1 would advance the transmit timing by $\Delta T$ or $\Delta T'$ (the quantized version of $\Delta T$). Alternatively, the UE could be indicated by the network whether the receive timing difference report shall be constructed assuming timing advance or timing back-off at the network side; this indication could be via higher layer (RRC) or/and MAC CE or/and DCI based signaling or/and any combination of at least two of RRC, MAC CE and DCI based signaling; this indication could be via a separate (dedicated) parameter or joint with another parameter; e.g., a one-bit flag could be included/indicated in the CSI resource setting or CSI reporting setting or TCI state or etc., e.g., in the higher layer parameter(s) CSI-ResourceConfig/CSI-ReportConfig/TCI-State/etc., to indicate to the UE whether timing advance or timing back-off shall be used/assumed when constructing/forming the receive timing difference report. The network, or the corresponding TRP(s), could start applying the adjusted transmit timing n slots after receiving the receive timing difference report.

The UE could transmit the receive timing difference report through various uplink channels such as PUCCH, PUSCH, PRACH and etc. and/or higher layer signaling such as MAC CE and etc. The UE could include the receive timing difference report as part of the CSI feedback/report to the network. The receive timing difference could be configured as a report quantity (e.g., denoted by csi-RTD) in the CSI reporting setting (e.g., in the higher layer parameter CSI-ReportConfig) in addition to CQI, PMI, RI and etc. For instance, if the UE is configured with a CSI-ReportConfig with reportQuantity set to 'csi-RTD', the UE shall report at least one receive timing difference; otherwise, if the reportQuantity is not set to 'csi-RTD', the UE would not expect to report any receive timing difference.

As a report quantity, if configured by the network, the receive timing difference could follow the same time domain behavior (periodic, aperiodic or semi-persistent) as other report quantities such as CQI, PMI, RI and etc., and they could be transmitted on PUCCH and/or PUSCH. Alternatively, the receive timing difference could be separately configured by the network. In this case, the receive timing difference could have a different time domain behavior from other report quantities such as CQI, PMI, RI and etc., and they could still be transmitted on PUCCH and/or PUSCH.

In a multi-TRP system, certain uplink channels such as PUCCH are associated with different TRPs through the higher layer signaling index CORESETPoolIndex. In this case, the UE could transmit the receive timing difference report on the uplink channels associated with the target TRP via the CORESETPoolIndex, and the explicit indication of the target TRP is no longer needed. Details of incorporating the receive timing difference report as part of the CSI report, and/or multiplexing the receive timing difference report with HARQ-ACK transmission and/or scheduling request are presented below.

The receive timing difference (RTD) report—and therefore the receive timing difference metric(s) included/indicated therein, or possibly accompanied with another parameter as described above, can be transmitted, for example, as part of the CSI report (hence multiplexed with other CSI parameters), and/or by multiplexing it with HARQ-ACK transmission and/or scheduling request (SR). In one example, the RTD report can be transmitted via SR if its payload (number of bits) is less or equal to B1 (e.g., B1=1). In one example, the RTD report can be transmitted via HARQ-ACK if its payload (number of bits) is less or equal to B1 (e.g., B1=1). In one example, the RTD report can be transmitted via SR or HARQ-ACK if the number of TRPs=2 (i.e., number of RTD report is 1).

When multiplexed with other CSI parameters, at least one of the following examples can be used.

In one example, the RTD report is via a separate (new) CSI parameter, e.g., a RTD indicator (RTDI).

In one example, the RTD report is joint with an existing CSI parameter (p), and the parameter (p) when reported indicates both a value for the CSI existing parameter and the RTD report. At least one of the following examples can be used for the existing CSI parameter (p). In such example, the parameter (p) is a rank indicator (RI). When reported, RI indicates both a value for the rank and the RTD report. In such example, the parameter (p) is a CSI-RS resource indicator (CRI). When reported, CRI indicates both a CSI-RS resource and the RTD report. In such example, the parameter (p) is a layer indicator (LI). When reported, LI indicates both a layer and the RTD report. In such example, the parameter (p) is a precoding matrix indicator (PMI) for a 2 port CSI-RS resource. When reported, PMI indicates both a precoding matrix and the RTD report. In such example, the parameter (p) is a first precoding matrix indicator (PMI1) for a X>2 port CSI-RS resource. When reported, PMI1 indicates both first components of a precoding matrix and the RTD report. In such example, the parameter (p) is a second precoding matrix indicator (PMI2) for a X>2 port CSI-RS resource. When reported, PMI2 indicates both second components of a precoding matrix and the RTD report. In such example, the parameter (p) is a channel quality indicator (CQI). When reported, CQI indicates both a CQI value and the RTD report. In such example, the parameter (p) is a layer 1 RSRP (L1-RSRP). When reported, L1-RSRP indicates both a RSRP value and the RTD report. In such example, the parameter (p) is a layer 1 SINR (L1-SINR). When reported, L1-SINR indicates both a SINR value and the RTD report.

In one example, the RTD report is using reserved or unused code points of an existing CSI parameter (p) to indicate the RTD report. At least one of the following examples can be used for the existing CSI parameter (p). In such example, the parameter (p) is a rank indicator (RI). In such example, the parameter (p) is a CSI-RS resource indicator (CRI). In such example, the parameter (p) is a layer indicator (LI). In such example, the parameter (p) is a precoding matrix indicator (PMI) for a 2 port CSI-RS resource. In such example, the parameter (p) is a first precoding matrix indicator (PMI1) for a X>2 port CSI-RS resource. In such example, the parameter (p) is a second precoding matrix indicator (PMI2) for a X>2 port CSI-RS resource. In such example, the parameter (p) is a channel quality indicator (CQI). In such example, the parameter (p) is a layer 1 RSRP (L1-RSRP).

In one example, the parameter (p) is a layer 1 SINR (L1-SINR). In one example, the usage of an existing CSI parameter (p) can be configured (e.g., RRC) as either as a CSI parameter or as a parameter for the RTD report. A code point of the parameter (p) indicates the CSI parameter of the RTD depending on the configured usage.

The RTD report can be multiplexed with a periodic or semi-persistent (P/SP) CSI with wideband (WB) reporting. For such WB CSI reporting, the CSI payload (number of bits) can be fixed regardless of the value of the reported CSI parameters such as RI (although the CSI payload can vary for different rank values). In order to ensure fixed CSI payload, a number of zero-padding bits can be appended with the CSI bits as illustrated in FIG. 8B. At least one of the following examples can be used for multiplexing the RTD report with the WB CSI.

In one example, a portion or all of the zero padding bits appended in the WB CSI report is used to report the RTD report. The least significant bits (LSBs) of the zero padding bits can be used for the RTD report. Or the most significant bits (MSBs) of the zero padding bits can be used for the RTD report.

In one example, the RTD report is multiplexed with the WB CSI parameters, wherein the multiplexing method is according to one of the examples described above.

The RTD report can be multiplexed with an aperiodic (AP) CSI with subband (SB) reporting. For such SB reporting, the CSI can be partitioned into two parts, CSI part 1 and CSI part 2. The CSI part 1 includes RI and CQI (for the first codeword) and is multiplexed with UCI part 1. The CSI report includes LI, PMI, and CQI (for the second codeword when rank >4 is reported) and is multiplexed with UCI part 2. Here, UCI part 1 and UCI part 2 are parts of a two-part UCI as illustrated in FIG. 8C. At least one of the following examples can be used for multiplexing the RTD report with the SB CSI.

In one example, the RTD report is multiplexed with a CSI parameter in CSI part 1. For example, the RTD report is multiplexed with CQI (for the first code word) or RI, wherein the multiplexing method is according to one of the examples described above.

In one example, the RTD report is multiplexed with a CSI parameter in CSI part 2. For example, the RTD report is multiplexed with CQI (for the second code word when rank >4 is reported) or PMI or LI, wherein the multiplexing method is according to one of the examples described above.

In one example, the CSI part 2 is partitioned into three groups G0, G1, and G2 (as in Rel. 15/16 SB CSI reporting) and the UE reports either G0 or (G0, G1) or (G0, G1, G2) depending on the resource allocation for the CSI reporting and the total CSI part 2 payload (as described in UCI omission in Rel. 15/16 NR specification). In one example, the RTD report is multiplexed with a CSI parameter in G0, wherein the multiplexing method is according to one of the examples described above. In one example, the RTD report is multiplexed with a CSI parameter in G0 if only G0 is transmitted (reported) in UCI part 2 (i.e., G1 and G2 are omitted or not reported); the RTD report is multiplexed with a CSI parameter in G1 if only (G0, G1) is transmitted (reported) in UCI part 2 (i.e., G2 is omitted or not reported); and the RTD report is multiplexed with a CSI parameter in G2 if (G0, G1, G2) is transmitted (reported) in UCI part 2.

The bit-width (payload) B and codebook (CB) for the RTD report can be according to one of the following examples.

In one example, B=1 bit and the CB is one of the two examples shown in TABLE 2. In such example, T is a threshold value, which can be fixed (e.g., T=CP) or configured (e.g., via RRC). In such example, T1 and T2 are two values such that either T1<T2 (e.g., T1=2CP, T2=4CP) or T1>T2 (e.g., T1=4CP, T2=2CP).

In one example, B=2 bits and the CB is one of the two examples shown in TABLE 3. In such example, T1, T2, and T3 are threshold values, which can be fixed (e.g., T=C T1=CP, T2=2CP, T3=3CP) or configured (e.g., via RRC). In such example, T1, T2, T3, and T4 are four values such that either T1<T2<T3<T4 (e.g., T1=CP, T2=2CP, T3=3CP, T4=4CP) or T1>T2>T3>T4 (e.g., T1=4CP, T2=3CP, T3=2CP, T4=CP).

TABLE 2

Bit-width and CB

| Bit value | TD value (X) | |
|---|---|---|
| | Example 1 | Example 2 |
| 0 | X <= T | T1 |
| 1 | T < X | T2 |

TABLE 3

Bit-width and CB

| Bit value | TD value (x) | |
|---|---|---|
| | Example 1 | Example 2 |
| 00 | X <= T1 | T1 |
| 01 | T1 < X <= T2 | T2 |
| 10 | T2 < X <= T3 | T3 |
| 11 | T3 < X | T4 |

B can be fixed or configured (e.g., via RRC) or reported by the UE. Or the CB can be fixed or configured (e.g., via RRC) or reported by the UE. Or B and CB can be fixed or configured (e.g., via RRC) or reported by the UE.

Whether the UE can report the RTD report can be configured, e.g., via higher layer RRC signaling. Also, whether a UE is capable of such reporting is indicated by the UE in the capability reporting and the configuration of the RTD report is subject to the reported UE capability.

The RTD report is subject to a restriction. For instance, at least one of the following examples is used as the restriction. In one example, a measurement RS (e.g., CSI-RS) with only 1 port can be used/configured. In one example, only periodic measurement RSs (such as SSB, CSI-RS, TRS) can be used/configured. In one example, only aperiodic measurement RSs (such as CSI-RS) can be used/configured. In one example, only semi-persistent measurement RSs (such as CSI-RS) can be used/configured. In one example, the RTD report can be multiplexed only with a WB CSI report, where the CSI report is periodic or semi-persistent. In one example, the RTD report can be reported only via PUCCH. In one example, the RTD report can be reported only when rank 1 is reported via RI, but the max allowed rank value can be more than 1.

In the example shown in FIGS. 9A and 9B, the UE would apply a single FFT window/receive timing to receive and process the downlink transmissions from both TRP-1 and TRP-2. For example, the UE could apply the same FFT window/receive timing determined for TRP-2 to receive the transmissions from both TRP-1 and TRP-2. Other options of determining the single FFT window/receive timing by the UE are also possible, e.g., by jointly optimizing the FFT window positions determined for both TRP-1 and TRP-2 to obtain a unified FFT window/receive timing.

Figure 10:
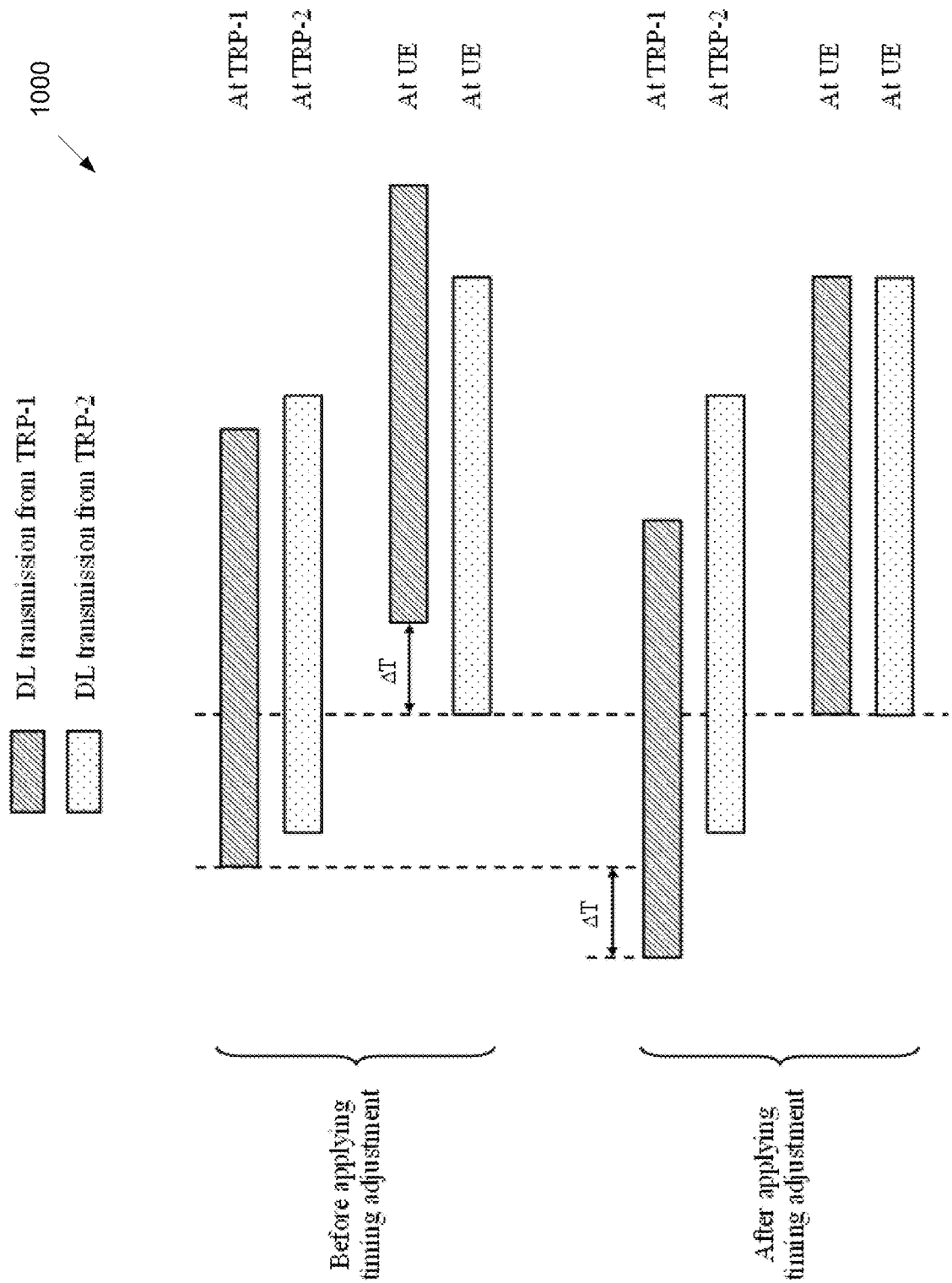
FIG. 10 illustrates an example timing adjustment at a network according to embodiments of the present disclosure.

FIG. 10 illustrates an example timing adjustment at a network 1000 according to embodiments of the present disclosure. An embodiment of the timing adjustment at a network 1000 shown in FIG. 10 is for illustration only.

In FIG. 10, a conceptual example illustrating the effect of applying the timing adjustment at the network side is provided. As can be seen from FIG. 10, without applying any timing adjustment at the network side, the UE could observe large receive timing difference between the DL transmissions from TRP-1 and TRP-2 (denoted by $\Delta T$ in FIG. 10), which could be much larger than the CP. As described before, in this case, if the UE applies a single FFT window/receive timing, e.g., determined for TRP-1, to receive and process the DL transmissions from both TRP-1 and TRP-2, significant inter-symbol/channel interference could be resulted. After applying the timing adjustment, TRP-1 in FIG. 10 advances the transmit timing by $\Delta T$. In this case, the UE would observe time aligned DL transmissions from both TRP-1 and TRP-2, and the UE could apply a single FFT window/receive timing to receive and process the DL transmissions from both TRPs without suffering much from the inter-symbol/channel interference.

Figure 11:
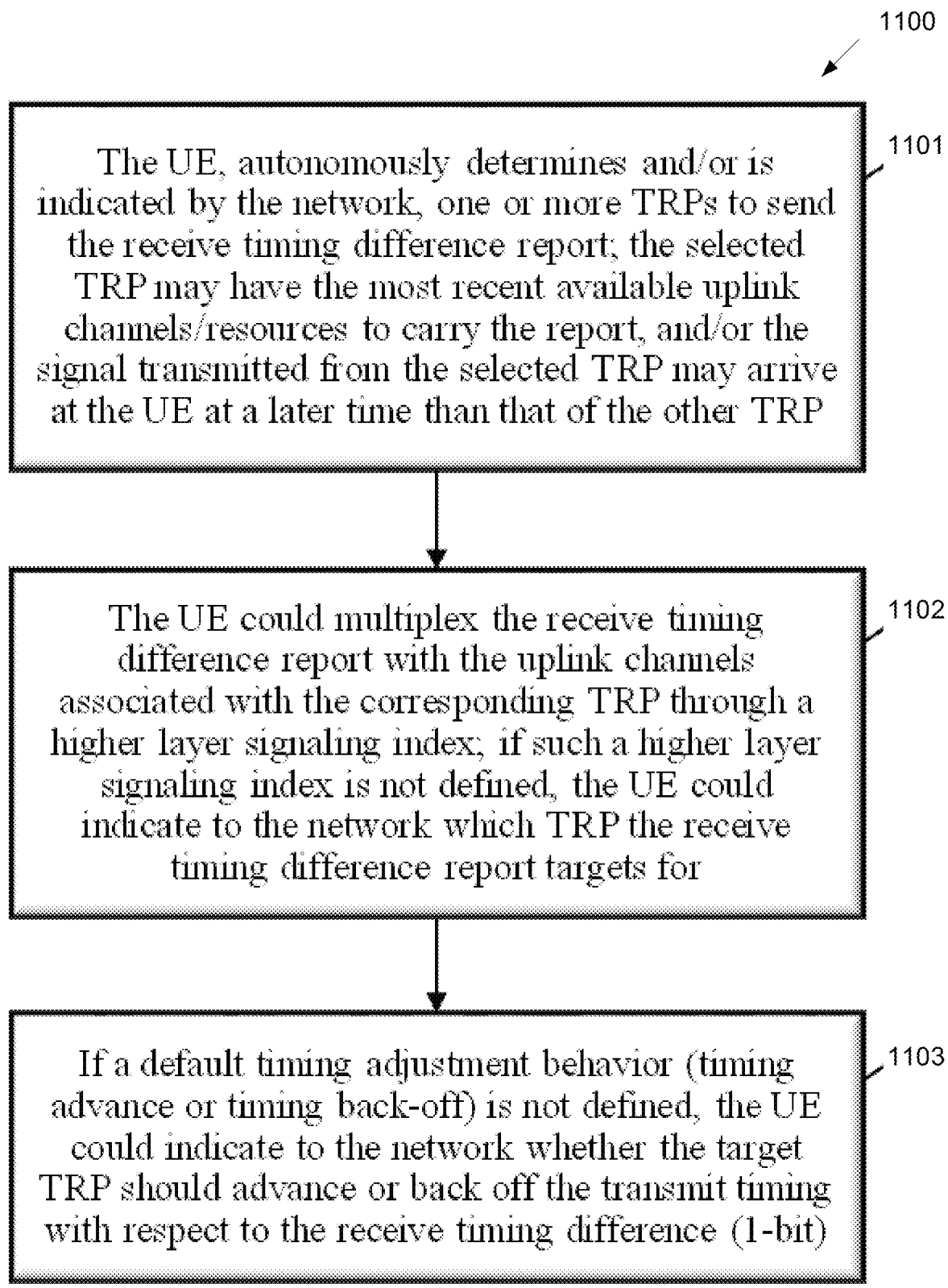
FIG. 11 illustrates a flowchart of a method for timing adjustment according to embodiments of the present disclosure.

FIG. 11 illustrates a flowchart of a method 1100 for timing adjustment according to embodiments of the present disclosure. The method 1100 as may be implemented by a UE such as 111-116 as illustrated in FIG. 1. An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

In the above discussed design examples, the receive timing difference report could include both the information of the target TRP(s) such as PCI(s) of the receive timing difference report and the one-bit flag to indicate whether to advance or back off the transmit timing according to the receive timing difference. Alternatively, the UE could separately send to the network the receive timing difference report including only the receive timing difference metric(s), the information of the target TRP(s) such as PCI(s) of the receive timing difference report, and the one-bit flag indicator to indicate whether to advance or back off the transmit timing. In FIG. 11, a procedure characterizing the separate indications is presented. In 1101, the target TRP(s) of the receive timing difference report is either autonomously determined by the UE or indicated to the UE by the network. If the target TRP(s) of the receive timing difference report is autonomously determined by the UE, the information of the target TRP(s) such as the PCI value(s), CORESETPoolIndex value(s) and etc. may need to be indicated to the network from the UE.

In 1102, the UE could multiplex the receive timing difference report with the uplink resources/channels such as PUCCH associated with the target TRP(s) via the higher layer signaling index such as CORESETPoolIndex. If the higher layer signaling index such as CORESETPoolIndex is not configured and/or it does not associate the uplink resources/channels with the corresponding TRPs, the UE may need to explicitly indicate to the network the information of the target TRP(s) of the receive timing difference report. As aforementioned, the information of the target TRP(s) could correspond to at least one of: PCI, CORESETPoolIndex, TRP-specific ID, TRP-specific higher layer signaling index, and etc.

In 1103, the UE indicates to the network through a one-bit flag indicator whether transmit timing advance or transmit timing back off with respect to the reported receive timing difference shall be applied by the target TRP(s). The one-bit flag indicator could be: '0' or 'disabled' or 'off'—timing advance and '1' or 'enabled' or 'on'—timing back-off.

The UE could compare the receive timing difference with a threshold, and then decide to trigger the receive timing difference reporting or not. The threshold could be pre-configured, e.g., corresponding to zero, the CP length, or the CP length plus a certain value/margin, and known to both the network and UE sides a priori. Alternatively, the UE could be indicated by the network the threshold for comparison; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

In one example, the UE could be higher layer RRC configured by the network or dynamically indicated by the network via MAC CE or DCI the exact value of the threshold.

Figure 12:
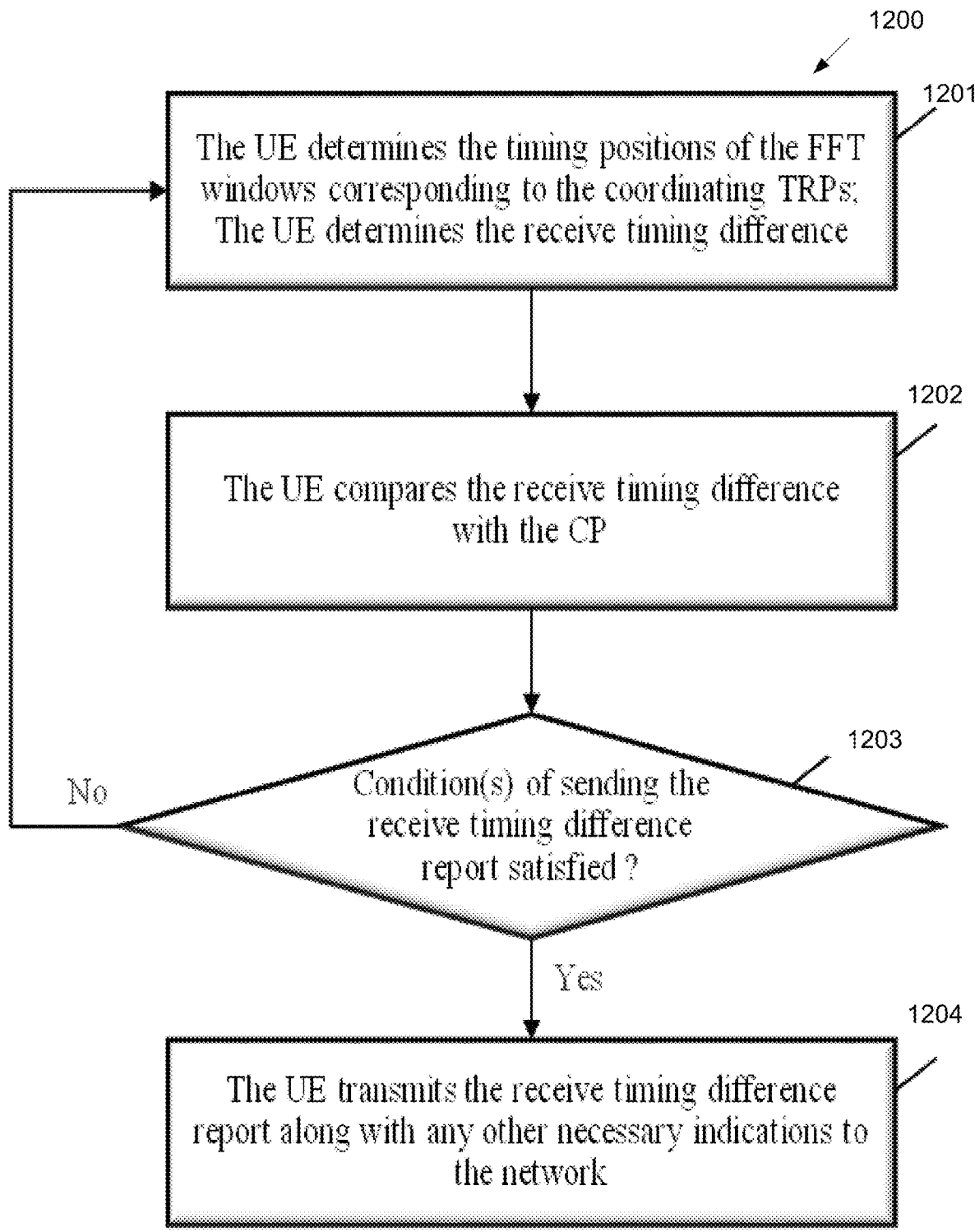
FIG. 12 illustrates another flowchart of a method for timing adjustment according to embodiments of the present disclosure.

In another example, the UE could be first higher layer RRC configured by the network a list/set/pool of candidate thresholds; the UE could then receive from the network a MAC CE activation command/bitmap to activate one or more thresholds from the list/set/pool of candidate thresholds, or the UE could then receive from the network a DCI to indicate one or more thresholds from the list/set/pool of candidate thresholds. In FIG. 12, various conditions to trigger the receive timing difference reporting are provided.

FIG. 12 illustrates another flowchart of a method 1200 for timing adjustment according to embodiments of the present disclosure. The method 1200 as may be implemented by a UE such as 111-116 as illustrated in FIG. 1. An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

As illustrated in FIG. 12, in 1201, the UE measures the one or more RSs, e.g., SSBs, from different TRPs configured for the receive timing/receive timing difference measurement/estimation. The UE then determines the receive timings for different TRPs and/or the timing positions of the FFT windows for different TRPs. The UE computes the receive timing difference $\Delta T$ following the procedures described in FIGS. 9A and 9B.

In 1202, the UE compares the receive timing difference $\Delta T$ with the CP length (denoted by T_CP). For instance, the UE could compute $\Delta t = \Delta T - T\_CP$. Other metrics/operations than the difference comparison are also possible.

In 1203, based on the difference comparison and/or other related metrics, the UE determines whether to send to the network the receive timing difference report. For instance, as long as $\Delta t > 0$, the UE could report to the network the receive timing difference. For another example, if $\Delta t > 0$ and $\Delta t > \delta\_0$, i.e., the receive timing difference is larger than the CP length by first margin $\delta\_0$, the UE would report to the network the receive timing difference. Yet for another example, if $\Delta t < 0$ and $|\Delta t| < \delta\_1$, the UE could still transmit the receive timing difference report to the network. In this case, the receive timing difference is smaller than the CP length, but the comparison difference is smaller than second margin $\delta\_1$.

Regarding the example shown in FIGS. 9A and 9B, the UE sends to the network the receive timing difference report as long as $\Delta T > 0$, regardless of whether $\Delta t$ is larger than 0 or not. The first margin $\delta\_1$ and/or the second margin $\delta\_1$ could be pre-configured and known to both the network and UE sides a priori. Alternatively, the UE could be indicated by the network the first margin $\delta\_0$ and/or the second margin $\delta\_1$; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

In one example, the UE could be higher layer RRC configured by the network or dynamically indicated by the network via MAC CE or DCI the exact value of the first margin $\delta\_0$ and/or the exact value of the second margin $\delta\_1$.

In another example, the UE could be first higher layer RRC configured by the network a list/set/pool of candidate values for the first margin $\delta\_0$ and/or a list/set/pool of candidate values for the second margin $\delta\_1$; the UE could then receive from the network a MAC CE activation command/bitmap to activate a value from the list/set/pool of candidate values for the first margin $\delta\_0$ as the first margin $\delta\_0$, or the UE could then receive from the network a DCI to indicate a value from the list/set/pool of candidate values for the first margin $\delta\_0$ as the first margin $\delta\_0$; the UE could also receive from the network a MAC CE activation command/bitmap to activate a value from the list/set/pool of candidate values for the second margin $\delta\_1$ as the second margin $\delta\_1$, or the UE could receive from the network a DCI to indicate a value from the list/set/pool of candidate values for the second margin $\delta\_0$ as the second margin $\delta\_0$.

In 1204, the UE would transmit the receive timing difference report to the network if the conditions in 1203 are satisfied/achieved. Otherwise, if the conditions in 1203 are not satisfied/achieved, the operation procedure would go back to 1201.

The UE could be indicated by the network one or more specific reporting parameters/configurations for configuring/sending the receive timing difference report.

In one example, the UE could be higher layer RRC configured by the network or dynamically indicated by the network via MAC CE or DCI one or more CSI reporting settings (e.g., via the higher layer parameters CSI-Report-Config's) for the one or more TRPs, wherein the reporting parameters/configurations indicated therein are for configuring the receive timing difference report.

In another example, the UE could be first higher layer configured by the network a list/set/pool of CSI reporting settings (e.g., via the higher layer parameters CSI-Report-Config's) for the one or more TRPs. The UE could then receive from the network a MAC CE activation command and/or a bitmap activating one or more CSI reporting settings (e.g., via the higher layer parameters CSI-Report-Config's) from the higher layer RRC configured list/set/pool of CSI reporting settings. The UE could apply the reporting parameters/configurations indicated in the activated one or more CSI reporting settings to configure the receive timing difference report.

In yet another example, a one-bit flag indicator could be included/indicated in a CSI reporting setting, e.g., in the corresponding higher layer parameter CSI-ReportConfig, to indicate to the UE whether the reporting parameters/configurations indicated therein are for configuring the receive timing difference report.

Figure 13:
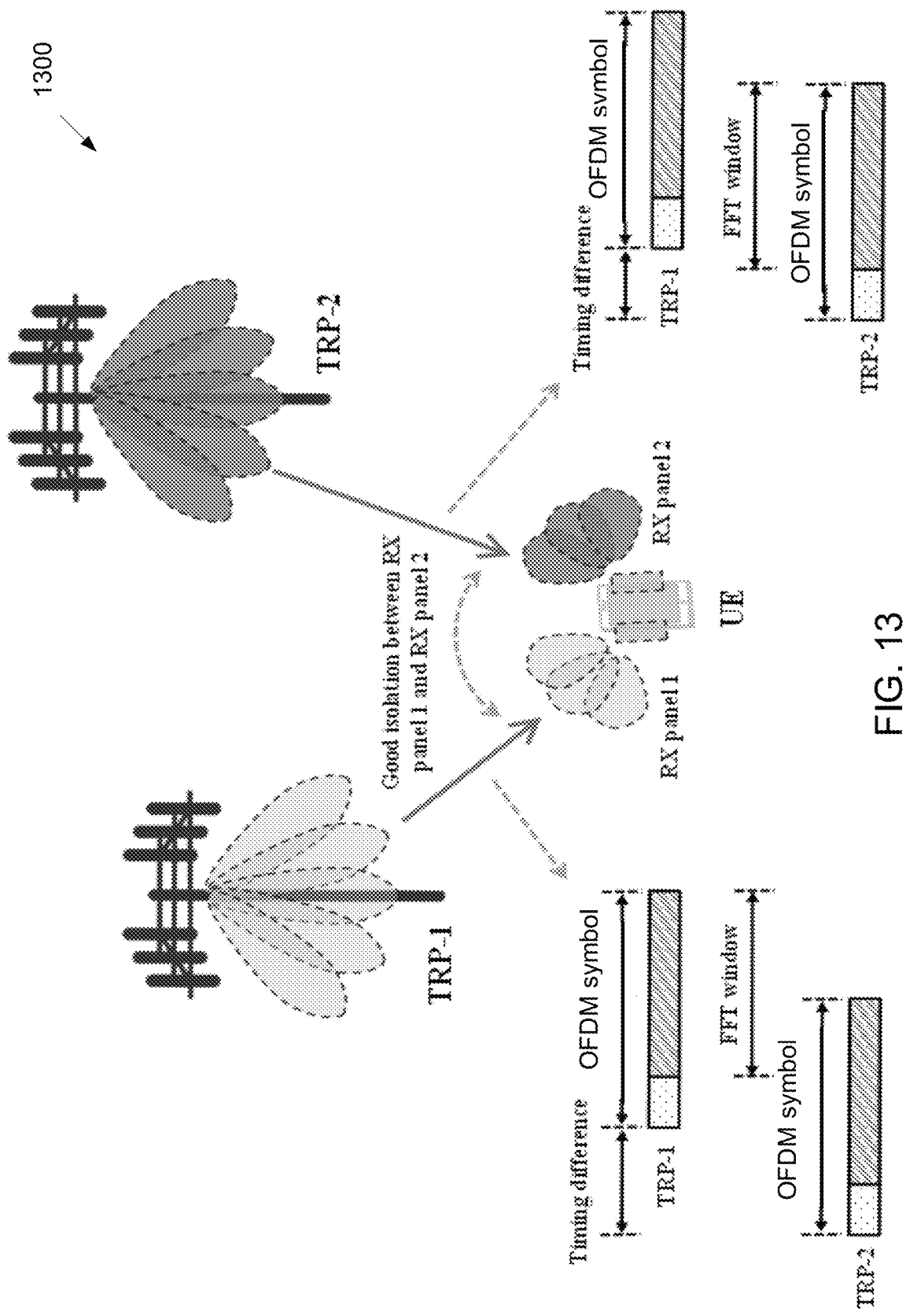
FIG. 13 illustrates an example simultaneous multi-panel reception of multi-TRP transmission according to embodiments of the present disclosure.

FIG. 13 illustrates an example simultaneous multi-panel reception of multi-TRP transmission 1300 according to embodiments of the present disclosure. An embodiment of the simultaneous multi-panel reception of multi-TRP transmission 1300 shown in FIG. 13 is for illustration only.

In FIG. 13, an example of simultaneous multi-panel reception of multi-TRP transmission is presented. As can be seen from FIG. 13, the UE is equipped with two receive (RX) panels, i.e., RX panel 1 and RX panel 2, to receive the DL transmissions from TRP-1 and TRP-2, respectively. For each RX panel, the UE could apply either a single FFT window/receive timing or multiple FFT windows/receive timings to receive and process the downlink transmissions from the TRPs. The RX panels at the UE could be well isolated from each other. In this case, for a given RX panel (e.g., RX panel 1), the signals transmitted from its corresponding TRP (e.g., TRP-1) can be well received with good receive signal quality, while the signals transmitted from the other TRP(s) (e.g., TRP-2 in FIG. 13) cannot be well received/detected due to the good isolation between the two RX panels.

Figure 14:
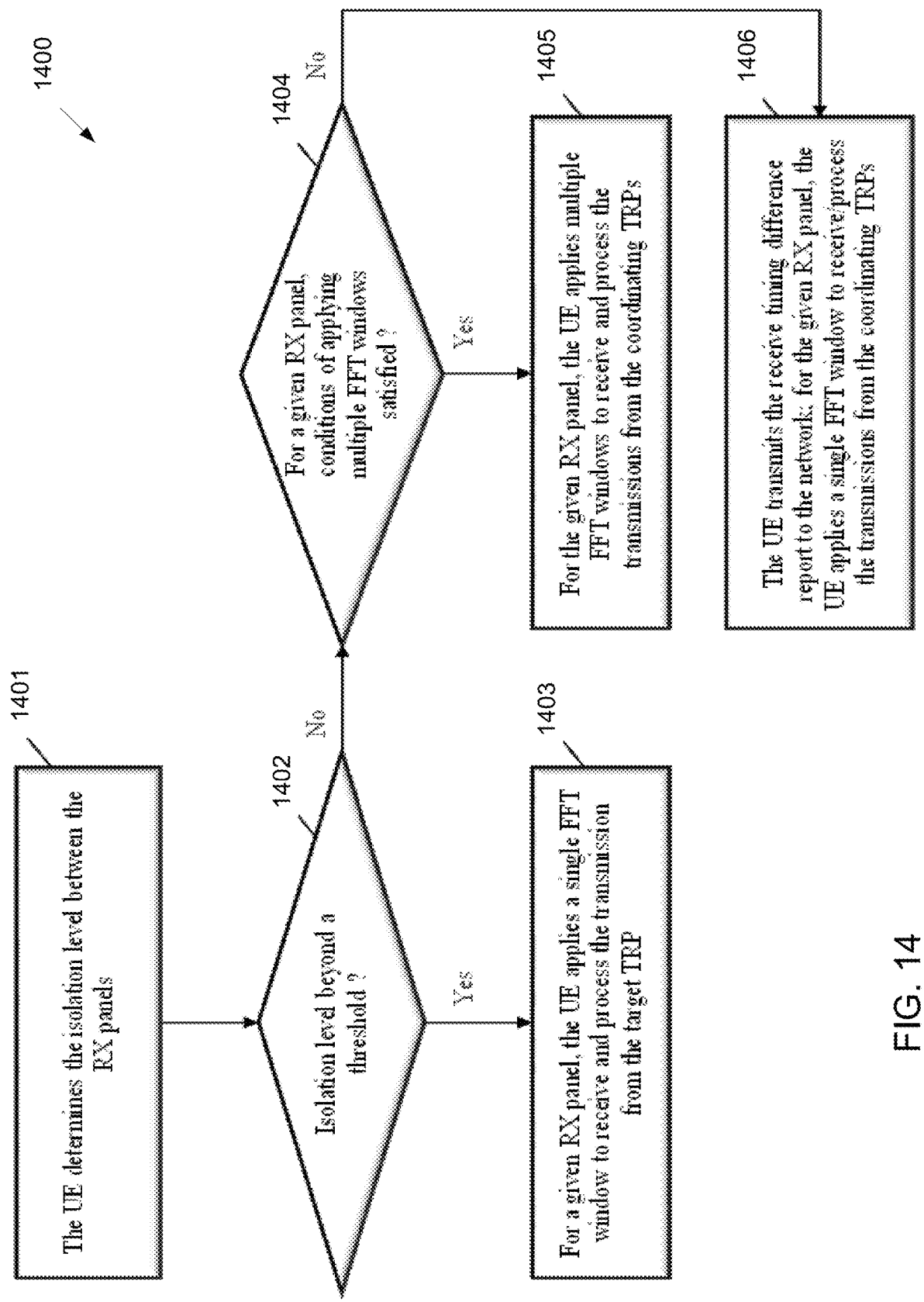
FIG. 14 illustrates a flowchart of a method for determining a single receive timing or FFT window position or multiple receive timings or FFT window positions based on isolation level between two RX panels according to embodiments of the present disclosure.

Hence, the UE could apply a single FFT window/receive timing at each RX panel/RF chain to receive and process the DL transmission from their corresponding TRP without requiring the physically non-co-located TRPs to align their transmit timings. On the other hand, if the RX panels are not well isolated, the UE could apply multiple FFT windows/receive timings at each RX panel/RF chain to receive and process the transmissions from the TRPs, which could result in increased implementation complexity; the UE could also apply a single FFT window/receive timing at each RX panel/RF chain to receive and process the transmissions from different TRPs, but this case would require the network, or the TRPs to align/adjust the transmit timing(s). The isolation between different RX panels could vary depending on many factors such as UE's orientation, UE's moving speed, UE's position/distance relative to the TRPs and etc. In FIG. 14, the UE uses the isolation level between the two RX panels as the metric to trigger the reporting of the receive timing difference and/or the transmit timing adjustment at the network side.

FIG. 14 illustrates a flowchart of a method 1400 for determining a single receive timing or FFT window position or multiple receive timings or FFT window positions based on isolation level between two RX panels according to embodiments of the present disclosure. The method 1400 as may be implemented by a UE such as 111-116 as illustrated in FIG. 1. An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

As illustrated in FIG. 14, in 1401, the UE determines the isolation level between their RX panels for receiving the downlink transmissions from the physically non-co-located TRPs. There could be various means to define/determine the isolation level between different RX panels. In one example, the isolation level can be determined by averaging the differences between the received signal strengths from different TRPs over all the RX panels. For instance, denote the received signal strengths at RX panel 1 by rx_pw_11 and rx_pw_21, which correspond to the signals transmitted from TRP-1 and TRP-2, respectively. The received signal strength difference at RX panel 1 can then be calculated as rx_pw_diff_1=rx_pw_11−rx_pw_21. Similarly, denoting the received signal strengths at RX panel 2 by rx_pw_12 (TRP-1) and rx_pw_22 (TRP-2), the received signal strength difference at RX panel 2 can then be computed as rx_pw_diff_2=rx_pw_22−rx_pw_12. Finally, the isolation level between RX panel 1 and RX panel 2 is determined as rx_panel_isolation=(rx_pw_diff_1+rx_pw_diff_2)/2.

In another example, the isolation level can be computed based on the received L1-RSRPs and/or L1-SINRs. More specifically, the isolation level could be determined by averaging the differences between the received L1-RSRPs/ L1-SINRs from different TRPs over all the RX panels. Other definitions of the isolation level and strategies to compute the isolation level are also possible.

In 1402, the UE compares the isolation level rx_panel_ isolation determined in 1401 with a predetermined threshold th_isolation. For instance, the threshold could correspond to 10 dB if the isolation level is calculated in terms of the received signal strength difference. If rx_panel_isolation>th_isolation, the operation proceeds to 1403; otherwise, the operation proceeds to 1404. The isolation threshold th_isolation could be pre-configured, e.g., corresponding to zero dB, and known to both the network and UE sides a priori. Alternatively, the UE could be indicated by the network the isolation threshold th_isolation; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

In one example, the UE could be higher layer RRC configured by the network or dynamically indicated by the network via MAC CE or DCI the exact value of the isolation threshold th_isolation.

In another example, the UE could be first higher layer RRC configured by the network a list/set/pool of candidate values for the isolation threshold th_isolation; the UE could then receive from the network a MAC CE activation command/bitmap to activate a value from the list/ set/pool of candidate values for the isolation threshold th_isolation as the isolation threshold th_isolation, or the UE could receive from the network a DCI to indicate a value from the list/set/pool of candidate values for the isolation threshold th_isolation as the isolation threshold th_isolation.

In 1403, for a given RX panel, the UE applies a single FFT window/receive timing to receive and process the DL transmission from the TRP that has the one-to-one correspondence to the given RX panel. The FFT window position/receive timing per RX panel, could also be configured by the network, and indicated to the UE.

In 1404, the UE determines whether a single FFT window/receive timing or multiple FFT windows/receive timings are used for a given RX panel, given that the isolation level between the RX panels is below the threshold. Furthermore, whether a single FFT window/receiving timing or multiple FFT windows/receive timings are used for a given RX panel, can also be configured by the network and indicated to the UE. If the condition(s) in 1404 is satisfied/ achieved, the algorithm goes to 1405; otherwise, the algorithm goes to 1406.

In 1405, for a given RX panel, the UE applies multiple FFT windows/receiving timings to receive and process the DL transmissions from all the coordinating TRPs, and each FFT window/receiving timing could correspond to a separate TRP. For instance, for RX panel 1 in FIG. 13, the UE would apply two FFT windows/receiving timings, e.g., FFT window 1/receiving timing 1 and FFT window 2/receiving timing 2 to respectively process the DL transmissions from TRP-1 and TRP-2. The timing positions of FFT window 1 and FFT window 2 or the receive timings 1 and 2 could be determined by the UE or configured by the network and indicated to the UE.

In 1406, for the given RX panel, the UE could first estimate the receive timing difference from the TRPs and send to the network the receive timing difference report. The UE could apply a single FFT window/receiving timing for the given RX panel to receive and process all the DL transmissions from the physically non-co-located TRPs. For example, for RX panel 1 in FIG. 13, the UE first sends the receive timing difference report to the network and indicates to the network that TRP-2 needs to advance the transmit timing. The UE then applies a single FFT window/receiving timing on RX panel 1 to receive and process the DL transmissions from both TRP-1 and TRP-2.

In a different variation, assume that the isolation level is smaller than the isolation threshold th_isolation: (1) the UE computes the receive timing difference between different TRPs; if the receive timing difference is below a threshold (e.g., the CP length or configured by the network), the UE would apply a single FFT window/receiving timing per RX panel to receive and process the DL transmission(s) from the TRP(s); and (2) the UE computes the receive timing difference between different TRPs; if the receive timing difference is beyond the threshold (e.g., the CP length or configured by the network): in one example, if the UE decides not to send the receive timing difference report to the network, the UE could apply multiple/separate FFT windows/receiving timings per RX panel, each receiving and processing the DL transmission(s) from a separate/different TRP; in another example, if the UE sends to the network the receive timing difference report: (i) the UE could apply a single FFT window/receiving timing per RX panel to receive and process the DL transmission(s) from the one or more TRPs, or (ii) the UE could first apply multiple FFT windows/receiving timings per RX panel to receive and process the DL transmissions from different TRPs; the UE could then apply a single FFT window/receiving timing per RX panel to receive and process the DL transmission(s) from the one or more TRPs if the UE is indicated by the network to apply a single FFT window/receiving timing per RX panel and/or the UE receives from the network that the TRPs have applied the transmit timing adjustment based on the reported receive timing difference.

In another different variation, the UE could send to the network one or more capability reports. In addition, the UE could also send to the network the receive timing difference report. The UE could be indicated by the network to use one or multiple FFT windows/receiving timings per RX panel to receive and process the DL transmission(s) from the one or more TRPs. This indication could be via higher layer (RRC) or/and MAC CE or/and DCI based signaling or/and any combination of at least two of RRC, MAC CE and DCI based signaling; this indication could be via a separate (dedicated) parameter or joint with another parameter.

Figure 15A:
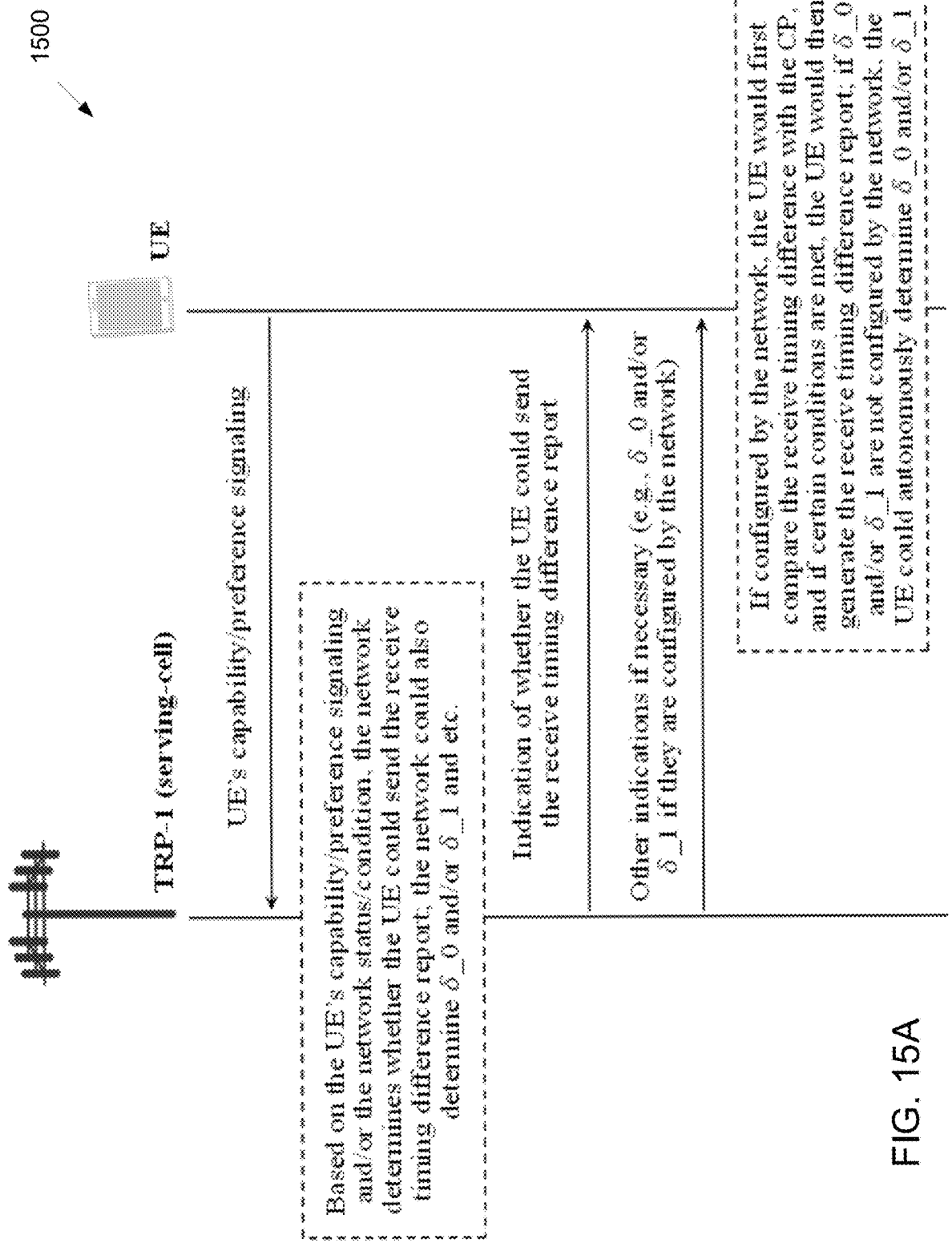
FIG. 15A illustrates an example signaling flow for network assisted DL timing adjustment according to embodiments of the present disclosure.

FIG. 15A illustrates an example of signaling flow 1500 for network assisted DL timing adjustment according to embodiments of the present disclosure. The signaling flow 1500 as may be implemented by a UE such as 111-116 and by a base station such as 101-103 as illustrated in FIG. 1. An embodiment of the signaling flow 1500 shown in FIG. 15A is for illustration only. One or more of the components illustrated in FIG. 15A can be implemented in specialized circuitry configured to perform the noted functions or one or more of the components can be implemented by one or more processors executing instructions to perform the noted functions.

Figure 15B:
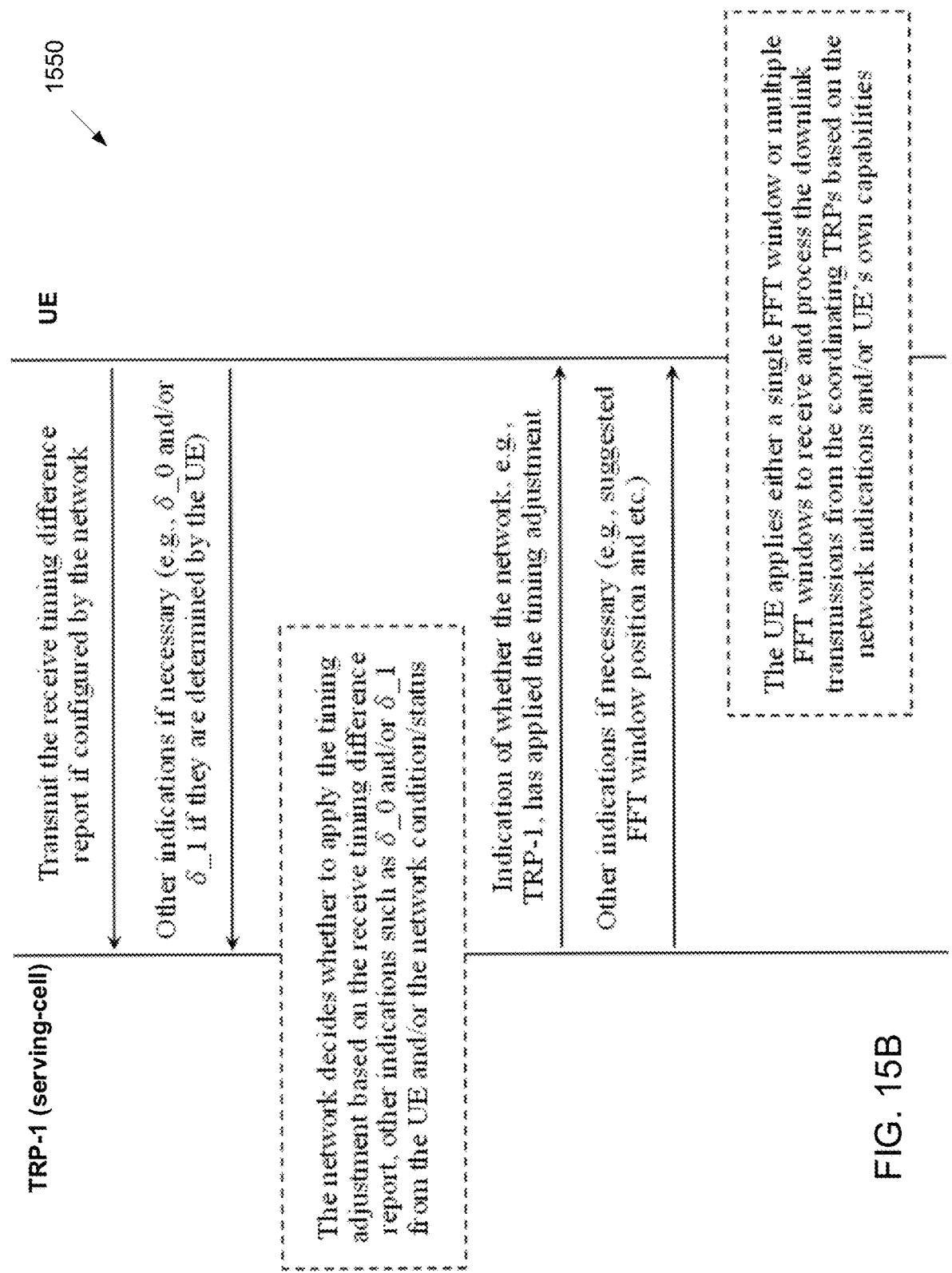
FIG. 15B illustrates an example signaling flow for network assisted DL timing adjustment according to embodiments of the present disclosure.

FIG. 15B illustrates an example of signaling flow 1550 for network assisted DL timing adjustment according to embodiments of the present disclosure. The signaling flow 1550 as may be implemented by a UE such as 111-116 and by a base station such as 101-103 as illustrated in FIG. 1. An embodiment of the signaling flow 1500 shown in FIG. 15B is for illustration only. One or more of the components illustrated in FIG. 15B can be implemented in specialized circuitry configured to perform the noted functions or one or more of the components can be implemented by one or more processors executing instructions to perform the noted functions.

In FIGS. 15A and 15B, an example of network indication assisted receive timing difference reporting is presented. As illustrated in FIGS. 15A and 15B, the UE could first indicate to the network their capability in applying one or multiple FFT windows/receive timings per RF chain/RX panel. The UE's capability signaling could include the maximum number of FFT windows/receive timings that can be supported per RF chain/RX panel, the maximum number of RX panels that can be simultaneously activated, the isolation level between the RX panels and etc. The UE could also indicate to the network their recommendation/preference of using a single FFT window/receive timing, multiple FFT windows/receive timings or both for a given RF chain/RX panel.

Based on (1) the UE's capability signaling or recommendation/preference reporting and/or (2) the network's condition, the network could determine whether the UE could send the receive timing difference report. The network condition includes but not limited to backhaul latency between the coordinating TRPs, status of the most recent available uplink resources/channels to convey the receive timing difference report, and capability or recommendation/preference reporting from other UEs. For instance, for ideal backhaul or if the backhaul latency is below a certain threshold, the geographically non-co-located TRPs could align/adjust their transmit timings via backhaul coordination, and there may be no need to trigger the receive timing difference reporting from the UE.

For another example, if the backhaul latency is beyond a certain threshold, the reported isolation level between the RX panels is below a certain value and the UE prefers to apply a single FFT window/receive timing for a given RX panel, the UE could be indicated by the network to report the receive timing difference. The network could also determine $\delta\_0$ and/or $\delta\_1$ and indicate them to the UE. Recall that $\delta\_0$ ($\delta\_1$) could be used by the UE to determine how much the receive timing difference is beyond (below) the CP.

Upon receiving the network's indication, the UE would determine whether to report the receive timing difference to the network following the procedures descripted in 1203 in FIG. 12. That is, the UE would first determine how much the receive timing difference is beyond or below the CP length, and then decide whether to send the report. The UE could autonomously determine the thresholds $\delta\_0$ and $\delta\_1$ for comparing with the CP length, if they are not configured/indicated by the network, or even regardless of whether they are configured/indicated by the network. The UE would transmit the receive timing difference report to the network if all the necessary conditions are satisfied. The UE could also send $\delta\_0$ and/or $\delta\_1$ along with any other necessary indications (e.g., in part of the receive timing difference report) to the network to help the network decide whether to apply the timing adjustment. It is evident that if the UE determined $\delta\_0$ and/or $\delta\_1$ are the same as those configured by the network, there is no need for the UE to report them back to the network.

The network would decide whether to apply the timing adjustment based on the receive timing difference and other indications reported from the UE and/or the network status/condition. The UE could be configured/indicated by the network whether the network has applied the timing adjustment. The UE could also be configured/indicated by the network how/where to place the FFT window(s) and etc.

Upon receiving the network indication about whether the corresponding TRP has applied the timing adjustment and/or other related indications, the UE would apply appropriate FFT operation/receive timing assumption to process the downlink transmissions from the one or more TRPs. For instance, if the UE is indicated by the network that the network has applied the downlink transmit timing adjustment, the UE would apply a single FFT window/receive timing to process the downlink transmissions from the one or more TRPs. For another example, if the UE is indicated by the network that the network does not apply the timing adjustment, the UE would apply multiple FFT windows/receive timings to process the DL transmissions, each corresponding to a TRP.

As discussed above, in a multi-TRP system, the UE could simultaneously receive from the one or more TRPs various types of RSs/channels such as SSBs, CSI-RSs, PDCCHs (DMRSs) and PDSCHs (DMRSs), and in a DPS system, the UE could receive from different TRPs various types of RSs/channels such as SSBs, CSI-RSs, PDCCHs (DMRSs) and PDSCHs (DMRSs) in different (time) slots/mini-slots/symbols/etc. The network could apply the downlink transmit timing adjustment/alignment to various types of RSs/channels such as SSBs, CSI-RSs, PDCCHs (DMRSs) and PDSCHs (DMRSs). The UE could be indicated by the network whether the downlink transmit timing adjustment/alignment has been applied to a specific/particular RS/channel; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

For instance, a one-big flag could be included in the TCI state, e.g., in the higher layer parameter TCI-State, to indicate whether the transmit timing adjustment/alignment has been applied to the target RS(s)/channel(s). For example, if the target RS is a TRS, and the one-bit flag is enabled, e.g., set to '1' or 'enabled' or 'on' in the corresponding TCI state (TCI-State), the UE could expect that the network has applied the timing adjustment for the transmission of the TRS. Other means of indicating whether the downlink transmit timing adjustment/alignment has been applied to a specific/particular RS/channel are also possible.

It is worth noting that the steps/flows shown in FIGS. 15A and 15B are illustrative examples, and other combinations/arrangements of the steps/features are also possible. For instance, the network may not even indicate to the UE whether it has applied the timing adjustment. The UE would automatically apply, say, a single FFT window/receive timing to process the DL transmissions from the one or more TRPs, m slots after the UE has sent to the network the receive timing difference report.

Furthermore, if the UE is indicated by the network that the network and/or the target cell(s)/TRP(s) has applied the timing adjustment/alignment, the UE could expect that a RS from a PCI could be configured as a QCL source RS for a (target) RS or a (target) channel from a different PCI in an inter-cell system. Otherwise, if the UE is not indicated by the network that it has applied the timing adjustment/alignment, the UE may not expect that a RS from a PCI can be configured as a QCL source RS for a (target) RS or a (target) channel from a different PCI in an inter-cell system.

Figure 16:
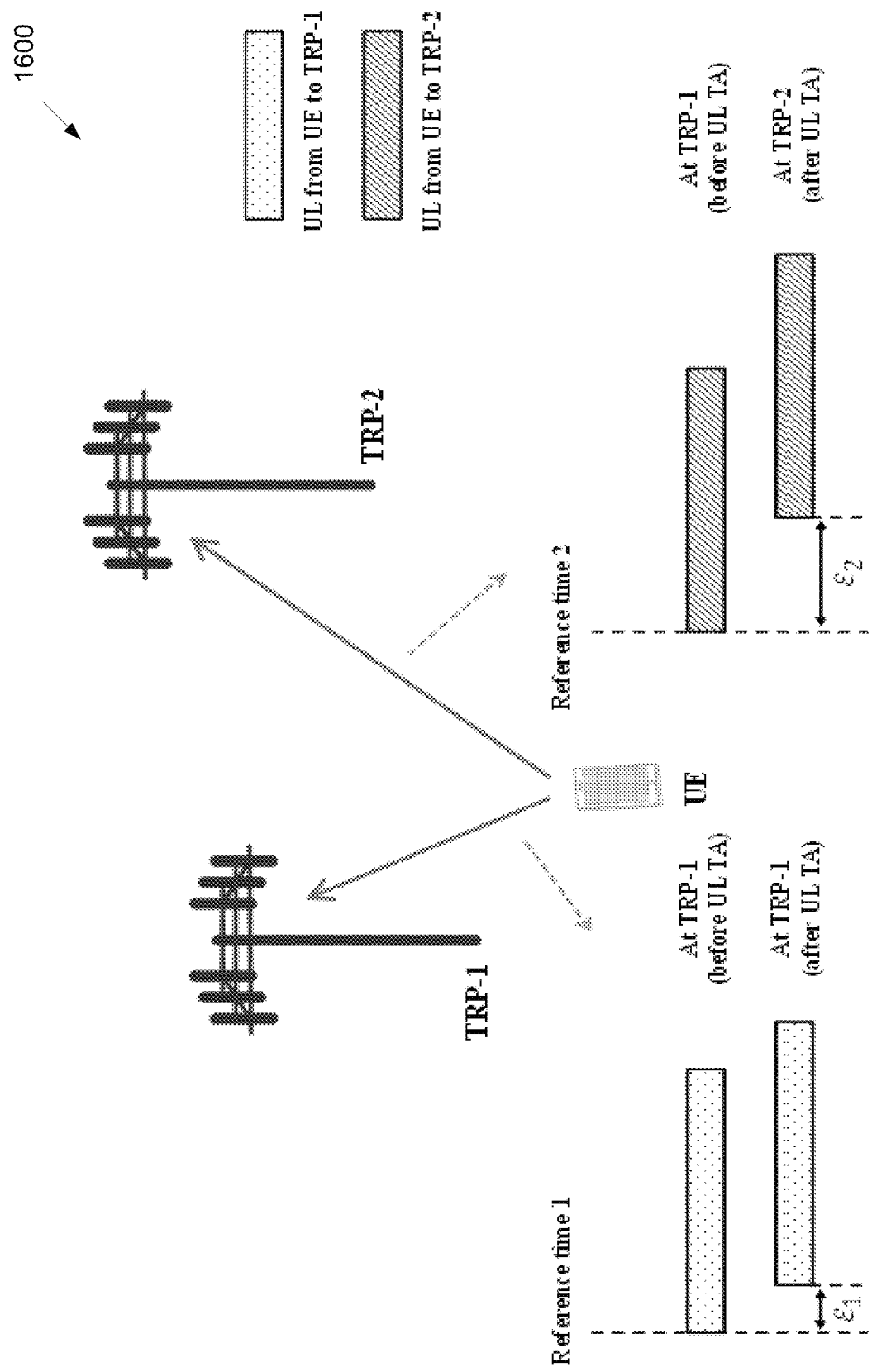
FIG. 16 illustrates an example of UL timing acquisition in a multi-TRP system according to embodiments of the present disclosure.

FIG. 16 illustrates an example of UL timing acquisition in a multi-TRP system 1600 according to embodiments of the present disclosure. An embodiment of the UL timing acquisition in the multi-TRP system 1600 shown in FIG. 16 is for illustration only.

In another embodiment, the timing adjustment at the network side could be inferred from the timing advance for the uplink. Prior to discussing how the uplink timing advance could assist the downlink timing adjustment, the uplink timing advance process in a multi-TRP or an inter-cell system is first illustrated. As depicted in FIG. 16, in a multi-TRP system, the uplink timing advance could be conducted on a per-TRP basis, i.e., TRP-specific uplink timing advance. This is because different TRPs are not geographically/physically co-located, and the propagation delays and/or delay spreads between them and the UE could be largely different.

As illustrated in FIG. 16, there are two reference timings, reference time 1 and reference time 2, corresponding to TRP-1 and TRP-2, respectively. For instance, the reference time could be configured as the starting time of a DL frame/subframe/slot of the corresponding TRP. The reference timings of different TRPs, such as reference time 1 and reference time 2 in FIG. 16, could be identical. As depicted in FIG. 16, before applying any UL timing advance at the UE, the uplink signal (transmitted from the UE) targeting for TRP-1 would arrive at TRP-1 $\varepsilon_1$ symbols/slots/etc. later than reference time 1, and the uplink signal targeting for TRP-2 would arrive at TRP-2 $\varepsilon_2$ symbols/slots/etc. later than reference time 2. In this case, the UE could be indicated/configured by the network with two timing advance commands, each corresponding to a TRP. The first timing advance command would request the UE to advance their transmit timing by $\varepsilon_1$ for the uplink transmissions/channels for TRP-1, and the second timing advance command would request the UE to advance their transmit timing by $\varepsilon_2$ for the uplink transmissions/channels for TRP-2.

FIG. 17A illustrates an example of two TRP-specific UL timing advance (TA) MAC CE commands in a multi-TRP system 1700 according to embodiments of the present disclosure. An embodiment of the two TRP-specific UL TA MAC CE commands in the multi-TRP system 1700 shown in FIG. 17A is for illustration only.

FIG. 17B illustrates an example of common reference time 1750 according to embodiments of the present disclosure. An embodiment of the common reference time 1750 shown in FIG. 17B is for illustration only.

As illustrated in FIG. 17A, an example of two MAC CE commands each containing a UL TA for a TRP is depicted. As shown in FIG. 17A, each MAC CE command contains an entity ID, which could correspond to a TRP-specific ID value such as PCI value, CORESETPoolIndex value, TRP ID value, TRP-specific higher layer signaling index value and etc. For a multi-TRP system comprising of the serving cell TRP-1 and a non-serving (or neighboring) cell TRP-2, the Entity ID #0 in FIG. 17A could correspond to the PCI value of the serving cell TRP-1, while the Entity ID #1 in FIG. 17A could correspond to the PCI value of the non-serving (or neighboring) cell TRP-2. The MAC CE command with the Entity ID #0 further contains a timing advance for a TRP, e.g., $\varepsilon_1$ for TRP-1, while the MAC CE command with the Entity ID #1 further contains a timing advance for another TRP, e.g., $\varepsilon_2$ for TRP-2.

After applying the timing advance at the UE, the uplink signal would arrive at the target TRP at the corresponding reference time.

By exploiting the reciprocity of the propagation delay/delay spread between the DL and UL transmissions/channels, the network side could adjust the DL transmit timing by inferring from the uplink timing advance results. The DL-UL reciprocity means that if the propagation delay of the UL transmission from the UE to the network is E, the propagation delay of the DL transmission from the network to the UE is also E. As shown in FIG. 17B, a common reference time could be configured for both TRP-1 and TRP-2, denoted by T_0. Assume that the UL signals targeting for both TRP-1 and TRP-2 are transmitted from the UE at the same time, e.g., by using two panels at the UE to simultaneously transmit the signals with each panel corresponding to a TRP and/or associating the simultaneous UL channels with TRP-specific higher layer signaling index such as CORESETPoolIndex. The UE could be configured by the network to transmit one or more RSs such as SRSs and/or one or more channels such as PRACHs or PUCCHs or PUSCHs for the purpose of UL TA acquisition. Upon receiving the uplink transmission such as the one or more RSs or the one or more channels from the UE, each TRP could first determine a timing offset between the arrival time of the corresponding UL signal(s) and the common reference time.

As illustrated in FIG. 17B, with respect to the common reference time T_0, the timing offsets for TRP-1 and TRP-2 are $\tau_1$ and $\tau_2$. Via backhaul coordination, TRP-1 and/or TRP-2 could know both values of $\tau_1$ and $\tau_2$, and therefore $\Delta\tau=|\tau_1-\tau_2|$. In this case, TRP-1 or TRP-2 or both could adjust the transmit timing(s) accordingly. For instance, TRP-2 could advance the transmit timing by $\Delta\tau$, while TRP-1 does not perform any timing adjustment. The above procedure is described in FIGS. 18A and 18B.

Figure 18A:
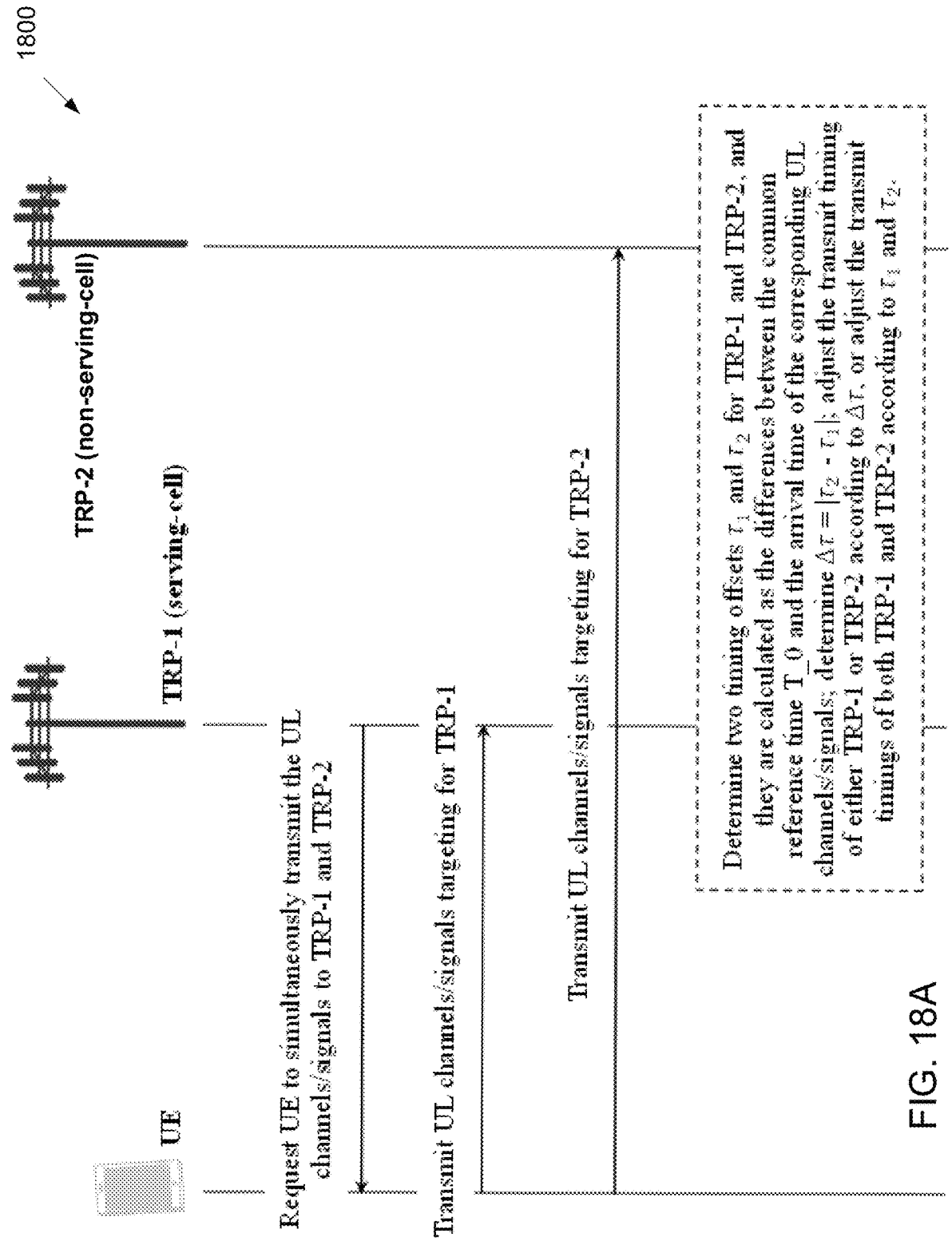
FIG. 18A illustrates an example of signaling flow for timing adjustment operation according to embodiments of the present disclosure.

FIG. 18A illustrates an example of a signaling flow 1800 for timing adjustment operation according to embodiments of the present disclosure. The signaling flow 1800 as may be implemented by a UE such as 111-116 and base stations such as 101-103 as illustrated in FIG. 1. An embodiment of the signaling flow 1800 shown in FIG. 18A is for illustration only. One or more of the components illustrated in FIG. 18A can be implemented in specialized circuitry configured to perform the noted functions or one or more of the components can be implemented by one or more processors executing instructions to perform the noted functions.

Figure 18B:
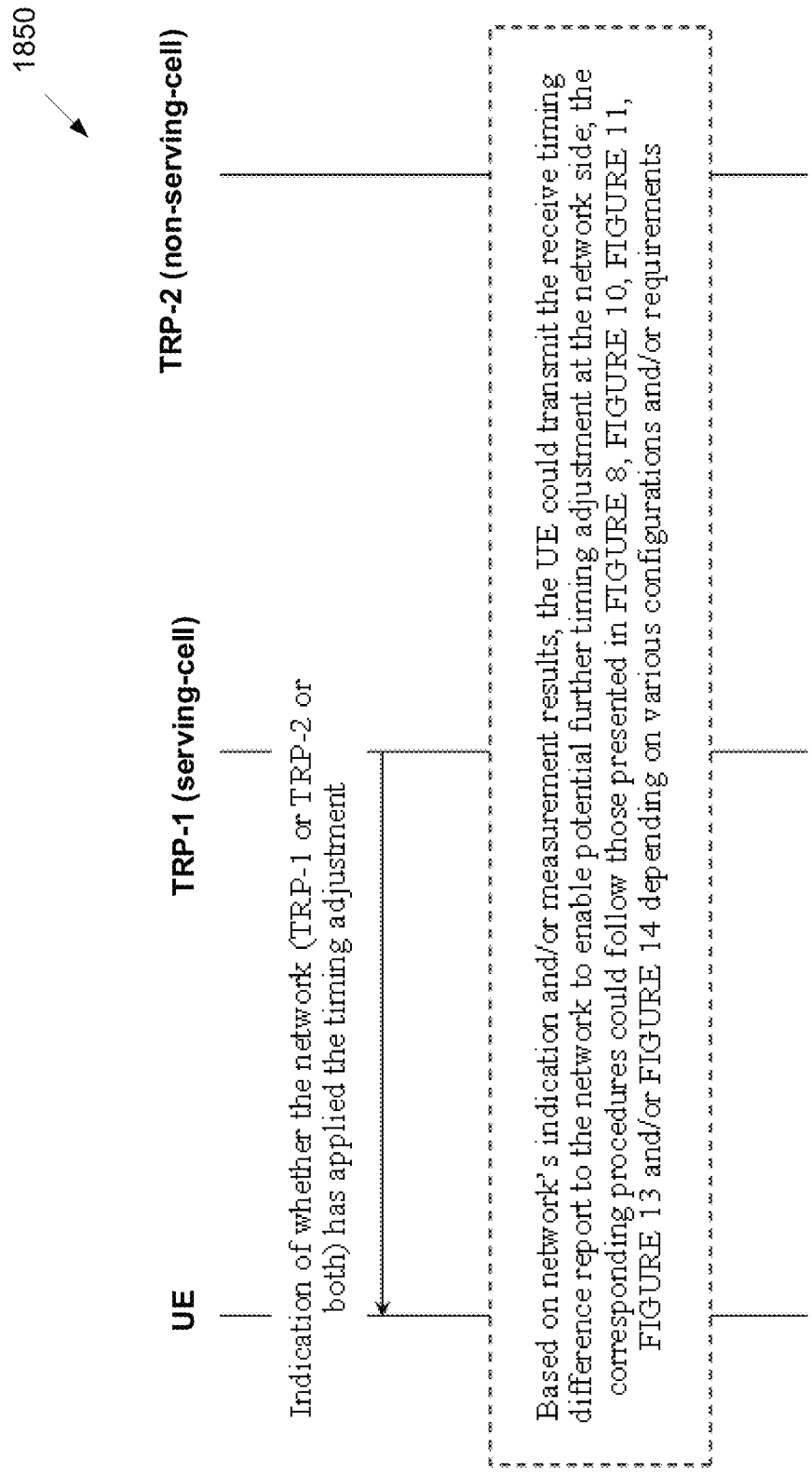
FIG. 18B illustrates another example of signaling flow for timing adjustment operation according to embodiments of the present disclosure.

FIG. 18B illustrates an example of a signaling flow 1850 for timing adjustment operation according to embodiments of the present disclosure. The signaling flow 1850 as may be implemented by a UE such as 111-116 and base stations such as 101-103 as illustrated in FIG. 1. An embodiment of the signaling flow 1850 shown in FIG. 18B is for illustration only. One or more of the components illustrated in FIG. 18B can be implemented in specialized circuitry configured to perform the noted functions or one or more of the components can be implemented by one or more processors executing instructions to perform the noted functions.

Furthermore, as shown in FIGS. 18A and 18B, the network could indicate to the UE whether the network has applied the downlink transmit timing adjustment. After this, the UE could still be configured and/or indicated by the network to measure one or more RSs/channels such as SSBs from both TRP-1 and TRP-2 (see FIG. 8A), compute the receive timings/receive timing difference, send the receive timing difference report to the network and etc. The network could further adjust the transmit timing based on the receive timing difference report. These procedures follow those presented in FIGS. 9A and 9B, FIG. 12, FIG. 14 and/or FIGS. 15A and 15B in the present disclosure.

It is evident from FIGS. 18A and 18B that certain level of backhaul coordination is needed to align the transmit timing(s) between TRP-1 and TRP-2. The backhaul coordination signaling could include at least one of: receive timing(s) for the one or more TRPs, time offset(s) for the one or more TRPs—calculated as the difference between the receive timing and a reference time (e.g., $\tau_1$ and/or $\tau_2$ in FIGS. 18A and 18B), difference between different time offsets for different TRPs (e.g., $\Delta\tau$ in FIGS. 18A and 18B), indication(s) of whether to advance or back off the transmit timing according to the receive timing difference, and etc. Alternatively, the network could also transmit the timing offsets, e.g., $\tau_1$ for TRP-1 and $\tau_2$ for TRP-2, to the UE. The timing offsets could be transmitted to the UE along with the TRP-specific uplink timing advance commands through MAC CE and/or RACH response.

Figure 19A:
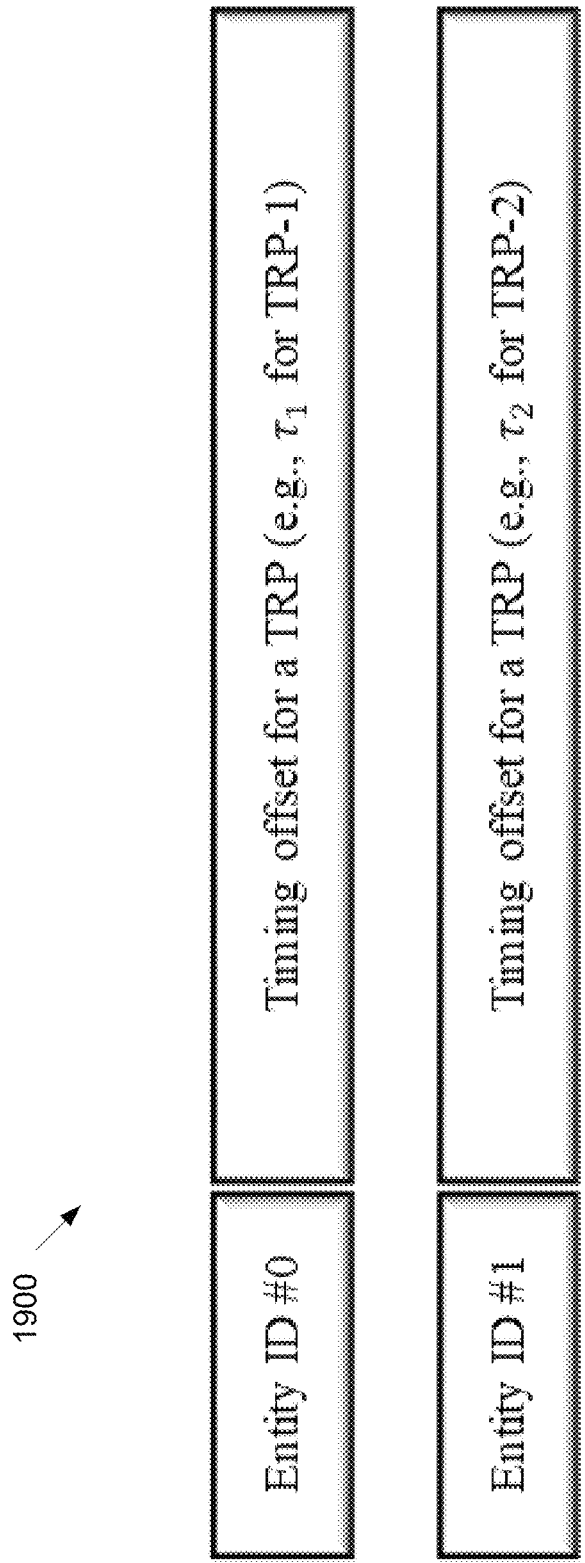
FIG. 19A illustrates an example two TRP-specific UL timing offset MAC CE commands in a multi-TRP system according to embodiments of the present disclosure.

FIG. 19A illustrates an example of two TRP-specific UL timing offset MAC CE commands in a multi-TRP system 1900 according to embodiments of the present disclosure. An embodiment of the two TRP-specific UL timing offset MAC CE commands in the multi-TRP system 1900 shown in FIG. 19A is for illustration only.

In FIG. 19A, an example of two MAC CE commands each containing a timing offset for a TRP is depicted. As shown in FIG. 19A, each MAC CE command contains an entity ID, which could correspond to a TRP-specific ID value such as PCI value, CORESETPoolIndex value, TRP ID value, TRP-specific higher layer signaling index value and etc. For the example shown in FIGS. 18A and 18B, the Entity ID #0 in FIG. 19A could correspond to the PCI value of the serving cell TRP-1, while the Entity ID #1 in FIG. 19A could correspond to the PCI value of the non-serving (or neighboring) cell TRP-2. The MAC CE command with the Entity ID #0 further contains a timing offset for a TRP, e.g., $\tau_1$ for TRP-1, while the MAC CE command with the Entity ID #1 further contains a timing offset for another TRP, e.g., $\tau_2$ for TRP-2.

Figure 19B:
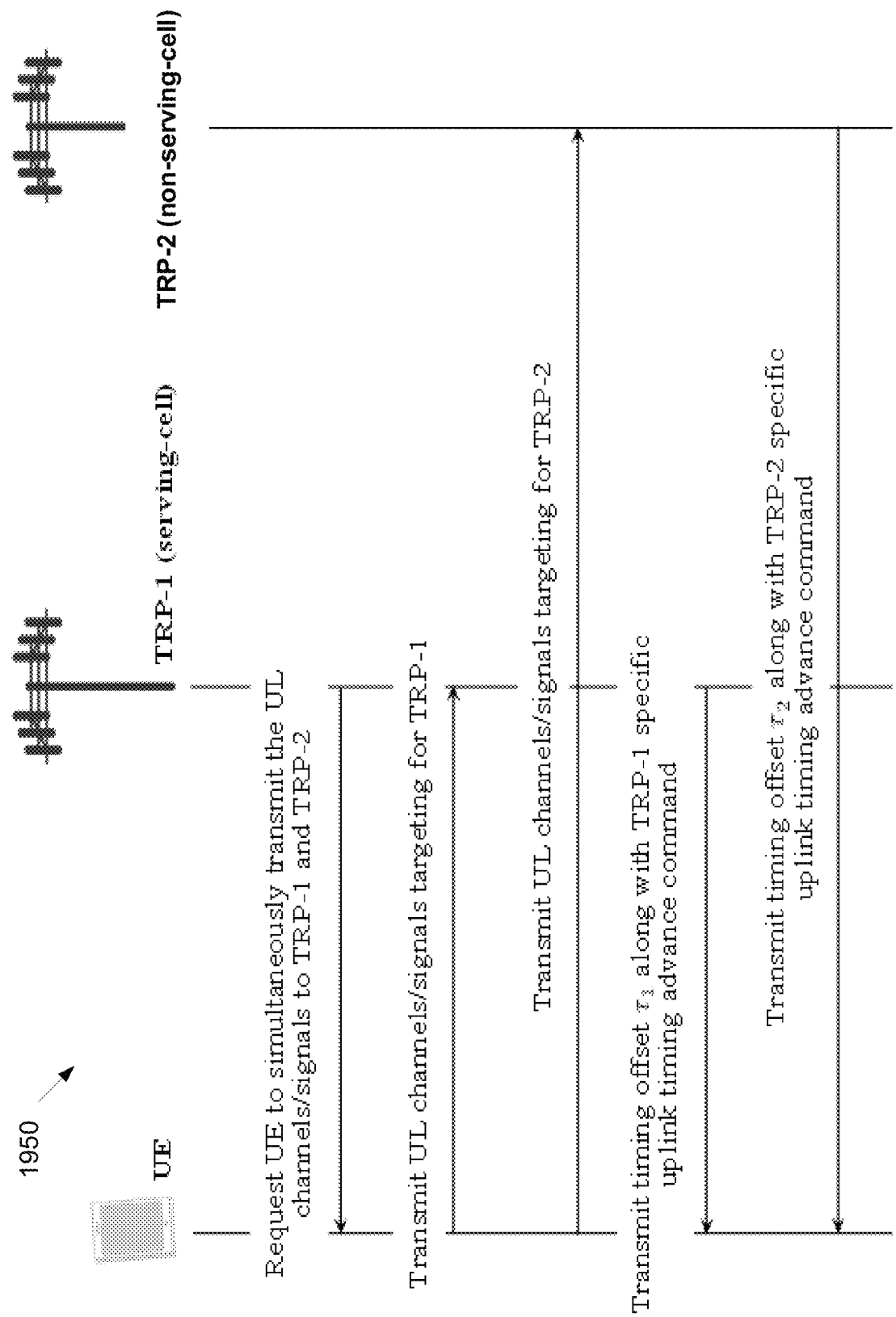
FIG. 19B illustrates an example of signaling flow for timing adjustment operation according to embodiments of the present disclosure.

FIG. 19B illustrates an example of signaling flow 1950 for timing adjustment operation according to embodiments of the present disclosure. The signaling flow 1950 as may be implemented by a UE such as 111-116 and base stations such as 101-103 as illustrated in FIG. 1. An embodiment of the signaling flow 1950 shown in FIG. 19B is for illustration only. One or more of the components illustrated in FIG. 19B can be implemented in specialized circuitry configured to perform the noted functions or one or more of the components can be implemented by one or more processors executing instructions to perform the noted functions.

Figure 19C:
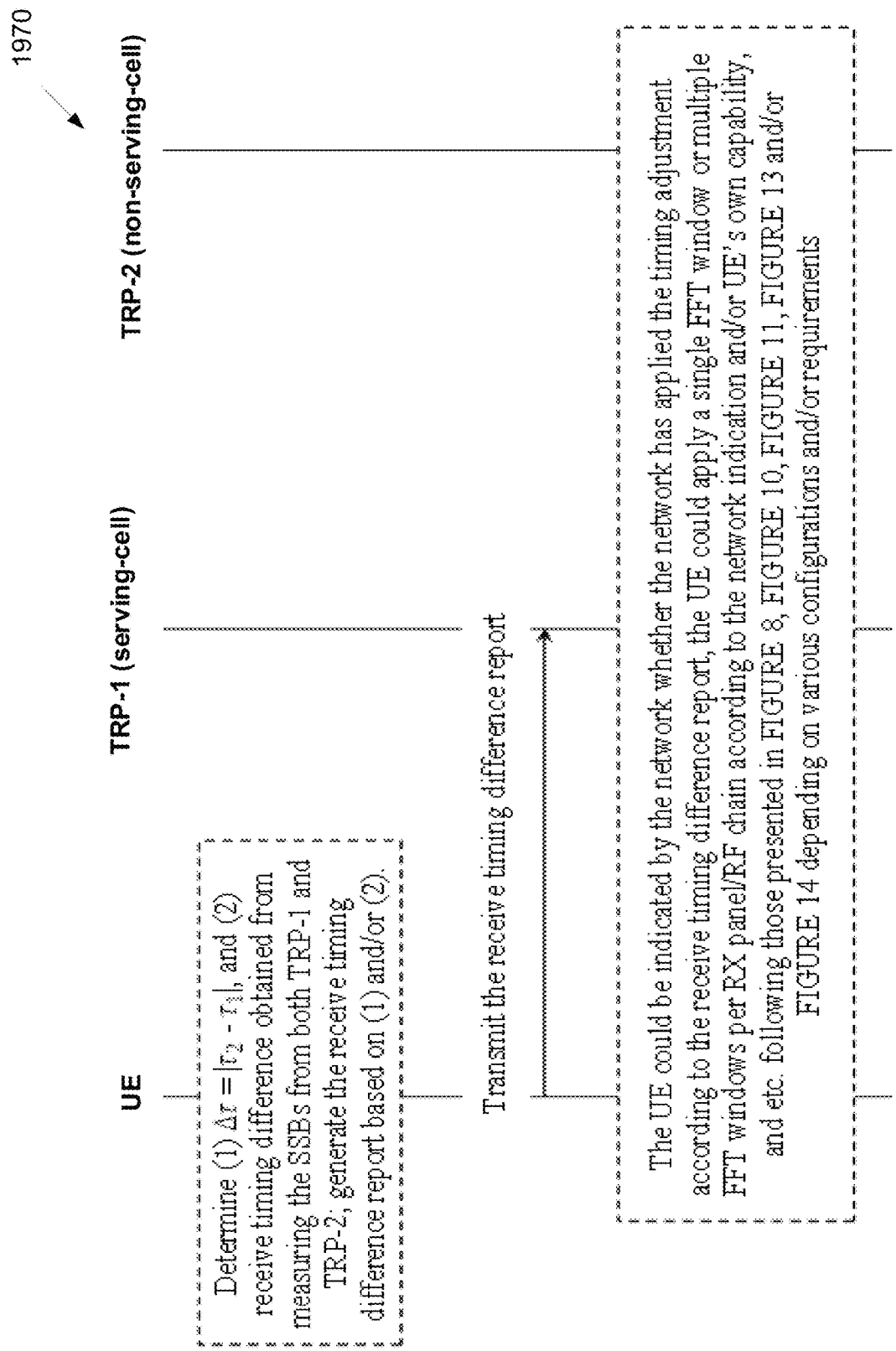
FIG. 19C illustrates another example of signaling flow for timing adjustment operation according to embodiments of the present disclosure.

FIG. 19C illustrates another example of signaling flow 1970 for timing adjustment operation according to embodiments of the present disclosure. The signaling flow 1970 as may be implemented by a UE such as 111-116 and base stations such as 101-103 as illustrated in FIG. 1. An embodiment of the signaling flow 1970 shown in FIG. 19C is for illustration only. One or more of the components illustrated in FIG. 19C can be implemented in specialized circuitry configured to perform the noted functions or one or more of the components can be implemented by one or more processors executing instructions to perform the noted functions.

In FIGS. 19B and 19C, an illustrate example of the above described procedure is given. As can be seen from FIGS. 19B and 19C, upon receiving the timing offsets $\tau_1$ and $\tau_2$ transmitted from both TRP-1 and TRP-2, the UE would compute $\Delta T=|\tau_1-\tau_2|$, and consider it as first receive timing difference. In addition, the UE could also calculate another receive timing difference (second receive timing difference) based on the measurements of the SSBs from the TRPs (following the procedures in FIG. 8A and FIGS. 9A and 9B). The UE could generate third receive timing difference by jointly optimizing the first receive timing difference and the second receive timing difference. The UE could incorporate the first, and/or the second, and/or the third receive timing difference in the receive timing difference report, and send at least one of the first, the second, or the third receiving timing difference to the network.

The receive timing difference report could also include other necessary indications to the network such as the information of the target TRP(s) of the receive timing difference report, whether the target TRP(s) shall advance or back off the transmit timing with respect to the receive timing difference and etc. Other procedures in FIGS. 19B and 19C such as how the UE would apply a single or multiple FFT windows/receive timings to receive and process the DL transmission(s) from different TRPs could follow those described in FIGS. 9A and 9B, FIG. 12, FIG. 14 and/or FIGS. 15A and 15B in the present disclosure.

As described in FIGS. 19B and 19C, the UE could be explicitly configured/indicated by the network one or more timing offsets for the TRPs, i.e., $\tau_1$ for TRP-1 and $\tau_2$ for TRP-2, in addition to the uplink timing advance commands. The timing offsets could also be implicitly indicated to the UE through the uplink timing advance commands.

Figure 20:
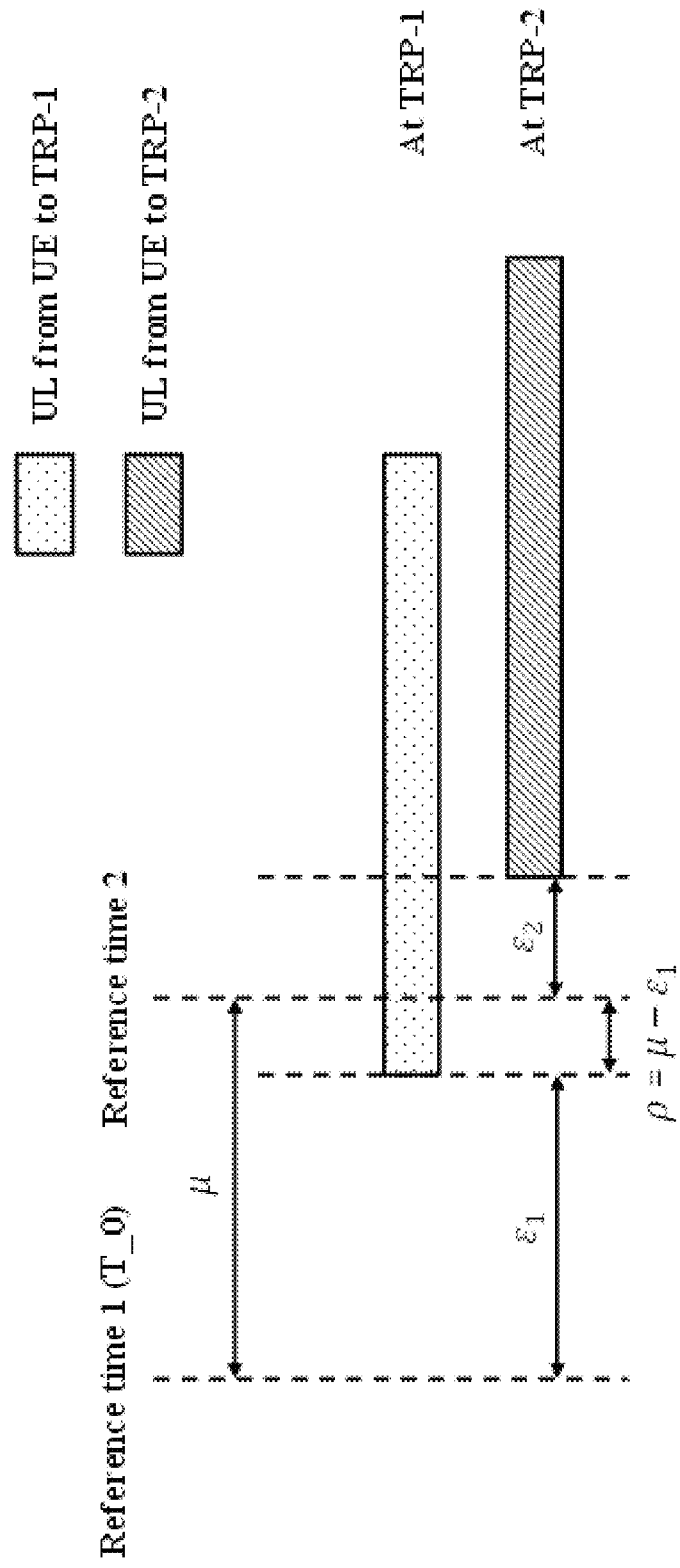
FIG. 20 illustrates an example timing relationship pattern 1 according to embodiments of the present disclosure.

FIG. 20 illustrates an example timing relationship pattern 1 2000 according to embodiments of the present disclosure. An embodiment of the timing relationship pattern 1 2000 shown in FIG. 20 is for illustration only.

In FIG. 20, an illustrative example explaining how to interpret the timing offsets from the timing advance commands at the UE side is presented. In this example, the reference time 1 for TRP-1 is configured as the common reference time T_0. With respect to the common reference time, the uplink channels/RSs (such as SRSs) arrive at TRP-2 at a later time than those arrive at TRP-1. Furthermore, the uplink channels/signals arrive at TRP-1 at a later time than reference time 1, but at an earlier time than reference time 2, and the uplink channels/RSs arrive at TRP-2 at a later time than both reference time 1 and reference time 2. It is evident from the timing relationship pattern 1 shown in FIG. 20 that to obtain the timing offsets $\tau_1$ and $\tau_2$ at the UE side, the UE may be indicated by the network parameter(s) $\mu$ and/or $\rho$, where $\mu$ denotes the timing difference between reference time 1 and reference time 2 and $\rho=\mu-\varepsilon_1$; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. The parameter(s) $\mu$ and/or $\rho$ could also be sent to the UE via MAC CE and/or RACH response. Upon receiving the uplink timing advance commands, i.e., $\varepsilon_1$ for TRP-1 and $\varepsilon_2$ for TRP-2, and $\mu$ and/or $\rho$, the UE could calculate the timing offsets as ($\tau_1=\varepsilon_1$) and ($\tau_2=\mu+\varepsilon_2$ or $\tau_2=\varepsilon_1+\varepsilon_2+\rho$) for TRP-1 and TRP-2, respectively, and compute $\Delta\tau=|\tau_1-\tau_2|$. The UE could then configure/include it as (part of) the receive timing difference report and send it to the network following the procedures described in FIGS. 18A and 18B and FIGS. 19A and 19B.

In addition to pattern 1 shown in FIG. 20, there could be other patterns characterizing different timing relationships between reference time 1, reference time 2, common reference time, and the arrival time of uplink channels/RSs at each TRP.

Figure 21:
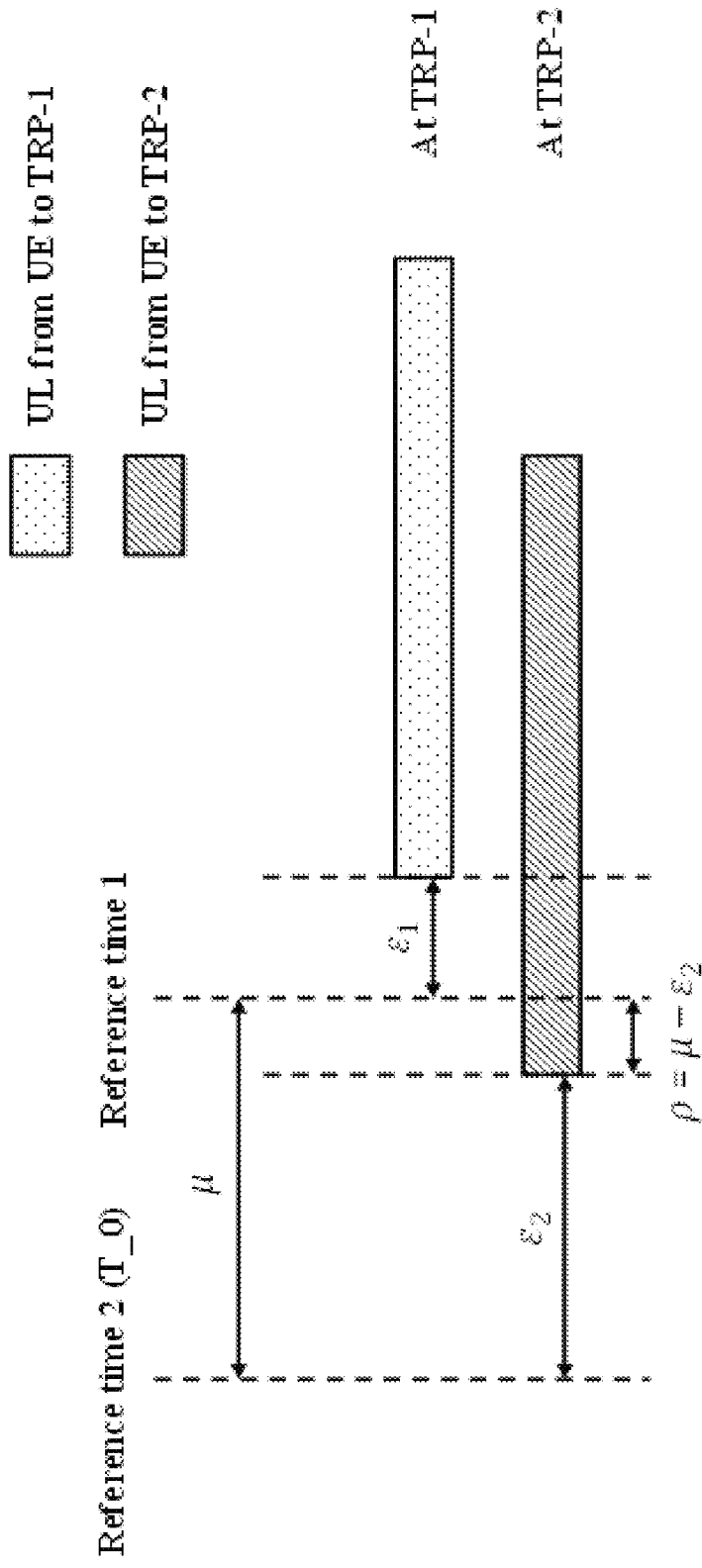
FIG. 21 illustrates an example timing relationship pattern 2 according to embodiments of the present disclosure.

FIG. 21 illustrates an example timing relationship pattern 2 2100 according to embodiments of the present disclosure. An embodiment of the timing relationship pattern 2 2100 shown in FIG. 21 is for illustration only.

Figure 22:
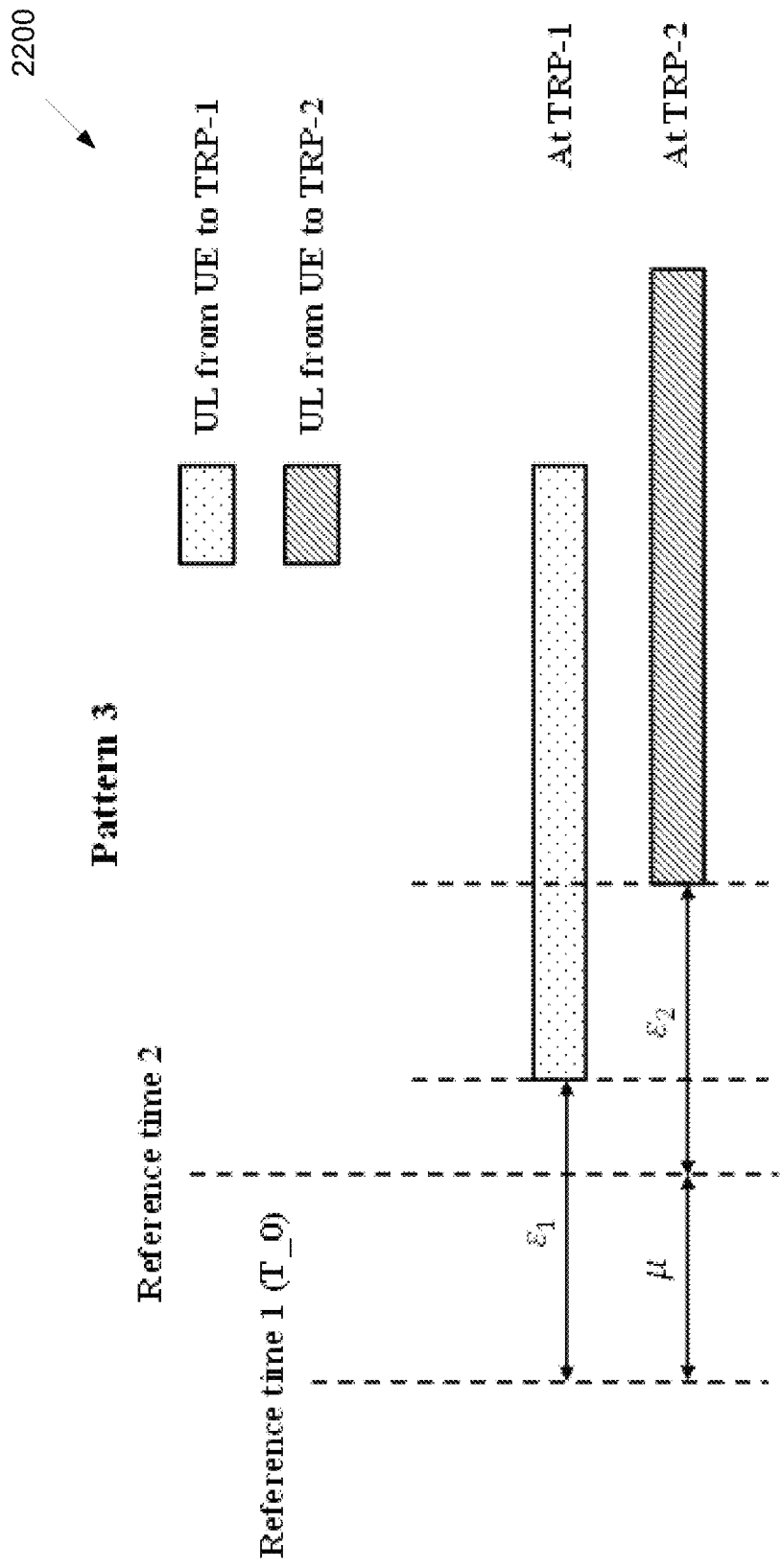
FIG. 22 illustrates an example timing relationship pattern 3 according to embodiments of the present disclosure.

FIG. 22 illustrates an example timing relationship pattern 3 2200 according to embodiments of the present disclosure. An embodiment of the timing relationship pattern 3 2200 shown in FIG. 22 is for illustration only.

Figure 23:
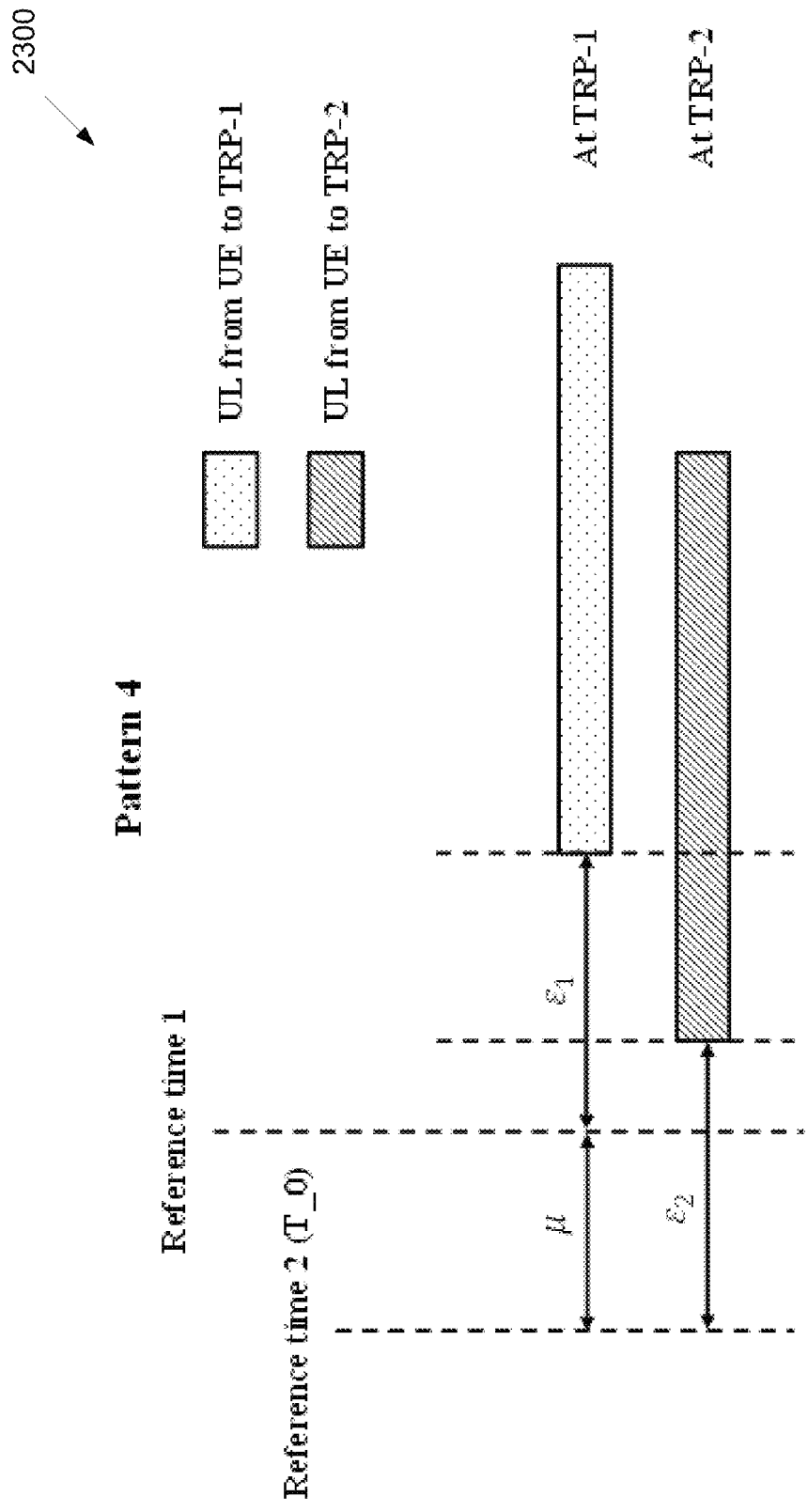
FIG. 23 illustrates an example timing relationship pattern 4 according to embodiments of the present disclosure.

FIG. 23 illustrates an example timing relationship pattern 4 2300 according to embodiments of the present disclosure. An embodiment of the timing relationship pattern 4 2300 shown in FIG. 23 is for illustration only.

In FIG. 21, FIG. 22, and FIG. 23, three different patterns, pattern 2, pattern 3 and pattern 4 are depicted. For instance, as illustrated in FIG. 23, reference time 2 for TRP-2 is configured as the common reference time T_0. With respect to the common reference time, the uplink channels/RSs arrive at TRP-1 at a later time than those arrive at TRP-2, and both the uplink channels/RSs arrive at TRP-1 and TRP-2 at a later time than reference time 1 and reference time 2 (T_0). In this case, in addition to the two uplink timing advance commands conveying $\varepsilon_1$ for TRP-1 and $\varepsilon_2$ for TRP-2, the UE could also be indicated by the network via MAC CE and/or RACH response the timing difference $\mu$ between reference time 2 and reference time 1. The UE could then obtain the timing offsets for TRP-1 and TRP-2 as $\tau_1=\mu+\varepsilon_1$ and $\tau_2=\mu+\varepsilon_2$, and therefore $\Delta\tau=|\tau_1-\tau_2|$.

It is evident from FIG. 20, FIG. 21, FIG. 22, and FIG. 23 that for different patterns characterizing different timing relationships, the UE could be configured/indicated by the network various timing parameters, and the UE could also compute the timing offsets and therefore the corresponding receive timing difference following different formulas/rules. Hence, prior to generating the receive timing difference report, the UE could be first indicated by the network one or more timing relationships between the TRPs, and/or one or more rules to compute the timing offsets/receive timing difference; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For instance, the UE could be explicitly indicated by the network the exact formulas to calculate the timing offsets, e.g., those characterized in pattern 1.

For another example, a list/set/pool of timing relationship patterns such as those depicted in FIG. 20, FIG. 21, FIG. 22, and FIG. 23 could be predefined/pre-configured, and know to both the UE and network sides a priori.

Alternatively, the UE could be indicated by the network the list/set/pool of timing relationship patterns such as those depicted in FIG. 20, FIG. 21, FIG. 22, and FIG. 23; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. The UE could then be indicated by the network one or more pattern indices, and the UE could follow the timing relationship(s) of the corresponding pattern(s) to derive the timing offsets and the corresponding receive timing difference.

In one example, the UE could be higher layer RRC configured by the network or dynamically indicated by the network via MAC CE or DCI the exact timing relationship pattern index(s).

In another example, the UE could receive from the network a MAC CE activation command/bitmap to activate a timing relationship pattern index from the list/set/pool of candidate timing relationship patterns, or the UE could receive from the network a DCI to indicate a timing relationship pattern index from the list/set/pool of candidate timing relationship patterns. The above described procedure is characterized in FIG. 24.

Figure 24:
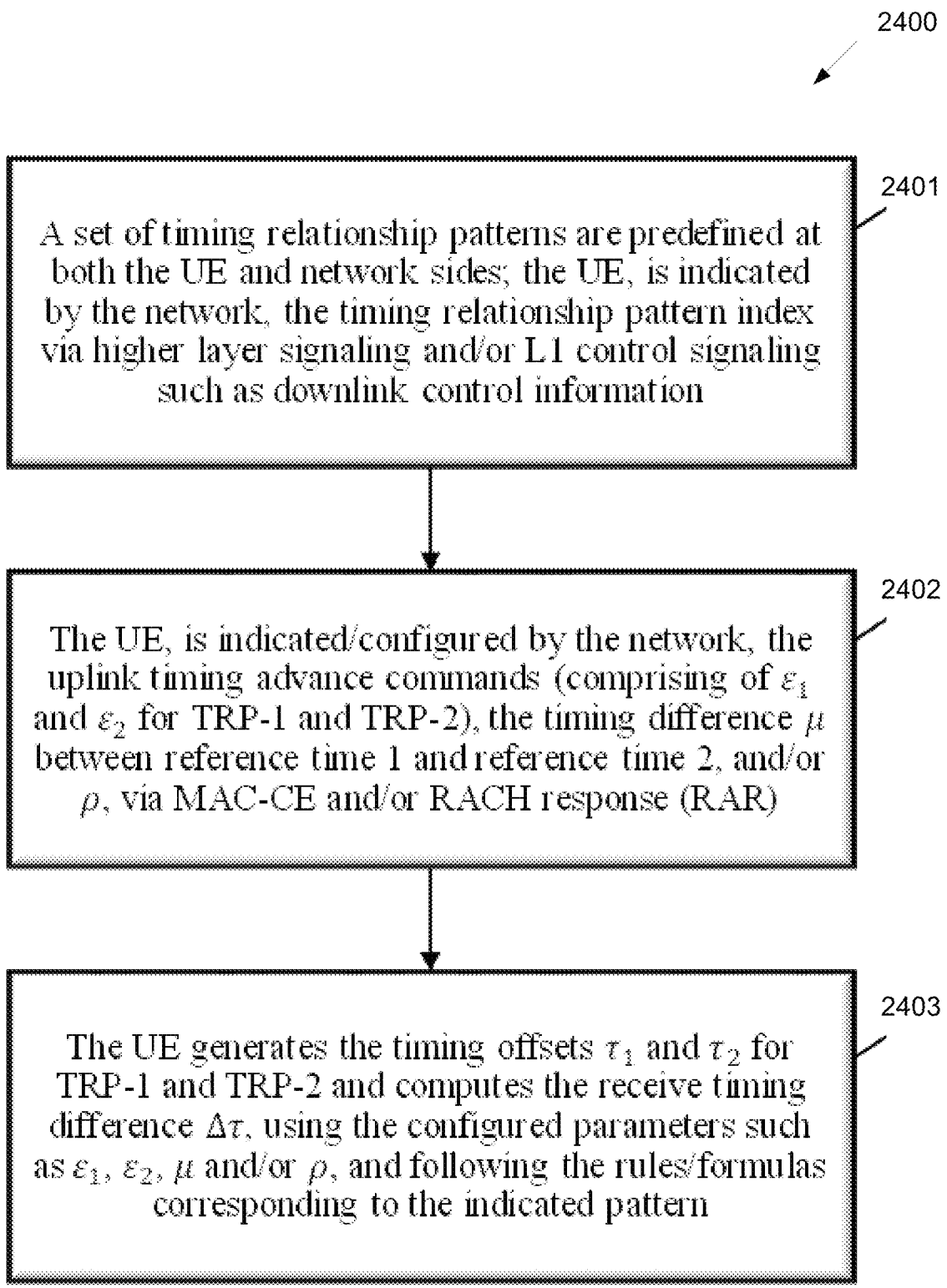
FIG. 24 illustrates a flowchart of a method for UE determining the receive timing difference according to embodiments of the present disclosure.

FIG. 24 illustrates a flowchart of a method 2400 for UE determining the receive timing difference according to embodiments of the present disclosure. The method 2400 as may be implemented by a UE such as 111-116 as illustrated in FIG. 1. An embodiment of the method 2400 shown in FIG. 24 is for illustration only. One or more of the components illustrated in FIG. 24 can be implemented in specialized circuitry configured to perform the noted functions or one or more of the components can be implemented by one or more processors executing instructions to perform the noted functions.

TABLE 4

Bit indication and timing relationship pattern index

| Bit indication | Timing relationship pattern index |
|---|---|
| "00" | 1 |
| "01" | 2 |
| "10" | 3 |
| "11" | 4 |

TABLE 5

Bitmap indication and timing
relationship pattern index

| Bitmap | Timing relationship pattern index |
|---|---|
| "1000" | 1 |
| "0100" | 2 |
| "0010" | 3 |
| "0001" | 4 |

In 2401, the UE is indicated/configured by the network one or more timing relationship pattern indices. In TABLE 4, an example of bit indication of various timing relationship patterns is given. In this example, a total of four patterns are used—more than four patterns are also possible—and therefore, the bit-width for representing the four patterns is two. If pattern 2 is determined at the network side, the UE would be indicated by the network a bit indication of "01" in the corresponding higher layer RRC signaling and/or MAC CE command and/or dynamic DCI signaling. The pattern index could also be indicated to the UE via a bitmap (see TABLE 5). As can be seen from TABLE 5, if pattern 2 is determined at the network side, the UE would be indicated by the network a bitmap of "0100" in the corresponding higher layer RRC signaling and/or MAC CE command and/or dynamic DCI signaling.

More than one UEs could receive the downlink transmissions from the TRPs in the multi-TRP system within the same slot/mini-slot/symbol, and one or more of them could require the TRPs to align/adjust their transmit timings. To avoid having multiple transmit timings each for an individual UE, the network could first group the UEs based on their receive timing difference reports, and then determine a common transmit timing for the UEs within the same group. To facilitate the UE grouping and common transmit timing adjustment, the UEs could quantize their receive timing differences as multiples and/or fractions of the CP length and send to the network the corresponding quantized versions of the receive timing differences.

For instance, assume a 2-bit codebook for quantizing the receive timing difference, which is known to both the UE and network sides, having {0.85T_CP, T_CP, 1.5T_CP, 2T_CP} as the codewords, where T_CP denotes the CP length. For example, if the exact receive timing difference determined at the UE is closest to T_CP in terms of, say, the Euclidean distance, the UE would indicate the second codeword in the codebook ("01") to the network as the receive timing difference. For another example, if the exact receive timing difference determined at the UE is closest to 2T_CP in terms of the Euclidean distance, the UE would indicate to the network the fourth codeword in the codebook ("11") as the receive timing difference. Other methods of constructing the codebook and quantizing the receive timing difference are also possible.

Figure 25:
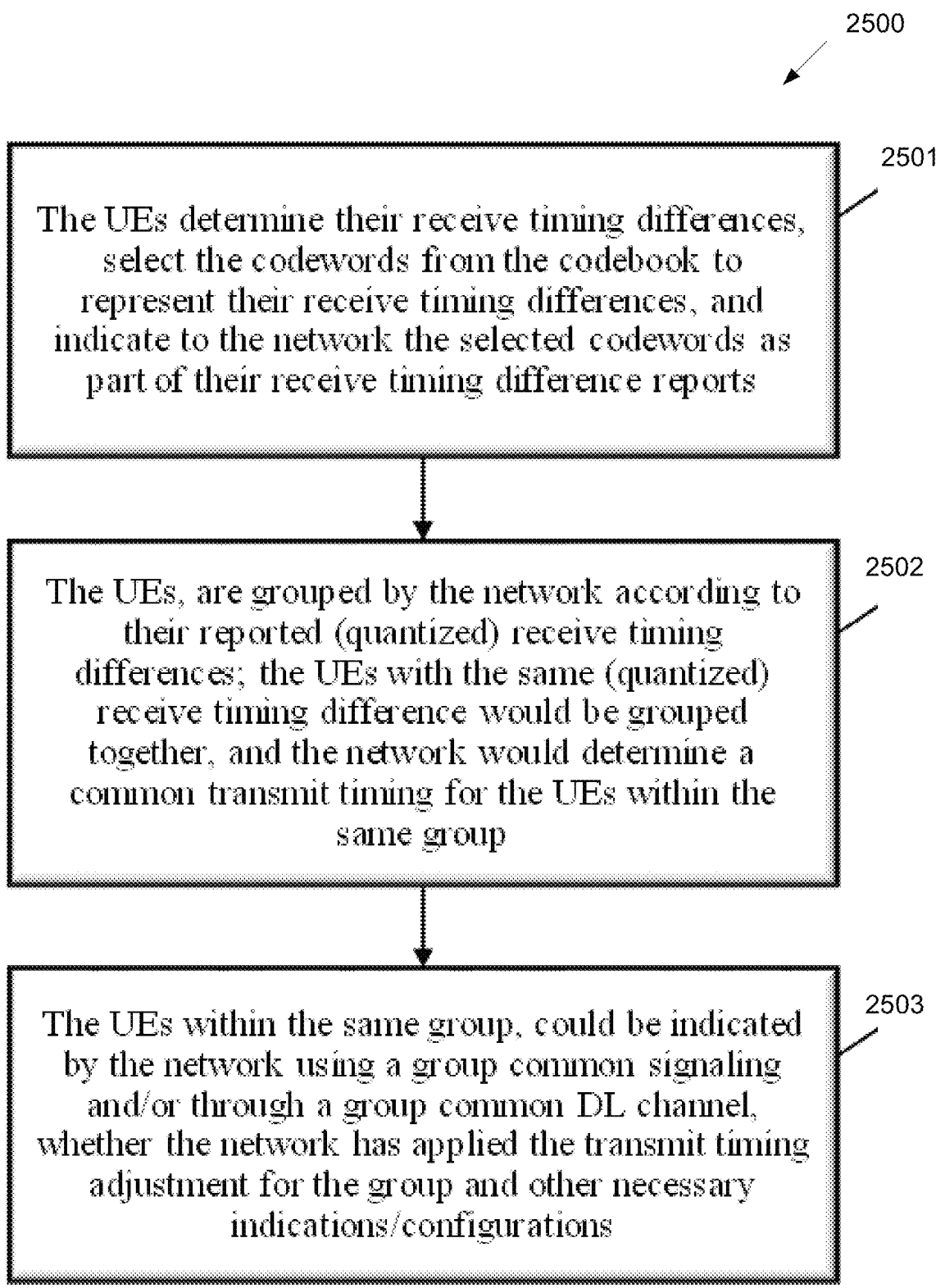
FIG. 25 illustrates a flowchart of a method for UE grouping based network side transmit timing adjustment according to embodiments of the present disclosure.

FIG. 25 illustrates a flowchart of a method 2500 for UE grouping based network side transmit timing adjustment according to embodiments of the present disclosure. The method 2500 as may be implemented by a UE such as 111-116 and base stations 101-103 as illustrated in FIG. 1. An embodiment of the method 2500 shown in FIG. 25 is for illustration only. One or more of the components illustrated in FIG. 25 can be implemented in specialized circuitry configured to perform the noted functions or one or more of the components can be implemented by one or more processors executing instructions to perform the noted functions.

In FIG. 25, an example of network side timing adjustment procedure for a group of UEs is presented.

In 2501, the UEs first determine the receive timing differences between different TRPs following the procedures described in FIG. 8A and FIGS. 9A and 9B. The UEs then quantize the receive timing differences using a predefined codebook and indicate to the network the selected codewords from the codebook as part of the receive timing difference reports. A codeword in the codebook could be a multiple and/or a fraction of the CP length. Other methods of constructing the codebook and quantizing the receive timing difference are also possible.

In 2502, based on the receive timing difference reports, the UEs of interest are categorized by the network into different groups. For instance, the UEs reporting the same (quantized) receive timing difference could be grouped together. The network would determine a common transmit timing for the UEs within the same group. For instance, consider a total of four UEs {UE_0, UE_1, UE_2, UE_3}, and their reported (quantized) receive timing differences are T_CP, T_CP, 2T_CP and 0.85T_CP, respectively. Furthermore, both UE_0 and UE_1 indicate to the network that TRP-1 may advance the transmit timing with respect to the receive timing difference. As UE_0 and UE_1 report the same (quantized) receive timing difference, the network could group them together. The network could also instruct TRP-1 to advance the transmit timing by T_CP for the downlink transmissions to UE_0 and UE_1. Other methods of grouping the UEs and adjust the corresponding transmit timing are also possible.

In 2503, the UEs within the same group, could be indicated by the network whether the network has applied the transmit timing adjustment via a group common DL channel/signaling. The UEs within the same group, could also be indicated by the network via the group common DL channel/signaling about other necessary indications/configurations such as those presented in FIGS. 9A and 9B, FIGS. 15A and 15B, FIGS. 18A, 18B, and 18C.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
   a transceiver configured to:
      transmit, to a base station (BS), a capability signaling indicating support for a downlink (DL) timing difference between a first cell and a second cell exceeding a cyclic prefix (CP) length; and
      receive, in response to the capability signaling, a configuration for reporting the DL timing difference between the first and second cells; and a processor operably coupled to the transceiver, the processor configured to determine, based on the configuration, a report related to the DL timing difference between the first and second cells.

2. The UE of claim 1, wherein:
if the capability signaling indicates that the UE does not support the DL timing difference between the first and second cell exceeding the CP length, one of:
  the UE does not assume that a DL timing difference between the first and second cell does not exceed the CP length; and
  when the DL timing difference is larger than the CP length, the transceiver is further configured to transmit, based on the configuration, the report related to the DL timing difference between the first and second cells.

3. The UE of claim 1, wherein:
the first and second cells have different physical cell identities (PCIs), and
the configuration includes at least one of:
  time and frequency configurations in a channel state information (CSI) reporting setting for reporting the DL timing difference, wherein the DL timing difference is configured as a report quantity in addition to channel quality indicator (CQI), precoding matrix indicator (PMI), rank indicator (RI), and layer indicator (LI);
  target cell information including a PCI and a CORESETPoolIndex;
  an indicator to indicate a timing advance or timing backoff;
  one or more thresholds for comparing with the DL timing difference; and
  a request for sending the timing difference report based on a capability report from the UE, wherein the capability report indicates a capability of the UE of using one or multiple receive timings or fast Fourier transform (FFT) window positions to receive DL RSs/channels from the first and second cells.

4. The UE of claim 1, wherein the DL timing difference corresponds to at least one of:
  a true timing difference determined as difference between two or more receive timings;
  a differential timing difference determined as difference between the true timing difference and a threshold including CP length;
  a quantized true timing difference determined as a codeword in a codebook having a smallest Euclidean distance with the true timing difference; and
  a quantized differential timing difference determined as a codeword in a codebook having a smallest Euclidean distance with the differential timing difference.

5. The UE of claim 1, wherein:
the timing difference report includes at least one of:
  the DL timing difference between the first and second cells;
  target cell information including a physical cell identity (PCI) and a CORESETPoolIndex; and
  an indicator to indicate timing advance or timing backoff, and
the timing difference report is part of a channel state information (CSI) report, multiplexed with hybrid automatic repeat request acknowledgement (HARQ-ACK), or multiplexed with scheduling request (SR).

6. The UE of claim 5, wherein:
the timing difference report is multiplexed in the CSI report;
one of:
  the CSI report is a periodic or semi-persistent (P/SP) wideband (WB) CSI report and the timing difference report is multiplexed according to at least one of:
    the timing difference report is indicated by a portion or all of zero padding bits in the WB CSI report, and
    the timing difference report is multiplexed with one or more CSI parameters in the WB CSI report; or
  the CSI report is an aperiodic (AP) narrowband (NB) two-part CSI report and the timing difference report is multiplexed according to at least one of:
    the timing difference report is multiplexed with one or more CSI parameters including channel quality indicator (CQI) and rank indicator (RI) in part 1 of the NB CSI report, and
    the timing difference report is multiplexed with one or more CSI parameters including CQI, precoding matrix indicator (PMI), and layer indicator (LI) in part 2 of the NB CSI report;
the timing difference report is multiplexed with one or more CSI parameters in the CSI report is according to at least one of:
  the timing difference report is via a new CSI parameter;
  the timing difference report is jointly reported with an existing CSI parameter; and
  the timing difference report is via a reserved or unused code point of the existing CSI parameter, wherein the existing CSI parameter corresponds to at least one of: a RI, a CSI-RS resource indicator (CRI), a LI, a PMI, a CQI, a layer 1 reference signal receive power (L1-RSRP) and a layer 1 signal to interference plus noise ratio (L1-SINR).

7. The UE of claim 1, wherein:
the transceiver is further configured to:
  receive one or more uplink (UL) timing advance (TA) commands for the first and second cells, wherein the one or more UL TA commands are sent via one or more medium access control elements (MAC CEs) and include at least one of:
    an entity identifier including a physical cell identity (PCI) and a CORESETPoolIndex, and
    a TA value; and
  receive one or more timing relationship patterns; and
the processor is further configured to:
  determine one or more timing offsets for the first and second cells based on the one or more UL TA commands and the one or more timing relationship patterns; and
  determine, based on the UL TA commands and the one or more determined timing offsets, the timing difference report for the first and second cells.

8. The UE of claim 1, wherein:
the transceiver is further configured to:
  receive one or more uplink (UL) timing advance (TA) commands for the first and second cells;
  receive one or more UL timing offset commands for the first and second cells, wherein the one or more UL timing offset commands are sent via one or more medium access control elements (MAC CEs), including at least one of:
    an entity identifier including a physical cell identity (PCI) and a CORESETPoolIndex; and
    a timing offset value; and the processor is further configured to:
   determine one or more timing offsets for the first and second cells based on the one or more UL timing offset commands; and
   determine, based on the UL TA commands and the one or more determined timing offsets, the timing difference report for the first and second cells.

9. A base station (BS) comprising:
a transceiver configured to:
   receive, from a user equipment (UE), a capability signaling indicating support for a downlink (DL) timing difference between a first cell and a second cell exceeding a cyclic prefix (CP) length; and
a processor operably coupled to the transceiver, the processor configured to:
   generate, in response to the capability signaling, a configuration for reporting the DL timing difference between the first and second cells,
wherein the transceiver is further configured to:
   transmit the configuration.

10. The BS of claim 9, wherein:
if the capability signaling indicates that the UE does not support the DL timing difference between the first and second cell exceeding the CP length, one of:
   the UE does not assume that a DL timing difference between the first and second cell does not exceed the CP length; and
   when the DL timing difference is larger than the CP length, the transceiver is further configured to transmit, based on the configuration, a report related to the DL timing difference between the first and second cells.

11. The BS of claim 9, wherein:
the first and second cells have different physical cell identities (PCIs), and
the configuration includes at least one of:
   time and frequency configurations in a channel state information (CSI) reporting setting for reporting the DL timing difference, wherein the DL timing difference is configured as a report quantity in addition to channel quality indicator (CQI), precoding matrix indicator (PMI), rank indicator (RI) and layer indicator (LI);
   target cell information including a physical cell identity (PCI) and a CORESETPoolIndex;
   an indicator to indicate a timing advance or timing backoff;
   one or more thresholds for comparing with the DL timing difference; and
   a request for sending the timing difference report based on a capability report from a user equipment (UE), wherein the capability report indicates a capability of the UE of using one or multiple receive timings or fast Fourier transform (FFT) window positions to receive DL RSs/channels from the first and second cells.

12. The BS of claim 9, wherein the DL timing difference corresponds to at least one of:
a true timing difference determined as difference between two or more receive timings;
a differential timing difference determined as difference between the true timing difference and a threshold including CP length;
a quantized true timing difference determined as a codeword in a codebook having a smallest Euclidean distance with the true timing difference; and
a quantized differential timing difference determined as a codeword in a codebook having a smallest Euclidean distance with the differential timing difference.

13. The BS of claim 9, wherein:
the timing difference report includes at least one of:
   the DL timing difference between the first and second cells;
   target cell information including a physical cell identity (PCI) and a CORESETPoolIndex; and
   an indicator to indicate timing advance or timing backoff, and
the timing difference report is part of a channel state information (CSI) report, multiplexed with hybrid automatic repeat request acknowledgement (HARQ-ACK), or multiplexed with scheduling request (SR).

14. The BS of claim 13, wherein:
the timing difference report is multiplexed in the CSI report;
one of:
   the CSI report is a periodic or semi-persistent (P/SP) wideband (WB) CSI report and the timing difference report is multiplexed according to at least one of:
      the timing difference report is indicated by a portion or all of zero padding bits in the WB CSI report, and
      the timing difference report is multiplexed with one or more CSI parameters in the WB CSI report; or
   the CSI report is an aperiodic (AP) narrowband (NB) two-part CSI report and the timing difference report is multiplexed according to at least one of:
      the timing difference report is multiplexed with one or more CSI parameters including channel quality indicator (CQI) and rank indicator (RI) in part 1 of the NB CSI report, and
      the timing difference report is multiplexed with one or more CSI parameters including CQI, precoding matrix indicator (PMI), and layer indicator (LI) in part 2 of the NB CSI report;
the timing difference report is multiplexed with one or more CSI parameters in the CSI report is according to at least one of:
   the timing difference report is via a new CSI parameter;
   the timing difference report is jointly reported with an existing CSI parameter; and
   the timing difference report is via a reserved or unused code point of the existing CSI parameter, wherein the existing CSI parameter corresponds to at least one of: a RI, a CSI-RS resource indicator (CRI), a LI, a PMI, a CQI, a layer 1 reference signal receive power (L1-RSRP) and a layer 1 signal to interference plus noise ratio (L1-SINR).

15. The BS of claim 9, wherein:
the processor is further configured to:
   generate one or more uplink (UL) timing advance (TA) commands for one or more of the first and second cells;
   generate one or more UL timing offset commands for one or more of the first and second cells; and
   generate one or more timing relationship patterns; and
the transceiver is further configured to:
   transmit the one or more UL TA commands;
   transmit the one or more UL timing offset commands; and
   transmit the one or more timing relationship patterns.

16. The BS of claim 15, wherein:
the UL timing advance command is sent via a medium access control element (MAC CE) that includes at least one of:
an entity identifier (ID) including a physical cell identity (PCI) and a CORESETPoolIndex; and
a TA value, and
the UL timing offset command is sent via a MAC CE that includes at least one of:
an entity ID including a PCI and a CORESETPoolIndex; and
a timing offset value.

17. A method for operating a user equipment (UE), the method comprising:
transmitting, to a base station (BS), a capability signaling indicating support for a downlink (DL) timing difference between a first cell and a second cell exceeding a cyclic prefix (CP) length;
receiving, in response to the capability signaling, a configuration for reporting the DL timing difference between the first and second cells; and
determining, based on the configuration, a report related to the DL timing difference between the first and second cells.

18. The method of claim 17, wherein:
the first and second cells have different physical cell identities (PCIs),
the timing difference report includes at least one of:
the DL timing difference between the first and second cells;
target cell information including a PCI and a CORESETPoolIndex; and
an indicator to indicate timing advance or timing backoff, and
the timing difference report is part of a channel state information (CSI) report, multiplexed with hybrid automatic repeat request acknowledgement (HARQ-ACK), or multiplexed with scheduling request (SR).

19. The method of claim 18, wherein:
the timing difference report is multiplexed in the CSI report;
one of:
the CSI report is a periodic or semi-persistent (P/SP) wideband (WB) CSI report and the timing difference report is multiplexed according to at least one of:
the timing difference report is indicated by a portion or all of zero padding bits in the WB CSI report, and
the timing difference report is multiplexed with one or more CSI parameters in the WB CSI report; or
the CSI report is an aperiodic (AP) narrowband (NB) two-part CSI report and the timing difference report is multiplexed according to at least one of:
the timing difference report is multiplexed with one or more CSI parameters including channel quality indicator (CQI) and rank indicator (RI) in part 1 of the NB CSI report, and
the timing difference report is multiplexed with one or more CSI parameters including CQI, precoding matrix indicator (PMI), and layer indicator (LI) in part 2 of the NB CSI report;
the timing difference report is multiplexed with one or more CSI parameters in the CSI report is according to at least one of:
the timing difference report is via a new CSI parameter;
the timing difference report is jointly reported with an existing CSI parameter; and
the timing difference report is via a reserved or unused code point of the existing CSI parameter, wherein the existing CSI parameter corresponds to at least one of: a RI, a CSI-RS resource indicator (CRI), a LI, a PMI, a CQI, a layer 1 reference signal receive power (L1-RSRP) and a layer 1 signal to interference plus noise ratio (L1-SINR).

20. The method of claim 17, further comprising:
receiving one or more uplink (UL) timing advance (TA) commands for the first and second cells;
receiving one or more UL timing offset commands for the first and second cells;
receiving one or more timing relationship patterns;
determining one or more timing offsets for the first and second cells according to at least one of:
the one or more UL TA commands and the one or more timing relationship patterns; and
the one or more UL timing offset commands; and
determining, based on the UL TA commands and the one or more determined timing offsets, the timing difference report for the first and second cells.

* * * * *